US009811836B2

(12) United States Patent
Brouhard

(10) Patent No.: US 9,811,836 B2
(45) Date of Patent: Nov. 7, 2017

(54) SYSTEM AND METHOD OF A MEDIA DELIVERY SERVICES PLATFORM FOR TARGETING CONSUMERS IN REAL TIME

(75) Inventor: Jesse Brouhard, Sharon, MA (US)

(73) Assignee: MODIV MEDIA, INC, Quincy, MA (US)

( * ) Notice: Subject to any disclaimer, the term of this patent is extended or adjusted under 35 U.S.C. 154(b) by 0 days.

(21) Appl. No.: 13/224,182

(22) Filed: Sep. 1, 2011

(65) Prior Publication Data

US 2012/0022930 A1   Jan. 26, 2012

(51) Int. Cl.
*G06Q 30/00* (2012.01)
*G06Q 30/02* (2012.01)

(52) U.S. Cl.
CPC ......... *G06Q 30/02* (2013.01); *G06Q 30/0221* (2013.01); *G06Q 30/0229* (2013.01)

(58) Field of Classification Search
CPC ....................................................... G06Q 30/02
USPC ........................ 705/14.41, 14.71, 14.73, 14.3
See application file for complete search history.

(56) References Cited

U.S. PATENT DOCUMENTS

| 5,056,019 A | 10/1991 | Schultz et al. | |
| 5,221,838 A | 6/1993 | Gutman et al. | 235/379 |
| 5,591,949 A | 1/1997 | Bernstein | 235/380 |
| 5,650,761 A | 7/1997 | Gomm et al. | 235/381 |
| 5,727,153 A | 3/1998 | Powell | 395/214 |
| 5,761,648 A | 6/1998 | Golden et al. | 705/14 |
| 5,794,210 A | 8/1998 | Goldhaber et al. | 705/14 |
| 5,857,175 A | 1/1999 | Day et al. | 705/14 |
| 5,887,271 A | 3/1999 | Powell | 705/14 |
| 5,915,023 A | 6/1999 | Bernstein | 380/24 |
| 5,918,211 A | 6/1999 | Sloane | 705/16 |
| 5,943,624 A | 8/1999 | Fox et al. | 455/556 |

(Continued)

FOREIGN PATENT DOCUMENTS

| JP | 2001-256398 A | 9/2001 |
| JP | 2001-282796 A | 10/2001 |

(Continued)

OTHER PUBLICATIONS

U.S. Appl. No. 61/445,920 filed Feb. 23, 2011, to which Amaro et al. , US 20120215610 (U.S. Appl. No. 13/396,536, filed Feb. 14, 2012) claims priority (made of 4 documnets: abstract, specification, claims, drawings).*

(Continued)

*Primary Examiner* — Sun Li
(74) *Attorney, Agent, or Firm* — McDermott Will & Emery LLP

(57) ABSTRACT

A media targeting system may be configured to coordinate media and manage media conflicts in its delivery to consumers. The media targeting system may in near real-time arbitrate between all offers assigned to a particular consumer or available to the consumer via one or more channels to ensure that a consumer only receives non-conflicting offers during particular time periods. The media targeting system may translate offers into a real-time, in-store loyalty environment including consumer real-time behavior assignment into traits in order to make a real-time offer assignment based on the traits. An application on a mobile device of a consumer may allow the consumer to share offers with other consumers via a bump of the consumers' mobile devices.

22 Claims, 29 Drawing Sheets

(56) References Cited

U.S. PATENT DOCUMENTS

| | | | |
|---|---|---|---|
| 5,970,469 A | 10/1999 | Scroggie et al. | 705/14 |
| 5,979,757 A | 11/1999 | Tracy et al. | 235/383 |
| 6,006,265 A | 12/1999 | Rangan et al. | 709/226 |
| 6,014,635 A | 1/2000 | Harris et al. | |
| 6,055,513 A | 4/2000 | Katz et al. | 705/26 |
| 6,076,068 A | 6/2000 | DeLapa et al. | 705/14 |
| 6,088,683 A | 7/2000 | Jalili | 705/26 |
| 6,169,890 B1 | 1/2001 | Vatanen | 455/406 |
| 6,223,291 B1 | 4/2001 | Puhl et al. | 713/201 |
| 6,237,145 B1 | 5/2001 | Narasimhan et al. | 725/23 |
| 6,282,522 B1 | 8/2001 | Davis et al. | 705/41 |
| 6,332,126 B1 | 12/2001 | Peirce et al. | 705/14 |
| 6,353,739 B1 | 3/2002 | Davis | 455/428 |
| 6,386,450 B1 | 5/2002 | Ogasawara | 235/383 |
| 6,389,401 B1 | 5/2002 | Kepecs | 705/14 |
| 6,450,407 B1 | 9/2002 | Freeman et al. | 235/492 |
| 6,601,040 B1 | 7/2003 | Kolls | 705/14 |
| 6,647,269 B2 | 11/2003 | Hendrey et al. | 455/456.3 |
| 6,711,474 B1 | 3/2004 | Treyz et al. | 701/1 |
| 6,837,436 B2 | 1/2005 | Swartz et al. | 235/472.02 |
| 6,868,391 B1 | 3/2005 | Hultgren | 705/26 |
| 6,879,965 B2 | 4/2005 | Fung et al. | 705/39 |
| 6,912,398 B1 | 6/2005 | Domnitz | 455/461 |
| 6,931,254 B1 | 8/2005 | Egner et al. | 455/456.3 |
| 6,996,579 B2 | 2/2006 | Leung et al. | |
| 7,013,286 B1 | 3/2006 | Aggarwal et al. | 705/14 |
| 7,027,803 B2 | 4/2006 | Dafcik | 455/414.1 |
| 7,035,649 B1 | 4/2006 | Chang et al. | 455/456.3 |
| 7,116,977 B1 | 10/2006 | Moton et al. | 455/419 |
| 7,123,879 B2 | 10/2006 | Koketsu et al. | 455/41.2 |
| 7,127,261 B2 | 10/2006 | Van Erlach | 455/456.5 |
| 7,127,264 B2 | 10/2006 | Hronek et al. | 455/466 |
| 7,221,949 B2 | 5/2007 | Clough | 455/456.3 |
| 7,239,871 B2 | 7/2007 | Shamp et al. | 455/422.1 |
| 7,248,855 B2 | 7/2007 | Joyce et al. | 455/406 |
| 7,305,365 B1 | 12/2007 | Bhela et al. | 705/51 |
| 7,506,804 B2 | 3/2009 | Zajkowski et al. | 235/380 |
| 7,668,754 B1 | 2/2010 | Bridgetall | 705/26.9 |
| 7,684,809 B2 | 3/2010 | Niedermeyer | 455/456.3 |
| 7,865,414 B2 | 1/2011 | Fung et al. | 705/35 |
| 7,917,388 B2 | 3/2011 | van der Riet | 705/14.25 |
| 8,032,409 B1 | 10/2011 | Mikurak | 705/14.39 |
| 8,065,235 B2 | 11/2011 | Narayanaswami et al. | 705/64 |
| 8,626,130 B2 | 1/2014 | Wesley | 455/414.1 |
| 8,783,561 B2 | 7/2014 | Wesley | 235/380 |
| 8,825,523 B2 | 9/2014 | Gillenson et al. | 705/14.25 |
| 9,224,154 B2 | 12/2015 | Wesley | |
| 2001/0001239 A1 | 5/2001 | Stewart | 342/457 |
| 2001/0005840 A1 | 6/2001 | Verkama | 705/67 |
| 2001/0007983 A1 | 7/2001 | Lee | |
| 2001/0051876 A1 | 12/2001 | Seigel et al. | 705/1 |
| 2002/0029342 A1 | 3/2002 | Keech | 713/184 |
| 2002/0060246 A1 | 5/2002 | Gobburu et al. | 235/462.46 |
| 2002/0062249 A1 | 5/2002 | Iannacci | 705/14 |
| 2002/0077907 A1 | 6/2002 | Ukai et al. | |
| 2002/0091569 A1 | 7/2002 | Kitaura et al. | |
| 2002/0091571 A1 | 7/2002 | Thomas et al. | 705/14 |
| 2002/0095333 A1 | 7/2002 | Jokinen et al. | 705/14 |
| 2002/0101993 A1 | 8/2002 | Eskin | 380/270 |
| 2002/0115449 A1 | 8/2002 | Allen | 455/456 |
| 2002/0128908 A1 | 9/2002 | Levin et al. | 705/14 |
| 2002/0133467 A1 | 9/2002 | Hobson et al. | 705/64 |
| 2002/0138372 A1 | 9/2002 | Ludtke | 705/27 |
| 2002/0143655 A1 | 10/2002 | Elston et al. | 705/26 |
| 2002/0147642 A1 | 10/2002 | Avallone et al. | 705/14 |
| 2002/0151313 A1 | 10/2002 | Stead | 455/456 |
| 2002/0165803 A1 | 11/2002 | Iwase et al. | |
| 2002/0183070 A1 | 12/2002 | Bloebaum et al. | 455/456 |
| 2003/0004827 A1 | 1/2003 | Wang | 705/26 |
| 2003/0014330 A1 | 1/2003 | Showghi et al. | 705/26 |
| 2003/0028483 A1 | 2/2003 | Sanders et al. | |
| 2003/0028518 A1 | 2/2003 | Mankovv | 707/1 |
| 2003/0036950 A1* | 2/2003 | Nguyen | 705/14 |
| 2003/0083933 A1 | 5/2003 | McAlear | 705/14 |
| 2003/0100315 A1 | 5/2003 | Rankin | 455/456 |
| 2003/0115070 A1 | 6/2003 | Brown et al. | 705/1 |
| 2003/0120592 A1 | 6/2003 | Nguyen | 705/39 |
| 2003/0125958 A1 | 7/2003 | Alpdemir et al. | 704/275 |
| 2003/0155413 A1 | 8/2003 | Kovesdi et al. | 235/375 |
| 2003/0162536 A1 | 8/2003 | Panico | 455/422 |
| 2003/0191709 A1 | 10/2003 | Elston et al. | 705/40 |
| 2003/0229541 A1 | 12/2003 | Randall et al. | 705/14 |
| 2003/0233278 A1 | 12/2003 | Marshall | 705/14 |
| 2004/0002897 A1 | 1/2004 | Vishik | 705/14 |
| 2004/0023666 A1 | 2/2004 | Moon et al. | 455/456.1 |
| 2004/0029570 A1 | 2/2004 | Knorr et al. | 455/414.1 |
| 2004/0064406 A1 | 4/2004 | Yates et al. | 705/40 |
| 2004/0083170 A1 | 4/2004 | Bam et al. | 705/40 |
| 2004/0128197 A1 | 7/2004 | Bam et al. | 705/14 |
| 2004/0215467 A1 | 10/2004 | Coffman et al. | 705/1 |
| 2004/0227617 A1 | 11/2004 | Vasquez et al. | 340/7.2 |
| 2004/0249712 A1 | 12/2004 | Brown et al. | |
| 2005/0021399 A1 | 1/2005 | Postrel | |
| 2005/0021401 A1 | 1/2005 | Postrel | 705/14 |
| 2005/0071230 A1 | 3/2005 | Mankoff | |
| 2005/0170850 A1 | 8/2005 | Edwards et al. | 455/456.4 |
| 2005/0187873 A1 | 8/2005 | Labrou et al. | 705/40 |
| 2005/0216354 A1 | 9/2005 | Bam et al. | 705/26 |
| 2005/0251442 A1 | 11/2005 | Ficalora | |
| 2005/0256726 A1 | 11/2005 | Benson et al. | 705/1 |
| 2006/0000900 A1 | 1/2006 | Fernandes et al. | 235/380 |
| 2006/0004626 A1 | 1/2006 | Holmen et al. | |
| 2006/0020507 A1 | 1/2006 | Sagey | 705/14 |
| 2006/0059040 A1 | 3/2006 | Eldred et al. | 705/14 |
| 2006/0089792 A1 | 4/2006 | Manber et al. | 701/207 |
| 2006/0091203 A1 | 5/2006 | Bakker et al. | 235/381 |
| 2006/0099964 A1 | 5/2006 | Barrese et al. | 455/456.3 |
| 2006/0099965 A1 | 5/2006 | Aaron | 455/456.3 |
| 2006/0105783 A1 | 5/2006 | Giraldin et al. | 455/456.3 |
| 2006/0138219 A1 | 6/2006 | Brzezniak et al. | 235/383 |
| 2006/0143091 A1 | 6/2006 | Yuan et al. | 705/26 |
| 2006/0169771 A1 | 8/2006 | Brookner | 235/382 |
| 2006/0171382 A1 | 8/2006 | Mohri et al. | 370/389 |
| 2006/0178986 A1 | 8/2006 | Giordano et al. | 705/40 |
| 2006/0194569 A1 | 8/2006 | Hsueh | 455/412.1 |
| 2006/0194592 A1 | 8/2006 | Clough | 455/456.3 |
| 2006/0195359 A1 | 8/2006 | Robinson et al. | |
| 2006/0248016 A1 | 11/2006 | Ginter et al. | 705/54 |
| 2007/0050259 A1 | 3/2007 | Wesley | 455/414.1 |
| 2007/0087761 A1 | 4/2007 | Anjum et al. | 455/456.2 |
| 2007/0150334 A1 | 6/2007 | Bergh et al. | 705/10 |
| 2007/0156517 A1 | 7/2007 | Kaplan et al. | |
| 2007/0162341 A1 | 7/2007 | McConnell et al. | 705/14 |
| 2007/0173266 A1 | 7/2007 | Barnes, Jr. | 455/456.1 |
| 2007/0198334 A1 | 8/2007 | Mebruer | 705/14 |
| 2007/0260521 A1 | 11/2007 | Van Der Riet | 705/14 |
| 2008/0004888 A1 | 1/2008 | Davis et al. | 705/1 |
| 2008/0011825 A1 | 1/2008 | Giordano et al. | |
| 2008/0070572 A1 | 3/2008 | Shkedi | 455/435.1 |
| 2008/0074264 A1 | 3/2008 | Sharpe et al. | 340/572.1 |
| 2008/0097844 A1 | 4/2008 | Hsu et al. | 705/14 |
| 2008/0143482 A1 | 6/2008 | Shoarinejad et al. | 340/10.1 |
| 2008/0153478 A1 | 6/2008 | Walter | 455/422.1 |
| 2008/0243626 A1 | 10/2008 | Stawar et al. | 705/23 |
| 2008/0270249 A1 | 10/2008 | Rosenbaum et al. | 705/26 |
| 2008/0306820 A1* | 12/2008 | Passmore | 705/14 |
| 2009/0088203 A1 | 4/2009 | Havens et al. | 455/556.1 |
| 2009/0096628 A1 | 4/2009 | Moscovitch | 340/691.6 |
| 2009/0111484 A1 | 4/2009 | Koch et al. | 455/456.1 |
| 2009/0177536 A1 | 7/2009 | Alexander et al. | 705/14 |
| 2009/0177540 A1 | 7/2009 | Quatse | 705/14 |
| 2009/0265220 A1 | 10/2009 | Bayraktar et al. | 705/10 |
| 2009/0281895 A1 | 11/2009 | Selinger et al. | 705/14.43 |
| 2009/0286553 A1 | 11/2009 | Northway et al. | 455/456.3 |
| 2009/0299857 A1 | 12/2009 | Brubaker | 705/14.66 |
| 2010/0125495 A1 | 5/2010 | Smith et al. | 705/14.23 |
| 2010/0198678 A1 | 8/2010 | Burst et al. | 705/14.39 |
| 2011/0029355 A1 | 2/2011 | Hann | 705/14.1 |
| 2011/0029362 A1* | 2/2011 | Roeding et al. | 705/14.13 |
| 2011/0040625 A1 | 2/2011 | Woodruff et al. | 705/14.58 |
| 2011/0047017 A1 | 2/2011 | Lieblang et al. | 705/14.13 |
| 2011/0047023 A1* | 2/2011 | Lieblang et al. | 705/14.36 |
| 2011/0191237 A1 | 8/2011 | Faith et al. | 705/39 |
| 2011/0231242 A1 | 9/2011 | Dilling et al. | 705/14.42 |

(56) References Cited

U.S. PATENT DOCUMENTS

| | | | |
|---|---|---|---|
| 2011/0231253 A1 | 9/2011 | Crawford et al. | 705/14.49 |
| 2011/0251880 A1* | 10/2011 | Butler et al. | 705/14.13 |
| 2012/0022930 A1 | 1/2012 | Brouhard | 705/14.22 |
| 2012/0022944 A1 | 1/2012 | Volpi | 705/14.53 |
| 2012/0089461 A1* | 4/2012 | Greenspan | 705/14.58 |
| 2012/0215610 A1* | 8/2012 | Amaro et al. | 705/14.23 |
| 2013/0003575 A1 | 1/2013 | Konishi et al. | 370/252 |
| 2013/0030901 A1 | 1/2013 | Eichstaedt et al. | 705/14.26 |
| 2013/0275217 A1 | 10/2013 | Ramchandani | 705/14.53 |
| 2013/0290096 A1 | 10/2013 | Lizotte, III | 705/14.45 |
| 2014/0122114 A1 | 5/2014 | Wesley | 705/2 |
| 2014/0244207 A1 | 8/2014 | Hicks | 702/150 |
| 2014/0330631 A1 | 11/2014 | Wesley | |
| 2016/0110753 A1 | 4/2016 | Wesley | |

FOREIGN PATENT DOCUMENTS

| | | |
|---|---|---|
| JP | 2003-515228 A | 4/2003 |
| JP | 2003-196529 A | 7/2003 |
| JP | 2005-215846 A | 8/2005 |
| JP | 2006-209280 A | 8/2006 |
| JP | 2008-191905 A | 8/2008 |
| JP | 2009-510610 A | 3/2009 |
| JP | 2009-69985 | 4/2009 |
| JP | 2010-061544 A | 3/2010 |
| JP | 2010-066911 A | 3/2010 |
| JP | 2012-507787 A | 3/2012 |
| WO | WO 98/34203 | 8/1998 |
| WO | WO 99/33034 | 7/1999 |
| WO | WO 02/13552 | 2/2002 |
| WO | WO 02/080121 | 10/2002 |
| WO | WO-2010/062367 A1 | 6/2010 |
| WO | WO 2013/009989 | 1/2013 |
| WO | WO 2013/033540 | 3/2013 |

OTHER PUBLICATIONS

International Search Report issued for PCT/US03/33591, dated Jun. 13, 2005, 5 pages.

International Search Report issued for PCT/US03/33432, dated Jun. 16, 2004, 1 page.

European Search Report issued for EP 05253915.2 dated Sep. 1, 2005, 3 pages.

European Search Report issued for EP 03777779.4 dated Mar. 29, 2006, 4 pages.

European Examination Report issued for EP 03809623.6 dated Aug. 3, 2006, 4 pages.

International Preliminary Report on Patentability mailed Aug. 20, 2014 in corresponding International Patent Application No. PCT/US2012/046478, 10 pages.

Coleman-Lochner, Lauren, "Handheld Tech Devices Have Future as Commerce Tool", Publication Date: Mar. 5, 2001, http://www.accessmylibrary.com, Jan. 5, 2009, pp. 1-3.

Chain Drug Review, Tracking the Impact of Promotional Displays, (Technology), (Radio-Frequency Identification from Chicago-Based Goliath Solutions), Apr. 7, 2003, p. 1.

CBS News, "Shopping Carts with Brains", Kingston, Mass., Aug. 12, 2003, www.CBSNews.com, p. 1.

Ewald, Marie, "'Paper or Plastic' is Now Computer or Cashier", The Christian Science Monitor, Apr. 19, 2004, www.csmonitor.com, pp. 1-2.

European Retail Digest, "Personal Shopping Assistant Finds Favour in German Retail Market", Publication Date: Sep. 22, 2004, www.accessmylibrary.com, Jan. 5, 2009, pp. 1-4.

ABC News, "Supermarkets Go High-Tech to Get Shoppers to Spend, TV Carts, Babysitting, Electronic Shopping Buddies and More", Aug. 17, 2006, pp. 1-2.

Neff, Jack, Advertising Age, "A Shopping-Cart-Ad Plan that Might Actually Work: MediaCart Launches Pilot Program in Northeast as Retailers Express Interest (News)", publication date: Feb. 5, 2007, www.accessmylibrary.com, Jan. 5, 2009, pp. 1-2.

Press Release, Radical Computing Corporation, "Radical Computing Unveils Platform for 1-to-1 In-Store Marketing", Jan. 8, 2008, www.PR.com, pp. 1-2.

International Search Report and Written Opinion issued for PCT application PCT/US2007/072757, dated Jan. 28, 2008, 10 pages.

U.S. Appl. No. 10/646,579, filed Aug. 22, 2003, Bam et al., 48 pages.

U.S. Appl. No. 10/877,093, filed Jun. 25, 2004, Bam et al.

U.S. Appl. No. 10/691,459, filed Oct. 22, 2003, Bam et al., 36 pages.

U.S. Appl. No. 60/420,642, filed Oct. 23, 2002, Bam, 18 pages.

U.S. Appl. No. 60/420,643, filed Oct. 23, 2002, Bam, 14 pages.

Definition of Server from www.soft.com/eValid/Products/Documentation .7/Technical/definitions.html, http://www.google.com/search?sourceid=navclient&aq=t&ie=UTF-8&rls=GGLD, GGLD:2004-30,GGLD:en%q=define%3a+server, downloaded Oct. 14, 2008, 3 pages.

Japanese Office Action mailed Aug. 2, 2016, which issued in Japanese Application No. 2014-520327, together with English language translation.

Japanese Office Action mailed Jul. 26, 2016, which issued in Japanese Application No. 2014-528640, together with English language translation.

Yashima, Ultimate Selection of 42 must-have iPhone Apps ranging from productivity and photo Apps to entertainment Apps by Editors of Weekly ACSCII!, Weekly ASCII, issued on Jan. 19, 2010, Japan ASCII Media Works, Jan. 4, 2010, vol. 22, No. 767, pp. 72-77, together with partial English language translation.

Linkup Co Ltd., "Android App Super Bible," Socym Col., Ltd. Apr. 7, 2011, 1$^{st}$ Ed, p. 301.

Japanese Office Action from Japanese Patent Application No. 2014-528640, dated Apr. 4, 2017.

Japanese Notice of Allowance from Japanese Patent Application No. 2014-528640, dated Sep. 12, 2017.

* cited by examiner

SYSTEM AND METHOD OF A MEDIA DELIVERY SERVICES PLATFORM FOR TARGETING CONSUMERS IN REAL TIME

CROSS-REFERENCE

The present application hereby incorporates by reference herein the disclosure of U.S. patent application Ser. No. 10/691,459, filed Oct. 22, 2003, which claims priority to Provisional Patent Application Ser. No. 60/420,642, filed Oct. 23, 2002, the disclosure of which is also hereby incorporated herein by reference.

The present application is also hereby incorporates by reference herein the disclosure of U.S. patent application Ser. No. 11/209,862, filed Aug. 23, 2005.

The present application also hereby incorporates by reference herein the disclosure of U.S. patent application Ser. No. 11/486,707, filed Jul. 14, 2006.

The present application also hereby incorporates by reference herein the disclosure of U.S. patent application Ser. No. 12/195,209, filed Aug. 20, 2008.

The present application also hereby incorporates by reference herein the disclosure of U.S. patent application Ser. No. 13/181,049, filed Jul. 12, 2011.

TECHNICAL FIELD

The present invention relates to mobile shopping and mobile payment.

BACKGROUND OF THE INVENTION

Given a choice of similar providers, consumers tend to patronize the merchant that provides the consumer more value for the same price, or the same value at a lower price. To influence a consumer's choice of provider, merchants often provide promotions, for example coupons, regarding goods such as groceries, consumer electronics, clothing, and other items that may be purchased in person, over the phone, or electronically. In this context, a coupon is a promotion used as a tool by merchants to encourage sales, usually by lowering the price in some manner. For example, a coupon could be used for a discount on the product, to give the consumer a larger quantity (for example, 2 for 1) of a product or service, or a discount on a related product or future purchase. A coupon could also be used to credit purchases made by one person against a certain account. Thus, a school could get credits (money or otherwise) for purchases made by any one of a number of people having affinity to the school (affinity groups). The possibilities for coupon usage are essentially unlimited.

Coupons and other promotions are often used by merchants as marketing tools designed and developed to encourage a change in purchase behavior, retain valued consumers and to induce repeat purchases. Traditional promotions have been paper based, and usually have a cash or material purchase value, such as prepaid gift cards. Rather than be directed toward a single product, they may be an incentive to buy accessories with a particular item, or promotions may even be promotional offers to sell. Overall, promotions serve to attract consumers to a store, to a particular product or brand in a store, as well as bring attention to new products and keep track of an individual consumer's buying habits.

SUMMARY OF THE INVENTION

Embodiments of the present invention are directed to an electronic promotion system that includes software to produce electronic promotions in various formats (graphic or non-graphic). In one embodiment, electronic coupons are sent to targeted consumers on consumer's mobile electronic devices or web portal accounts. The coupons may be voice based, text based, or graphics based, and can be tailored to a specific consumer's profile. The coupons received can then be redeemed by the consumer in various ways depending on the coupon, provider, merchant, and/or point of sale location. The electronic coupons may also be electronically saved by both the consumer and the merchant to designated coupon saving accounts for later use. The coupon account can be located on a consumer's mobile electronic device, or it may be located on a remote server.

When a consumer encounters a point of sale (POS) location, the consumer's electronic coupons can be automatically redeemed by reading them from the saved location. At the time of redemption, the coupon can be matched with the purchased items, the expiration date, and other relevant information.

In one embodiment, the coupons can be assigned to accounts linked to specific consumers based on an identification of the consumer's mobile device. The coupons may also be linked to the inventory control or accounting systems of the providing merchants for balancing accounts. Coupons saved by the merchant can be integrated with marketing tools and data analysis tools to monitor redemption rates or to create new coupons based on redemption profiles. Merchants may further monitor the individual redemption of specific consumers.

In an aspect, a media targeting system for managing media targeted to a consumer across a plurality of promotion channels utilized for advertisement and promotion of products may include a media coordination system, the media coordination system channeling the media available to the plurality of channels through a single path, a real-time conflict resolution system that identifies a conflict in delivery of the media to the consumer in a predefined manner at the moment of delivery, and a set of rules, the set of rules defining the predefined manner to avoid conflict in the delivery of the media. The predefined manner comprises preventing from being shown to the consumer, across the plurality of channels, at least one of multiple instances of an offer, multiple offers for the same product, multiple offers for products from a particular category, offers from competing brands, and offers from a retailer if the same product is being promoted through channels controlled by a vendor. The media may include one or more of a promotion, an offer, an advertisement, and a discount. The plurality of channels may include at least one of a printer at checkout, a text message, a voice message, a printed coupon, a touch point, a mobile device, a website, an overhead screen, a retail mobile computer, a kiosk, a load-to-card offer, a digital coupon, a scan-and-bag facility, and an email. The media coordination system may be a cross-channel media coordination system configured to manage media across two or more channels of the plurality of channels allowing optimization of the plurality of channels. The rules may relate to at least one of a consumer purchase history, a consumer preference, a consumer age and sex, a consumer behavior, a consumer brand association, a consumer location, a consumer interest, a consumer strategy, a touchpoint used by the consumer, a product scanned during a shopping trip, a past shopping behavior, a past product purchased, an in-store location, an item scanned, a product in an online shopping cart, a coupon or offer redeemed, an offer or coupon in an offer wallet, a loyalty card scanned, an item added to a list, items added to a list via a recipe, and a location identified by a QR code, and a coupon or offer previously presented to the consumer. The media may be assigned to the consumer.

In an aspect, a method for targeting a consumer for delivery of media across a plurality of promotion channels utilized for advertisement and promotion of products may include channeling the media available to the plurality of channels through a single path, and applying a rule in the real-time targeting of the consumer through one or more channels of the plurality of channels in order to avoid the media conflict. The rule may be aimed at preventing from being shown to the consumer, across the plurality of channels, multiple instances of an offer, multiple offers for the same product, offers from competing brands, multiple offers for products from a particular category and offers from a retailer if the same product is being promoted through channels controlled by a vendor. The media may include one or more of a promotion, an offer, an advertisement, and a discount. The plurality of channels may include one or more of a printer at checkout, a text message, a voice message, a printed coupon, a touch point, a mobile device, a website, an overhead screen, a retail mobile computer, a load-to-card offer, a kiosk, a digital coupon, a scan-and-bag facility, and an email. The rules may relate to at least one of a consumer purchase history, a consumer preference, a consumer age and sex, a consumer behavior, a consumer brand association, a consumer location, a consumer interest, a consumer strategy, a touchpoint used by the consumer, a product scanned during a shopping trip, a past shopping behavior, a past product purchased, an in-store location, an item scanned, a product in an online shopping cart, a coupon or offer redeemed, an offer or coupon in an offer wallet, a loyalty card scanned, an item added to a list, items added to a list via a recipe, and a location identified by a QR code, and a coupon or offer previously presented to the consumer.

In an aspect, a system for providing media in real-time to a consumer in a retail store may include a scan-and-bag facility configured to scan or image an identifier of a product in a retail store, the scan-and-bag facility including a sensor that identifies its location, a processor of the scan-and-bag facility that analyzes at least one of a product identifier scanned or imaged and a location of the scan-and-bag facility to determine a current shopping behavior, a rules database that assigns at least one real time consumer trait to the user based on at least one of the current shopping behavior, a past shopping behavior, and an activity external to the retail store, and a trait inclusion facility communicatively coupled with the scan-and-bag facility, the trait inclusion facility configured to target the media in real-time through the scan-and-bag facility to the consumer based on the at least one real time consumer trait. At least one real time consumer trait is updated according to a plurality of trips of the consumer to the retail store. At least one real time consumer trait expires on a pre-set date. At least one real time consumer trait based on the activity external to the retail store is updated periodically. The rules database nay include real time trait definitions capable of relating a product to a type of promotion. The system may further include a transmitting facility communicatively coupled to the scan-and-bag facility and capable of sending a total cost of the scanned or imaged product identifier to a point of sale (POS) facility in the retail store. The transmitting facility is activated automatically on scanning or imaging the product identifier. The transmitting facility is activated by the consumer by at least one of pressing a key, scanning a barcode, a verbal command, and powering down the scan-and-bag facility. The current or past shopping behavior is contextually derived.

In an aspect, a system for providing media in real-time to a consumer in a retail store may include a promotion channel configured to deliver media to a consumer, a processor that analyzes at least one of a product-related event and a current location of the user to determine a current shopping behavior, a rules database that assigns at least one real time consumer trait to the user based on at least one of the current shopping behavior, a past shopping behavior, the location of the consumer, and an activity external to the retail store, and a trait inclusion facility communicatively coupled with the promotion channel, the trait inclusion facility configured to target the media in real-time to the consumer through the promotion channel based on the at least one real time consumer trait. At least one real time consumer trait is updated according to a plurality of trips of the consumer to the retail store. At least one real time consumer trait expires on a pre-set date. The at least one real time consumer trait based on the activity external to the retail store is updated periodically. The rules database may include real time trait definitions capable of relating a product to a type of promotion. The promotion channel may be configured to scan or image an identifier of a product in a retail store. The system may further include a transmitting facility communicatively coupled to the promotion channel and capable of sending a total cost of a scanned or imaged product identifier to a point of sale (POS) facility in the retail store. The transmitting facility may be activated automatically on scanning or imaging the product identifier. The transmitting facility may be activated by the consumer by at least one of pressing a key, scanning a barcode, a verbal command, and powering down the scan-and-bag facility. The promotion channel may include a sensor that identifies its location. The current or past shopping behavior may be contextually derived. The promotion channel may include at least one of a printer at checkout, a text message, a voice message, a printed coupon, a touch point, a mobile device, a website, an overhead screen, a retail mobile computer, a kiosk, a load-to-card offer, a digital coupon, a scan-and-bag facility, and an email.

In an aspect, a system for providing an offer in real-time to a consumer in a retail store, the system may include a scan-and-bag facility configured to scan or image a product identifier in the retail store, a rules database that instantaneously assigns at least one real time consumer trait to the user based on the scanned or imaged product identifier, and a trait inclusion facility communicatively coupled with the scanning facility, the trait inclusion facility configured to provide the offer in real-time to the consumer based on the at least one real time consumer trait. The rules database may include real time trait definitions capable of relating a product to a type of promotion. The system may further include a transmitting facility communicatively coupled to the scan-and-bag facility and capable of sending a total cost of the scanned or imaged product identifier to a point of sale (POS) facility in the retail store. The transmitting facility may be activated automatically on scanning or imaging the product identifier. The transmitting facility may be activated by the consumer by at least one of pressing a key, scanning a barcode, scanning a loyalty card, a verbal command, and powering down the scan-and-bag facility.

In an aspect, a method of making a mobile-initiated payment for a product from a retail establishment may include receiving a scan or image of a product identifier from a consumer's mobile device, accessing a price for the product based on the product identifier, transmitting the price to the mobile device, receiving an indication from the mobile device to purchase the product, verifying that the consumer has registered to make mobile-initiated payments, wherein registering includes associating a form of tender with the mobile device and an authorization code, instructing the consumer to enter the authorization code on at least one of the mobile device and a POS payment device, wherein upon entering the authorization code, payment is tendered from the form of tender registered by the consumer, and transmitting to the mobile device a purchase confirmation indicating that the product has been purchased from by the consumer.

In an aspect, a method of sharing an offer with a social network may include presenting a shareable offer to a consumer in an application associated with a media targeting system, wherein the media is targeted to the consumer by the media targeting system, allowing the consumer to post the shareable offer to a consumer's social network wall registered with the media targeting system, wherein the shareable offer is posted as a link uniquely identifying the offer, who shared it, and at what retailer it is available, allowing a user of the social network to store the offer when the user selects the link for the sharable offer and associates a loyalty card with the shareable offer, and redeeming the shareable offer when the user uses the loyalty card at a retailer touchpoint.

In an aspect, a system for providing an offer in real-time to a consumer in a retail store, the system may include a scan-and-bag facility configured to scan and image a product identifier in the retail store, the scan-and-bag facility including a sensor that identifies its location, a processor that analyzes at least one of the product identifier scanned or imaged and determines a current shopping behavior, a location-tracking facility that matches signal strength information emitted by an access point and transmitted by the sensor to a zone within the retail store to determine a real time location of the consumer in the retail store, a rules database that assigns at least one real time consumer trait to the user based on at least one of the current shopping behavior, a past shopping behavior, the real time location in the retail store, and an activity external to the retail store, and a trait inclusion facility communicatively coupled with the scan-and-bag facility, the trait inclusion facility configured to provide the offer in real-time to the consumer based on the at least one real time consumer trait. The at least one real time consumer trait may be updated according to a plurality of trips of the consumer to the retail store. The at least one real time consumer trait expires on a pre-set date. The at least one real time consumer trait based on the activity external to the retail store is updated periodically. The rules database comprises real time trait definitions capable of relating a product to a type of promotion. The system may further include a transmitting facility communicatively coupled to the scan-and-bag facility and capable of sending a total cost of the purchased products to a point of sale (POS) facility in the retail store. The transmitting facility may be activated automatically on scanning or imaging the product identifier. The transmitting facility may be activated by at least one of pressing a key, scanning a barcode, a verbal command, and powering down the scan-and-bag facility.

In an aspect, a system for providing a promotional offer in real-time to a consumer in a retail store may include a scan-and-bag facility configured to scan or image a product identifier purchased by the consumer in the retail store, the scan-and-bag facility including a sensor that identifies its location, a processor that analyzes the product identifier scanned or imaged and determines a current shopping behavior, a rules database that assigns at least one real time consumer trait to the user based on at least one of the current shopping behavior, a past shopping behavior, and an activity external to the retail store, a trait inclusion facility communicatively coupled with the scan-and-bag facility, the trait inclusion facility configured to generate a promotional offer in real-time for the consumer based on the at least one real time consumer trait and apply the promotional offer to a purchase made using the scan-and-bag facility.

In an aspect, a method for targeting a consumer for delivery of media across a plurality of promotion channels utilized for advertisement and promotion of products may include logging a consumer into a retail system when a retail host device becomes aware of the presence of the consumer's mobile device within a physical boundary of the retail store controlled by the host device, allowing the consumer to conduct a plurality of transactional interactions pertaining to the host device using the mobile device while the user is within the physical boundary, and ensuring avoidance of a media conflict in delivery of promotional media to the mobile device by applying rules in the targeting of the consumer, wherein the rules are aimed at preventing from being shown to the consumer, across the plurality of channels, multiple instances of an offer, multiple offers for the same product, offers from competing brands, multiple offers for products from a particular category and offers from a retailer if the same product is being promoted through channels controlled by a vendor. The media may include one or more of a promotion, an offer, an advertisement, and a discount. The method may further include applying at least one of the promotion, offer, or discount to a purchase made using the mobile device.

In an aspect, a method may include channeling promotional media available to a plurality of promotion channels through a single path, applying a rule in the targeting of a consumer through one or more channels of the plurality of promotion channels in order to avoid a conflict in the delivery of the promotional media, wherein the rule is aimed at preventing from being shown to the consumer, across the plurality of channels, multiple instances of an offer, multiple offers for the same product, offers from competing brands, multiple offers for products from a particular category and offers from a retailer if the same product is being promoted through channels controlled by a vendor, targeting the consumer with a shareable offer, allowing the consumer to post the shareable offer to a consumer's social network wall, wherein the shareable offer is posted as a link uniquely identifying the offer, who shared it, and at what retailer it is available, allowing a user of the social network to store the offer when the user selects the link for the sharable offer and associates at least one of a loyalty card and an identifier of a mobile phone with the shareable offer, and redeeming the shareable offer when the user uses the loyalty card or the mobile phone at a retailer touchpoint.

In an aspect, a method may include presenting a shareable offer on a first mobile device of a first consumer in an application associated with a media targeting system, wherein the shareable offer is targeted to the first consumer by the media targeting system, allowing the first consumer to transfer the shareable offer to a second mobile device of a second consumer, wherein the first mobile device and the second mobile device are bumped to transfer the shareable offer, allowing the second consumer to store the shareable offer received after bumping and associate a loyalty card with the stored offer, and redeeming the shareable offer when the second consumer uses the loyalty card at a retailer touchpoint. The shareable offer may be transferred outside a retail store. The shareable offer may be transferred inside a retail store. The first consumer may be targeted based on a loyalty card of the first consumer. The first consumer may be targeted based on a behavioral trait of the first consumer. The method may further include allowing the second consumer to store the offer in a digital offer wallet.

In an aspect, a method includes channeling promotional media available to a plurality of promotion channels through a single processing path, applying a rule in targeting a first consumer through one or more channels of the plurality of promotion channels in order to avoid a conflict in the delivery of the promotional media wherein the rule is aimed at preventing from being shown to the first consumer, across the plurality of channels, offers that conflict with each other, targeting a first mobile device of the first consumer with a shareable offer, and allowing the first consumer to transfer the shareable offer to a second mobile device of a second consumer, wherein the first mobile device and the second mobile device are bumped to transfer the shareable offer. The conflict may involve at least one of multiple instances of an offer, multiple offers for the same product, offers from competing brands, multiple offers for products from a particular category and offers from a retailer if the same product is being promoted through channels controlled by a vendor. The method may further include allowing the second consumer to store the shareable offer received after bumping and associate a loyalty card with the shareable offer and redeeming the shareable offer when the second consumer uses the loyalty card at a retailer touchpoint.

These and other systems, methods, objects, features, and advantages of the present invention will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

For a more complete understanding of the present invention, reference is now made to the following descriptions taken in conjunction with the accompanying drawing, in which.

DETAILED DESCRIPTION OF THE PREFERRED EMBODIMENT(S)

Figure 1:
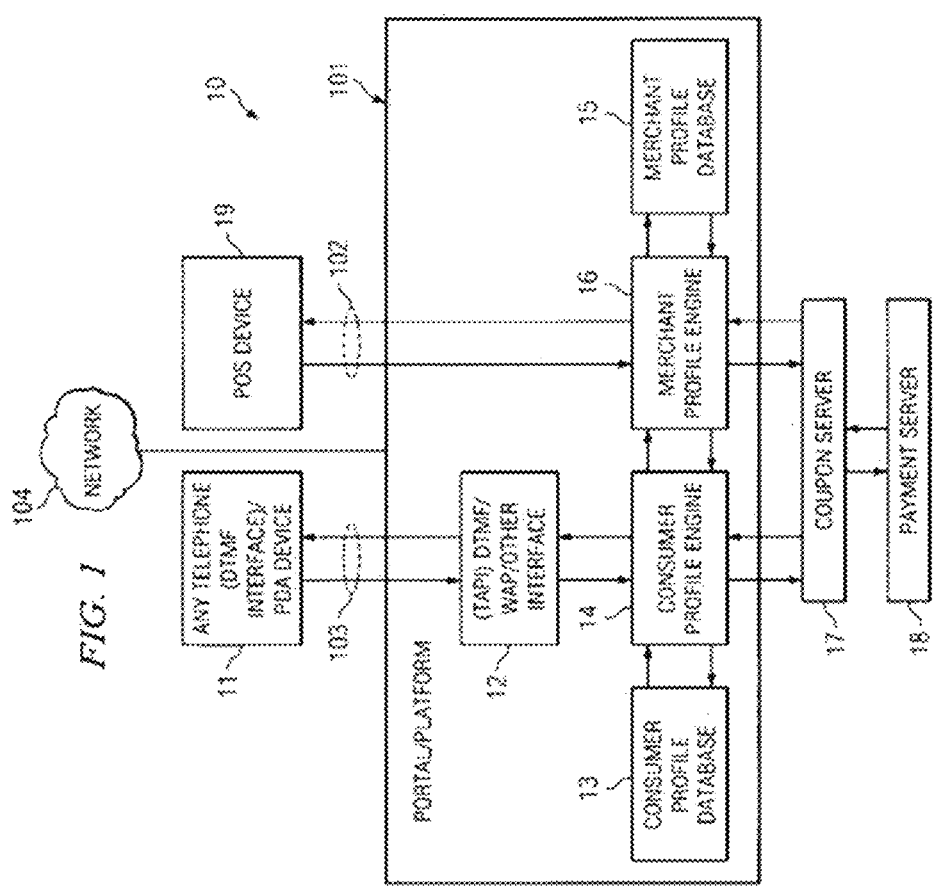
FIG. 1 illustrates one embodiment of an electronic promotion system.

FIG. 1 illustrates one embodiment of system 10 for providing electronic promotions. The embodiments of the present invention are not limited to anyone type of promotion, and thus may use coupons, discounts, alerts, offers to sell goods or services, or other similar promotion. The embodiment of FIG. 1 has been illustrated and described as distributing coupons, but may be readily adapted for any promotion. Electronic device 11 can be any electronic device commonly used by a consumer, including but not limited to, land based or cellular telephones, computers, personal digital assistants (PDA's), pocket organizers, or other similar devices capable of receiving and/or sending data through an appropriate commercial or private transmission network 103, whether wireless, wireline, or a combination thereof.

Using the example of a cellular telephone, the depicted embodiment can use a dual tone multi-frequency (DTMF) system that allows consumers to access the couponing system via the touchtone keys on their mobile phone. The embodiments of the present invention are not limited to DTMF type systems, but rather may be easily adapted to a wireless application protocol (WAP) client, Bluetooth technology, RFID, or any other technology for enabling the transaction. When a consumer uses device 11 to conduct a payment transaction over a mobile phone (or other mobile electronic device), system 10 uses telephony application program interface (TAPI) 12, which detects the DTMF touchtones. Rather than touchtones, device 11 may alternatively receive and/or generate text messages formatted in a pre-defined language. For example, text message "coupon now clothes from XYZ" could mean that the consumer using the electronic device is requesting a coupon for clothes from XYZ for use at a merchant, today.

System 10 may also incorporate one or more types of security levels to identify a consumer, including but not limited to, equipment ID, caller ID and/or a unique consumer pin number. Wireless standards in the United States associate one telephone number with one mobile phone, thereby allowing system 100 to identify the end consumer via the unique telephone number. Other secure identification methods, such as biometrics, voice recognition, or other client based secure methods may also be used.

In FIG. 1, platform 101 includes device interface 12, consumer profile database 13, merchant profile database 15, consumer engine 14, and merchant engine 16. Platform 101, in the embodiment shown, may use XML or similar technology, along with one of the many API's (Application Program Interfaces) currently available in the market, that will allow platform 101 to communicate to any device. Platform 101 may also provide a web interface, for example, network 104, where end users and merchants can access and manage their respective account.

Device interface 12 is the gateway for receiving voice or text messages from device 11 and directs the messages to consumer engine 14, which can further access the consumer's profile from consumer profile database 13. Device interface 12 also converts incoming voice messages into a text based message to be forwarded to consumer profile engine 16. The text based messages may be in any appropriate language format such as XML, C++, Java, or the like.

Consumer profile engine 14 interprets all incoming messages and directs them to merchant profile database 15, coupon server 17, or payment server 18. Consumer profile database 13 stores all consumer related information including, but not limited to, transactions, loyalty program information, coupons, as well as pre and post redemption information for each consumer.

A voice or a text message may be received from any device, in any format, such as the text message "coupon now clothes from XYZ" sent from device 11. If the request is for a coupon, then a request for a coupon is tagged with consumer information from consumer profile database 13 and sent by consumer profile engine 14 to coupon server 17. If the message is for the redemption of a coupon, then the coupon is tagged with information about the requester and saved into consumer profile database 13 for any current or future use by the consumer, and, if desired, by the merchant.

Merchant profile engine 16 provides access to merchant profile database 15 containing information about each merchant and its respective transactions. Merchant profile database 15 contains information about each merchant's loyalty programs, coupon programs, and rewards. Merchant profile database 15 stores the information about a merchant, including its profiles, transactions, marketing information and loyalty program rules. When a new promotion is sent to a consumer, data pertaining thereto is registered with the database. Merchant profile database 15 is then accessed through merchant profile engine 14 by coupon server 17 as needed to receive, send, or process coupons. Merchant profile engine 16 can query merchant profile database 15 to determine the loyalty rules, and other established parameters for each merchant.

Coupon server 17, as an example promotion distributing processor, holds the logic to process coupons, receive coupons, or send coupons. Coupon server 17, upon receipt of a coupon request either to send, redeem, or simply search for information pertaining to a coupon, processes the request based on logic defined in coupon server 17, and acts as a gateway for coupon logic. The request for a new coupon may contain information regarding the requester, the merchant, date, or other specifics. This request is processed under the direction of coupon server 17, and in cooperation with engines 14 and 16 to generate a coupon based on the request. To generate the coupon, coupon server 17 may query merchant profile engine 16 to retrieve specific merchant based coupon information from merchant profile database 15. Coupon server 17 may also query consumer profile engine 14 to retrieve consumer based coupon information from consumer profile database 13. Other databases may also be queried as necessary. The generated coupon is then sent back to consumer profile engine 14 to be forwarded to interface 12 for delivery to device 11. Depending on the type of request, the coupon may be sent in a voice format, SMS format, or MMS format, or a combination thereof.

If the request is to redeem a coupon, then the coupon characteristics are matched with payment information to apply the appropriate logic for redemption. The redemption logic is based on the merchant's profile, coupon information, and consumer profile obtained, as discussed above. A redemption may be a free purchase, a reduction in price, an auxiliary purchase, or any other promotion as defined for the redeemed coupon. If the request was a redemption, then the post redemption message is sent back to device 11 and to merchant profile database 15, and, if desired, to consumer database 13.

Transactions processed by system 10 also be further processed by one or more of the checking (ACH)/ATM/Debit/Credit card or other transaction networks and this is accomplished through server 18. Depending on the type of transaction, the payment data is routed to the appropriate processing entities, and may require system 10 to request payment based information from the consumer.

After a promotion has been redeemed and all the loyalty program rules have been applied, the total dollar amount is sent to payment server 18 for processing. An ACH is a secure electronic fund transfer system that connects financial institutions. The ACH network acts as the central clearing facility for Electronic Fund Transfer (EFT) transactions that occur nationwide. ATM debit and credit card transactions are sent to the appropriate banks for approval and clearing. These will be done through different ATM debit or credit networks, such as Cirrus, NYCE, Maestro, Visanet, etc.

When device 11 is mobile, the user can process promotions at a POS terminal by calling up the desired promotion via the mobile device. If desired, this can be accomplished concurrently with payment control, as discussed in the above-identified patent application. System 10 may prompt the user to enter specific information regarding a POS (such as POS location ID) and/or specific information regarding the purchase. As further described in the above identified application, system 10 can offer consolidation, convenience, and management of multiple consumer reward programs in one place, such as a website, and further enables the use of promotional information at a physical or virtual location using any electronic device. The consumer's device may be wired or wireless and may operate through dial up or via GPRS, WIFI and/or other networks. Using a system like system 10, a consumer could register a new or existing payment and loyalty cards/accounts, such as checking or savings accounts, debit, credit or loyalty cards with a web portal at any POS or by calling a designated telephone number. Once the user connects with the portal, the user selects which card (or cards) he/she desires, which loyalty programs he/she is eligible for, and/or which stored value cards the user desires to link to his/her mobile payment account. Different cards and programs may be used in different stores, if desired.

Assuming a merchant (enterprise) has enabled system 10 to handle payments (or identification) any of that merchant's POS locations 19 can be used by a prospective recipient of goods/services. In one embodiment, the merchant can go on line and sign up and also each recipient, or prospective recipient, can go on-line (or otherwise sign up). In doing so, the recipient user goes to the web portal, signs up for payment methods and loyalty cards, and registers his/her existing payments and loyalty cards. The user can sign up for new cards at this or anytime, if so desired. All of the consumer's and merchant's specific data will be stored in a secure form on the respective database 13, 15. When a user uses the system, if that user is enrolled in a loyalty program, then system 10 can automatically arrange for the appropriate discounts before charging the consumer.

System 10 offers a set of tools that help merchants send out promotions, such as alerts, coupons, offer to sell, or any other similar promotion to their consumers thereby increasing the consumer-merchant intimacy. Communicating through the consumer's electronic devices, eliminates the need to use paper, lowers costs, and is time effective. When a consumer signs up for the payments and loyalty program via an embodiment of the present invention, that consumer may, through any enabled point of sale (virtual or physical), receive payments and loyalty programs. A merchant, such as XYZ is able to target a consumer directly on the consumer's electronic device based on that consumer's registered profile. A registered merchant may, if desired, be given access to consumer profile database 13. If, for example, XYZ chooses to send a 5% off coupon to all consumers who are open to receiving marketing material from XYZ, system 10 triggers an XYZ coupon to those consumers, via consumer profile engine 14 which searches consumer profile database 13 to find the appropriate consumers. The coupons may be triggered based on sex, age, prior purchase, economic profile, or any other aspects of a consumer profile.

The consumer receives the promotion on his/her electronic device via SMS, voice, or other appropriate format. Every promotion, for example, "5% off your next visit to XYZ by the end of the next month," may be characterized by, among other things, the message, start date, expiration date, sender, unique identification code (merchant or non-merchant specific), and offer. Once the promotion is received (either as a text message or a voice mail), it may be redeemed in various ways.

For SMS/Text messages, a promotion received on an electronic device can be redeemed by a consumer replying to the message or by the consumer forwarding the text message to coupon server 17. Upon reply, the promotion, say a coupon, is sent to coupon server 17 which recognizes the sender, the coupon code, and the merchant and registers it for redemption. Post redemption, the coupon may be stored on device 11 itself, and/or in a database, such as consumer profile database 13, for use at the time of making the actual transaction.

In one example, if merchant XYZ is running a promotional offer for tickets to a play, a message offering tickets is transmitted to the consumer's device. The consumer, by responding could select a date and book the tickets from device 11, if desired. When device 11 is wireless, the consumer could complete the transaction from anywhere in the world, provided he/she wirelessly connected to the system 10. Also, from time to time, a consumer could log on, for example, via network 102, to obtain promotion messages and, if desired, respond thereto. Such promotional offers are not limited to tickets, but may be for any good or service a merchant has available. The promotion may also take the form of an offer for sale of a good or service that is immediately purchasable by the consumer. The consumer may receive on his/her electronic device via, SMS, voice or other appropriate format an offer for 50% off the purchase of tickets to an upcoming show. The tickets may then be immediately purchasable by the consumer by replying to the promotion.

Embodiments such as system 10 may be used to distribute any promotion to targeted consumers, as well as generate and distribute promotions when consumers, who are not specifically targeted, request them. Rather than selecting specific consumers, a merchant may choose to advertise (using a bill board, radio, television, newspaper, or any other suitable method), prompting a requesting consumer to then contact system 10 for the promotional offer. The requesting consumer may be prompted to dial a phone number, send a test message, send an email, or use any other suitable contact method to request a coupon from system 10.

Figure 2:
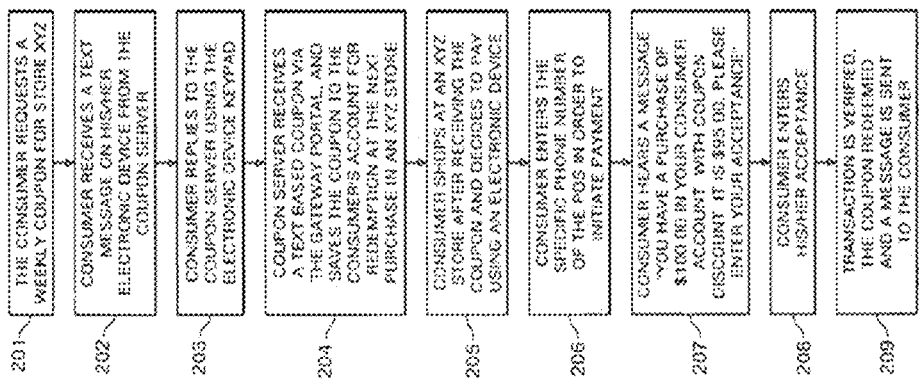
FIG. 2 illustrates an embodiment of a text based electronic promotion system.

FIG. 2 illustrates one method of electronic coupon redemption via text messaging according to an embodiment of the present invention. Although the depicted embodiment is illustrated and described using coupons, the method of FIG. 2 is readily adapted to any promotion type. In step 201, the consumer requests a weekly coupon for an XYZ store. In step 202, the consumer receives a text message on his/her electronic device from coupon server 17 indicating that the consumer has been sent a coupon based on merchant promotions, consumer request, and/or consumer profile. In step 203, the consumer replies to the coupon server using the electronic device keypad. In step 204, the coupon server receives a text based coupon (for example, using SMS) via system 10, and saves the coupon to the consumer's account for redemption at the next purchase in an XYZ store.

In step 205, the consumer shops at an XYZ store after receiving the coupon and decide to pay using an electronic device. In step 206, the consumer enters the specific phone number of the POS in order to initiate payment.

In step 207, the consumer hears a message, such as, for example, "You have a purchase of $100.00 in your consumer account. With coupon discount, this purchase will be is $95.00. Please accept the transaction." This acceptance can be verbal, or text based or numerically controlled using, if desired, a PIN number. In step 208, the consumer enters his/her acceptance (PIN or otherwise). In step 209, the transaction is verified, the coupon redeemed, and a message (text, voice, or numerical) is sent to the consumer. This message could be SMS controlled.

Figure 3:
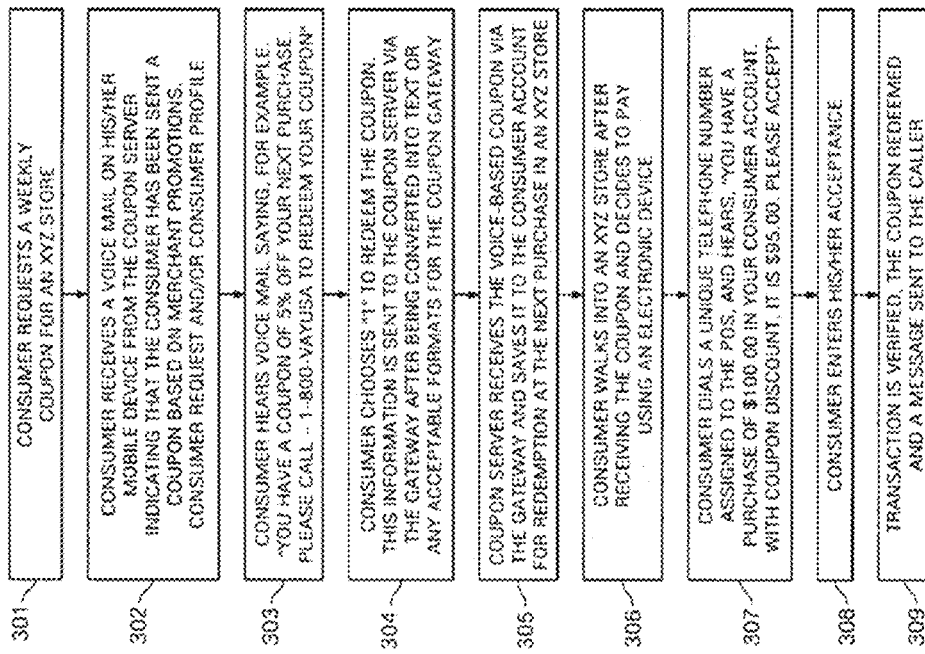
FIG. 3 illustrates an embodiment of an electronic voice based electronic promotion system.

A voice based promotion system may ask the consumer to dial an 800 number to redeem a coupon that, when accepted, is saved to the consumer's account and used at the time of payment. FIG. 3 illustrates a method of electronic coupon redemption via voice messaging according to an embodiment of present invention. Although the depicted embodiment is illustrated and described using coupons, the method of FIG. 3 is readily adapted to any promotion type. In step 301, the consumer requests a weekly coupon for an XYZ store. In step 302, the consumer receives a voice mail on his/her electronic device from the coupon server indicating that the consumer has been sent a coupon based on merchant promotions, consumer request and/or consumer profile.

In step 303, the consumer hears a voice mail saying, for example, "You have a coupon of 5% off your next purchase. Please call-1-800-xxx-xxxx to redeem your coupon." Upon dialing the number the consumer hears, "You have a coupon waiting for your next purchase at an XYZ store. Please push 1 to redeem the coupon, push 2 to delete the coupon, or push 3 to forward the coupon to a friend." In step 304, the consumer chooses 1 to redeem the coupon. In other embodiments, each promotion may have an identifying number that a consumer may enter to identify the promotion. The coupon is sent back to the coupon server via the gateway after being converted into text or any acceptable formats for the coupon gateway.

In step 305, the coupon server receives the voice-based coupon via the gateway and saves it to the consumer account for redemption at the next purchase in an XYZ store. In step 306, the consumer shops at an XYZ store after receiving the coupon and decides to pay using his/her electronic device.

In step 307, the consumer dials a unique telephone number assigned to the POS, or dials a server number and identifies the POS. The consumer, for example, hears "You have a purchase of $100.00 in your consumer account. With coupon discount, it is $95.00. Please accept." This can be done by entering a PIN or other acceptance method. In step 308, the consumer enters his/her acceptance, by using a PIN, or otherwise. In step 309, the transaction is verified, the coupon redeemed and a message is sent to the caller informing the caller of the transaction.

Figure 4:
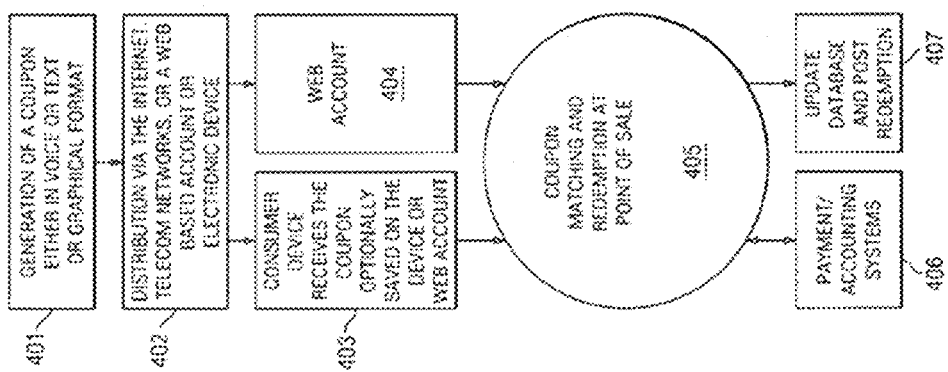
FIG. 4 illustrates an embodiment of an electronic promotion distribution and redemption system.

FIG. 4 illustrates a promotion distribution and redemption process in accordance with one embodiment. In process 401, the system generates a coupon in voice, text, or graphical format. This coupon is distributed, under control of process 402, to the consumer. This distribution can be via the web, or directly via a telephone network, or via the Internet. A consumer receives an electronic coupon on the consumer's electronic device 403, or on the consumer's web account 404. The coupon can be optionally saved on the device or in the consumer database at platform 101. The consumer may then redeem these coupons at a point of sale under process 405 when the consumer chooses to pay, process 406, through an appropriate system at process 407. The consumer databases are optimally updated.

Figure 5:
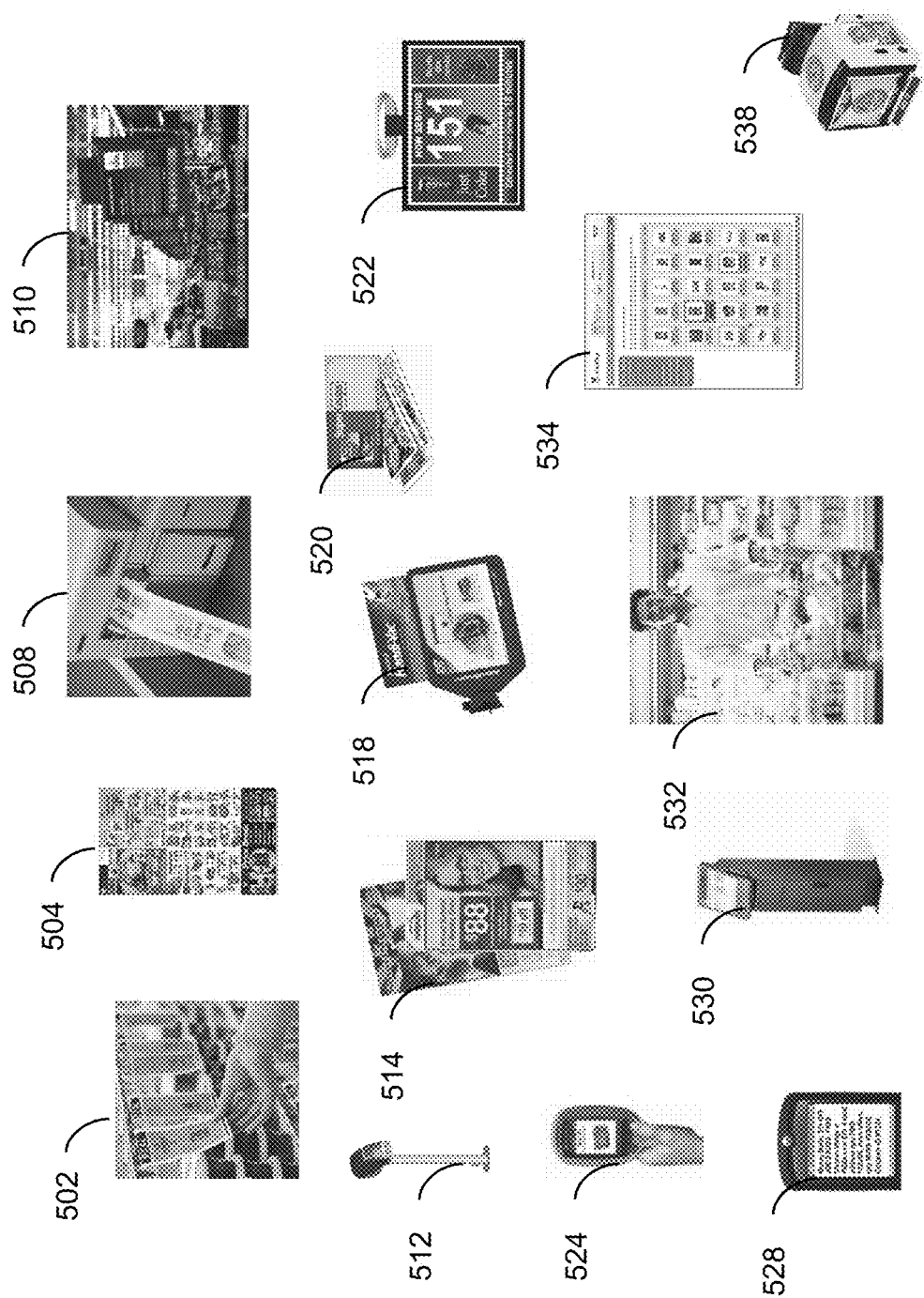
FIG. 5 depicts a plurality of promotion channels, in accordance with various embodiments of the present invention.

FIG. 5 depicts a plurality of promotion channels 500 such as promotion channels 502, 504, 508, 510, 512, 514, 518, 520, 522, 524, 528, 530, 532, and the like, in accordance with various embodiments of the present invention. The plurality of promotion channels 500 may hereafter be referred to as promotion channels 500 or channels 500 merely for simplicity of the description. The numerous promotion channels 500 may be utilized for advertisement and promotion of products using technologies such as in-store signage, queue number ticket printers, email, direct mail, coupon printers at checkout, text messages, voice messages, and the like. In accordance with various embodiments, the advertisements, promotions, and offers may be provided by a company manufacturing a product, or by a retailer. The methods of promotions may include discount coupons by the retailer or manufacturer or by a third party involved in promoting a brand of the product. A product may be promoted in the market by utilizing digital means such as advertisements on websites, emails and short messages, and the like through the various promotion channels 500.

A media delivery services platform 620 may comprise the system, processes and technology to (a) target, (b) arbitrate, and (c) analyze promotions delivered across multiple touchpoints, such as web, email, kiosk, in-store coupons, a scan-and-bag facility 1000, optionally a mobile shopping and payment application, and the like. Thus, the media delivery services platform 620 connects (a) retailers, (b) their loyalty partners, (c) brands, (d) agencies, and (e) aggregators to consumers in a multi-channel digital world to integrate personalized promotions, mobile self-scan, and instant checkout on consumers' mobile devices. The platform 620 enables an end-to-end solution optionally including, but not limited to, coupon sourcing, setup, consumer coordination, scan-and-bag, electronic clearing, reporting and analysis, shopping lists generation and implementation, and more. The platform 620 may take advantage of cloud computing to deploy various servers. Using the platform 620, retailers may engage consumers with promotions while they are shopping, thus responding to their activities which may or may not be tied with previously exhibited activities and customer purchase history or demographic data. Retailers may manage all touchpoints across the retail chain. Retailers may eliminate offer conflicts in and across trips and/or touchpoints over the course of a sales week. Retailers may be provided Load-to-Card capability. Using the platform 620, brands can target lift, not impressions and/or redemptions. Brands may be able to quantify ROI of delivered promotions, translate FSI coupons to digital in-store, cap issuances and redemptions at budget, and the like. Using the platform 620, consumers may be provided with a small, focused set of offers delivered based upon historical purchasing and behaviors exhibited during a shopping trip. Consumers may provided with an offer wallet 628 which follows consumer with qualifying coupons, so there is no forgetting. The offer wallet stores a consistent set of offers to deliver to the customer across all the supported digital touchpoints. Using the platform 620, advertising agencies and aggregators may be able to quantify performance due to the closed loop of offers and redemption tracking integrated with retailer purchase history data. Agencies and aggregators may take advantage of behavioral targeted coupons that deliver impressions at the point of decision. The platform 620 enables agencies and aggregators to aggregate issuances and redemptions across retailers and banners.

The media delivery service platform 620 delivers multiple, distinct promotions management and execution capabilities, such as Offer Wallet/e-wallet 628, Category Conflict Resolution 602, Measurement & Reporting 630, Analysis & Optimization 632, Billing & Clearing 622, Coordination with Promotions Calendar 604, Capping using a counter 624, Offer Aggregation, etc., which orchestrated together deliver an end-to-end, multi-touchpoint media solution.

The media delivery services platform 620 may provide a media management console 638 enforcing an end-to-end publishing process from a promoter, to a retailer, to a consumer, and back to the promoter. The media management console 638 controls all media data. The platform may enable iterative feedback and analysis for running programs back to brands, retailers, and agencies focused on meeting lift, issuance, and redemption targets. The platform 620 may enable a quick human response to execution issues such as missing UPCs for a product, sales support defining unique programs to meet promotional objectives, creative oversight ensuring clear consumer communication of offers, and the like.

The media delivery services platform 620 may be able to employ a standardized process to accept media from a wide array of sources including: directly from brands, agencies, aggregators, retailers, retailer CRM partners, and the like.

The media delivery services platform 620 may be able to employ a process for promoter onboarding package including feed formats, communication guide, and insertion order process tracking. The media delivery services platform 620 may be able to employ a process for creative management including distribution to multiple touchpoints.

Figure 6:
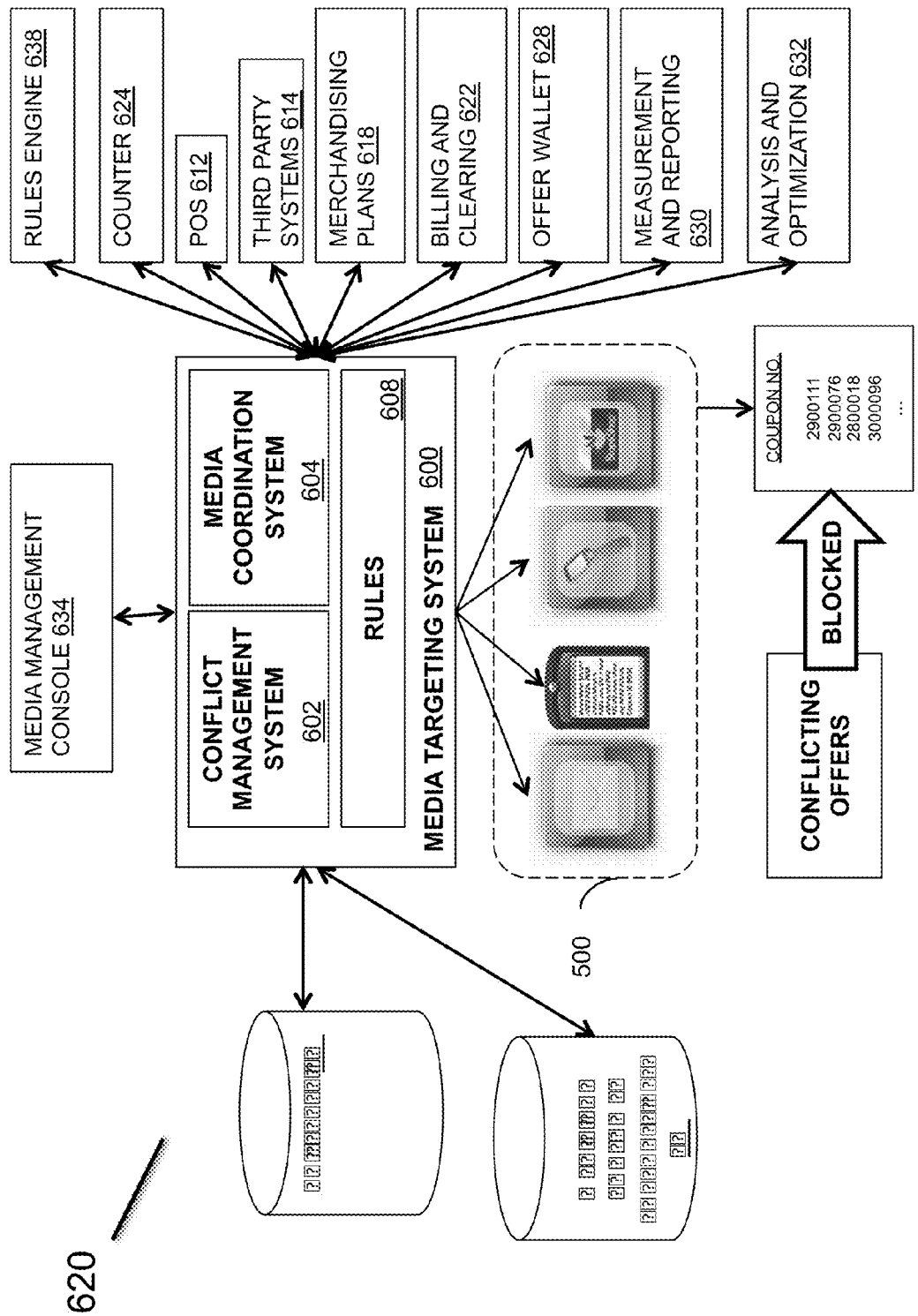
FIG. 6 illustrates a media targeting system configured to coordinate media and manage media conflicts, in accordance with various embodiments of the present invention.

FIG. 6 illustrates a media targeting system 600 configured to coordinate media and manage media conflicts, in accordance with various embodiments of the present invention. The media targeting system 600 may in near real-time arbitrate between all offers assigned to a particular user or available to the user via one or more channels to ensure that a consumer only receives non-conflicting offers during particular time periods. The media targeting system 600 may translate offers into a real-time, in-store loyalty environment including consumer real-time behavior assignment into traits. In an embodiment, the media coordination system 604 may then make a real-time offer assignment based on the traits.

The media targeting system 600 may also be referred to as a media traffic cop 600 interchangeably without limiting the spirit and scope of the present invention. The media targeting system 600 may include a conflict management system 602 and a media coordination system 604. A set of rules 608 may be maintained in the media targeting system 600 that may be processed and implemented by the media targeting system 600 for managing, coordinating media, and avoiding conflicts with media such as advertisements, offers, promotions, and the like stored in an ad server database 610 that includes promotional messages and offers, in a third party system 614, at a point of sale 612, in a merchandising plan 618, and the like. The rules 608 may be formed and implemented based on consumer purchase history, consumer preferences, consumer age and sex, consumer behavior, consumer brand association, consumer location, consumer interests, consumer strategies, a touchpoint used by the consumer, a product scanned during a shopping trip, a past shopping behavior, a past product purchased, an in-store location, an item scanned, a product in an online shopping cart, a coupon or offer redeemed, an offer or coupon in an offer wallet, a loyalty card scanned, an item added to a list, items added to a list via a recipe, and a location identified by a QR code, and a coupon or offer previously presented to the consumer, and the like. The conflict management system 602 may prevent more than a set number of coupons in the same microcategory from being shown to a consumer in a given sale week. In an embodiment, the conflict management system 602 may determine the conflict at the time of issuance, not beforehand.

The media coordination system 604 may coordinate and manage media across a single channel referred to as in-channel coordination, or across multiple channels referred to as cross-channel coordination. The main aim of cross-channel media coordination may be to manage the various channels for promotions and discounts and therefore, and bring order to ambiguous situations created by these channels. Cross-channel media coordination may help in managing messages delivered to an individual via different channels and thus, stop conflicting messages from reaching the consumers. The channel to be utilized for an individual may also be ascertained by the media coordination system 604, which may help in targeting the consumers in a better manner. For example, a consumer not having regular access to the Internet may be targeted using alternate channels, such as SMS, MMS, through a scan-and-bag facility 1000 or other means that may be readily accessible to the consumer. This may increase the probability of the consumer to receive offers and promotions of interest through preferred channels. Further, any duplicate offers being made to an individual may be avoided through proper coordination by providing input to the media coordination system 604 to ensure that there are no conflicting promotions being delivered on channels that are not controlled by a particular manufacturer/retailer. For example, if a user gets a message through a wireless device that targets them with an offer for bread of brand A, then the same user during the same trip to the same retailer should not be targeted with a Load to Card offer for bread of brand B. Similarly, various other scenarios may be possible to manage offers and promotions delivered to a consumer.

In accordance with these scenarios, consumers may receive the best offers on their preferred channels. Therefore, a high-value offer may not be wasted by delivering it through a channel that the consumer may not engage with frequently. Additionally, an effective management of offers and promotions may be responsible for avoiding category channel conflicts across multiple channels 500. For example, a consumer who gets a "load-to-card" Pepsi offer through email will not get Coke offers on a wireless device.

The media coordination system 604 may also coordinate media delivery with a promotions calendar. For example, campaigns may be paced across their duration using the media coordination system 604. The media coordination system 604 may provide a single on/off switch for campaigns to avoid collision with chain-wide programs.

The media coordination system 604 may provide campaign management system packing, capping, and serving offer content.

In accordance with an embodiment of the present invention, the media targeting system 600 may cause to avoid double dipping on products of the same brand through multiple channels. For example, promotions of two different offers on a single brand of a product (that is, on the same UPC's) may be avoided through implementation of the media targeting system 600 in managing promotions on the basis of at least one of a UPC code, a brand name, a product name, a retailer-specific POS code name for a product, a promotion identifier, a user, a promotion time period and/or expiry, and the like.

In accordance with an embodiment, multiple parties/vendors/retailers may provide different offers on a particular product, which may lead to a conflict between the involved parties. Therefore, the various promotional offers may be required to be prioritized. For example, a retailer and a vendor of a chocolate bar may provide multiple offers; in such cases, the vendor's offer may be prioritized over the retailer's offer.

The media targeting system 600 may manage and/or prioritize promotions across various channels 500 to make use of the vast consumer data that may be available in the form of consumer history, loyalty card number, and the like. This data may be utilized for developing a better targeting strategy of consumers by the media targeting system 600, which in turn may lead to a higher return on investment for various interested parties.

Moreover, the media targeting system 600 may keep track of different promotions being delivered through different channels that drive sales of a product. The retailers may get a deeper insight into the channels 500 to recognize the most effective channels 500 for different types of promotions and for specific kinds of products through the media targeting system 600. Based on the tracked details through the media targeting system 600, managers may analyze performance of various channels 500 and therefore, may develop better promotion strategies for the products.

In an embodiment, the media coordination system 604 implemented as a cross-channel media coordination system may allow optimization of various channels 500 for efficient targeting of consumers. For example, it may allow targeting of a consumer through a different channel such as through in-store printed coupons in case the consumer does not respond to an offer sent through SMS. Further, the media coordination system 604 may allow retailers, vendors, and third parties to align their promotional activities with each other in order to ascertain the increase/decrease of funds required for a particular promotional channel and the utilization of a particular channel (according to its reach) by the consumers. The media coordination system 604 may also facilitate coordination of various CPG-funded activities across various business units. Moreover, the media coordination system may facilitate efficient and greater measurement and analysis of marketing activities.

In accordance with an embodiment, the media targeting system 600 may be implemented to enhance media targeting operations of a third party through a third party channel, such as a third party in-store coupon printer. The third party channel may provide input to the cross channel media coordination system 604 to ensure that no conflicting promotional offers are being delivered on non-third party channels. For example, if a user receives a "Cadbury's" coupon via a third party in-store coupon printer, the cross channel media coordination system 604 may block any offer from "Nestle" during that promotional period. A third party promoter may generate promotional offers such as coupons for a loyalty card holder, which may be provided as an input to the media targeting system 600. This system may monitor promotional offers from various other channels on receiving the input, block the conflicting offers provided from non-third party channels, and the like.

As illustrated in FIG. 6, the media targeting system 600 may include a conflict resolution system 602 that may be configured to prevent conflicting messages, promotions, advertisements, and the like from reaching consumers in accordance with various embodiments of the present invention. In an embodiment, the conflict resolution system 602 may prevent or block multiple offers to be shown to a consumer that may result in negative pricing. For example, the conflict resolution system 602 may block an offer through a retailer's digital system, such as COREMA, if the same product has also been discounted by a vendor's offer through "load-to-card".

In another embodiment, the conflict resolution system 602 may prevent offers or messages from competing brands to be shown to a consumer during the same trip to the retailer. For example, the system may prevent a hand held scanner from showing an advertisement for Coke and an offer for Pepsi to a consumer on the same trip.

In another embodiment, the conflict resolution system 602 may help in integrating merchandising by blocking conflicting messages between digital and real world channels. For example, when a health drink is being promoted on end-caps, and the like, the conflict resolution system 602 may block advertisements of soft drinks from being displayed on touch-points, such as hand-held devices and deli kiosks.

In still another embodiment, the conflict resolution system 602 may help in integrating the prices of a product and thus, preventing a retailer-vendor conflict. For example, the conflict resolution system 602 may block a touch-point offer for a product by a retailer if a "load-to-card" offer for the same product has been sent by the vendor. Further, the conflict resolution system 602 may integrate the in-store and out-of-store touch points to ensure that conflicting messages are not delivered. Therefore, promotions and messages displayed on a digital touch point will not conflict with other digital touch points.

In accordance with an embodiment, the media targeting system 600 may facilitate integration and coordination of a plurality of heterogeneous data-handling devices, network enabled devices, and the like. Various channels of message/promotion such as a printer at checkout, a text message, a voice message, a printed coupon, a touch point, a mobile device, a website, an overhead screen, a retail mobile computer, a load-to-card offer, a kiosk, a digital coupon, an email, and the like that may be available to retailers for targeting clients may be strategized and managed through cross-channel media coordination, optimization, and conflict resolution accomplished by the media targeting system 600 as described by the present disclosure.

In an embodiment, the promotional messages, advertisements, offers, and the like may flow through the media targeting system 600 in order to avoid any conflict. The system 600 according to the present invention may include a capability to resolve and manage conflicts and ensure mutual exclusivity. The media targeting system 600 may ensure that a coupon for a product may not be disbursed to the same consumer twice. Moreover, it may also be ensured that coupons belonging to competitors are not delivered to the same consumer during the same trip. Additionally, the media targeting system 600 may also ensure that digital programs do not conflict with non-digital initiatives.

In another embodiment, the media targeting system 600 may coordinate the flow of promotions for an entity across various channels 500 even if the channels 500 are not controlled by the entity. For example, the media targeting system 600 may block offers for a product on a touch-point at a retailer's end if the same product is being promoted through channels controlled by the vendor via print advertisement.

In another embodiment, checks may also be made to ensure that no conflicts occur within a single category of products and therefore, ensure that a good mix of products is available for promotion.

The media targeting system 600 may provide a unified platform for measuring an impact of a particular channel or for measuring a combined impact of various channels 500 on promotions and messaging. Accordingly, strategies may be developed or modified in order to target the end consumers, furthering business gains. For example, if the media targeting system 600 suggests a decrease in the interest or utility of in-store printers for promotions and messaging, more attention may be paid on other alternatives to develop a better consumer base with minimum efforts and cost effective manners. In another exemplary scenario, an aggregate impact of promotions that run across multiple touch points may be measured using the media targeting system 600. Based on these measurements, values of different touch points may be isolated and quantified. Accordingly, future marketing tactics and touch points utilization may be determined easily based on the isolated and quantified values.

In an embodiment, the media targeting system 600 may also be enabled, through an analysis and optimization facility 632, to perform a statistical analysis of usage of the various channels 500 for various types of consumers and in various locations. The statistical analysis may be controlled through various statistical models being implemented through a computer-implemented analysis and optimization facility 630 functionality of the media targeting system 600. Further, the analysis and optimization facility 630 may comprise a multi-terabyte data warehouse containing transactions made in association with the platform 620 plus transactions from the POS not made in association with the platform 620. The analysis and optimization facility 630 may also perform statistical projections of campaign performance using historical data with mid-flight corrections. A media data and consumer purchase data warehouse 634 may contain past media and consumer purchase data for massively parallel analytics. The warehouse 634 may be a Hadoop warehouse.

Since every event is logged by loyalty identification and device, the usage data may be tied back to retailer POS transactions. Using these logs, a measurement and reporting facility 630 of the media delivery service platform 620 may enable reports to be generated and shared with the relevant entities, such as custom reports mapping data to business terms between retailers, brands, and aggregators. The measurement and reporting facility 630 may be associated with a datamart with canned Jasper reports delivering quantitative insights in an automated manner.

In accordance with various embodiments of the present invention, user-level frequency and capping may be implemented with the use of the media targeting system 600. User-level frequency and capping is a functionality that may ensure targeting of a consumer with direct assignment offers at an appropriate frequency level and an appropriate number of times. The media delivery services platform 620 may employ a single, real-time counter 624 enabling instant offers at a set issuance or redemption limit. The present functionality may take user-level exposure into account when determining the direct assignment offers to be made available for a specific user during a particular time period. The functionality of user-level frequency and capping may consist of two basic functional blocks namely, frequency and capping. The frequency block may analyze the user purchase history, segmentation and the like, and may determine the last time a user was targeted with a particular offer. Accordingly, the duration after which that offer, message, advertisement, and the like may be shown again to the consumer may be identified according to a campaign business rule. For example, a user may be targeted with an advertisement frequently based on frequency analysis, but not more than every three weeks.

The capping block may determine the number of times a consumer has seen an offer and the total number of times the same offer may be shown to the consumer as defined by the campaign business rules. For example, a consumer may be targeted with an advertisement, but for not more than a week. Therefore, frequency and capping together may identify user level exposure to offers, messages, and advertisements, and accordingly user requirements may be decided. The user may then be targeted based on the frequency and capping analysis. Direct assignment offers will only be displayed to users that fall within the allowed user-level frequency parameters for that offer. Direct assignment offers will not be displayed to users that have exceeded the user-level issuance cap for that offer. Web preview will accurately show what the user has been targeted with and viewing an offer via web preview does not count as an issuance for the purposes of frequency limits of issuance capping. Additional users may be added to the direct assignment list for an offer without negatively affecting the frequency and issuance tracking of existing targeted users. A user may be removed from the list of directly assigned offer/user pairings.

In an embodiment, a billing and clearing facility 622 of the media delivery service platform 620 provides detailed issuance records by touchpoint, chain, store, and the like. The billing and clearing facility 622 may also provide coupon mapping management from online digital to retailer systems' coupons, thus enabling e-clearing.

In an embodiment, the media targeting system 600 may enable a consumer to communicate and transfer an offer to "Friends" linked to them via a social networking tool, such as FACEBOOK, TWITTER, and the like. This process may be known as mobile coupon sharing. The media targeting system 604 may deliver promotions to consumers on their mobile devices using one of or a combination of the conflict management system 602, media coordination system 604, the scan-and-bag facility 1000, a trait definition, a tracked zone, and the like. Alternatively, the scan-and-bag facility 1000 could be used to deliver offers without the media targeting system 600. Both the media targeting system 600 and the scan-and-bag facility 1000 may use the consumer's loyalty card as a key tracking identification for activities which occur plus targeting offers to the consumer. This disclosure provides for how a consumer can (a) post a shareable offer to their social networking Wall and (b) allow a friend to "grab" the offer for their own use.

Using the media targeting system 600, offers may be generated in accordance with: (1) Targeting to loyalty cards and/or behavioral traits and; (2) defining offer attributes such as coupon value, applicable products, graphics, and the like. With mobile coupon sharing, a new "Shareable" attribute may be added to each offer.

To enable mobile coupon sharing, the consumer may need to register the scan-and-bag facility 1000 or media targeting system 600 with the social networking site. When a consumer sees an offer via any of the channels associated with the scan-and-bag facility 1000 or media targeting system 600, if the Shareable attribute is true and the consumer registered the scan-and-bag facility 1000 or media targeting system 600 with the social networking site, a Share button may be displayed in association with the offer. When the consumer presses the Share button, the Offer may be posted to their social network wall with at least one of a link uniquely identifying the offer, who shared the offer, at what retailer the offer can be redeemed, and the like. Sharing the offer may be done in an encrypted manner. The media targeting system 600 may record this event. On a site such as FACEBOOK, all of the consumer's friends would see this posting and can now access this link on any device including web and mobile devices.

When the Friend clicks the link, they arrive at a registration website so that the system knows the correct Friend and their retailer loyalty ID. The Friend only needs to register once per device to store their retailer loyalty ID. Once registered, the media targeting system 600 or scan-and-bag facility 1000 may target this Offer at the Friend's loyalty card since they clicked the link. When the Friend uses any retailer touchpoint targeted by the media targeting system 600, they have now been targeted by this Offer and can redeem it. Any number of the consumer's Friends can also obtain the Offer in an identical manner.

In an embodiment, the media targeting system 600 may enable a first consumer to communicate and transfer the offer to another mobile device by using a bump application. The bump application may allow two mobile device users such as the first consumer and a second consumer to bump their mobile devices, such as a first mobile device and a second mobile device, together to exchange offers and other information such as contact information, photos, and the like, between the mobile devices. For example, a consumer may share an offer with friends by bumping their mobile device with another consumer's mobile device. When two consumers bump their mobile devices, the data may be automatically sent through a separate internet server to the other user, which may be able to detect when any two mobile devices using the application bump each other. This process may be known as mobile offer bumping.

As mentioned herein, the media targeting system 600 may deliver offers to the first consumer on the first mobile device using one of or a combination of the conflict management system 602, media coordination system 604, and the scanand-bag facility 1000. The media targeting system 600 may also present an offer to the first consumer in an application associated with the media targeting system 600, as discussed above. The offer may be targeted to the first consumer by the media targeting system 600, such as by targeting behavioral traits of the first consumer. The behavioral traits may include, products brought, purchase values, and the like. Using the media targeting system 600, offers may be generated in accordance with: (1) Targeting to loyalty cards and/or behavioral traits of the first consumer and; (2) defining offer attributes such as coupon value, applicable products, graphics, and the like. With mobile offer bumping, a new "Shareable" attribute may be added to each offer. Alternatively, the scan-and-bag facility 1000 may be used to deliver offers without the media targeting system 600.

The bump application may allow the first consumer to bump the first mobile device with the second mobile device of the second consumer for transferring the offer to the second consumer.

Both the media targeting system 600 and the scan-and-bag facility 1000 may use the consumer's loyalty card as a key tracking identification for targeting offers to the consumers.

The first consumer may receive the offer via any of the channels associated with the scan-and-bag facility 1000 or media targeting system 600. If the shareable attribute is applicable to the offer and the mobile offer bumping functionality is activated on the second mobile device, a Bump icon may be displayed in association with the offer. In use, the first consumer may bump the first mobile device with the second mobile device of the second consumer. It will be evident to a person skilled in the art that the mobile devices being bumped may need to activate the mobile offer bumping functionality on their respective mobile devices. Once the first and second mobile devices are bumped, the first consumer may receive a confirmation message about the offers being shared by bumping.

When the first consumer presses the Bump icon, the offer may be shared with the second consumer. The second consumer may store the received offer in the digital offer wallet 628 stored in the media delivery service platform 620. During storing, the second consumer may associate a loyalty card of the second consumer with the received offer. In an exemplary embodiment, information about the received offer may also be stored. The information may include at least one of an identification of the offer, who shared the offer, at what retailer the offer may be redeemed, and the like. Further, bumping the offer may be done in an encrypted manner. The media targeting system 600 may also record an event of offer bumping between consumers.

Further, the second consumer may redeem the shareable offer stored in the digital offer wallet 628. When the second consumer uses the loyalty card at any retailer touchpoint targeted by the media targeting system 600, the second consumer may be targeted by the stored offer. Hence, the stored offer may be redeemed when the second consumer uses the loyalty card at the retailer touchpoint. Additionally, any number of the consumer's friends may obtain the bumped offer in an identical manner or via other sharing methods described herein.

In an embodiment, the media targeting system 600 may track consumers inside a store, specifically zone tracking— allowing a store to track consumers and deliver offers to consumers based on their location within a store. Zone tracking uses the concept of "store geography" to enable media targeting both in the presence of as well as in the absence of consumer triggers. In embodiments of the present invention, the zone tracking system and method may enable targeting of media to at least one electronic device within a store based upon the physical location of at least one electronic device associated with a consumer within the store. By tracking the consumer's present location within the store and the items in the vicinity of the consumer, the zone tracking system and method of the present invention may accurately determine the best media to display to a consumer at each given moment during the consumer's shopping experience. This increases the number of relevant media that the consumer may be exposed to during a visit to the store.

In embodiments of the present invention, the zone tracking system and method leverages a fingerprinting algorithm that has been developed to track wireless 802.11-based devices. An 802.11-based wireless network may be utilized for tracking the location of a consumer in a store. Unlike other positioning systems, the zone tracking system and method may utilize an 802.11 wireless network to identify a general area (also referred to as a zone and described in detail below) within a store where the consumer and the electronic device associated with the consumer may be presently located. More specifically, the consumer may move around a store utilizing an electronic device, and the zone tracking system and method (according to the embodiments of the present invention) may track the location of the consumer. On identifying the location of a consumer's electronic device, the zone tracking system and method of the present invention may deliver offers and advertisements to the consumer's electronic device based on the present and/or estimated location of the electronic device in the store. While embodiments of the present invention have been discussed with respect to the use of Wi-Fi or 802.11 networks, it should be appreciated that RFID, Bluetooth, or cellular-type systems may also be used to determine the location and deliver relevant.

In embodiments of the present invention, the zone tracking system and method may employ a more sophisticated category of Wi-Fi location tracking by utilizing an 802.11 wireless network, sometimes referred to as RF fingerprinting. RF fingerprinting may be based on sampling and recording of radio signal behavior patterns in specific environments. The strength and distance relationship of an RF signal may be affected by the environment, including (but not limited to) geometry of the location, objects, human traffic, minors, windows, weather conditions, placement of access points, the make and model of the radio, and even the time of day. RF fingerprinting may use intelligent algorithms to improve location-tracking precision by accounting for these environmental effects on the wireless signal that may create attenuation and multi-path problems in the delivery of information over wireless networks.

Figure 7:
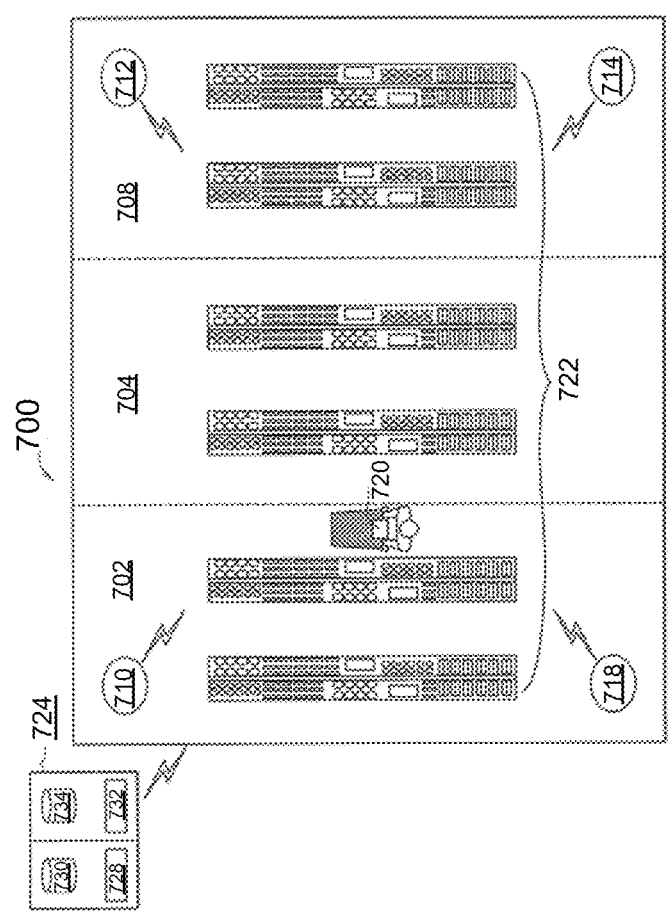
FIG. 7 illustrates a zone tracking system according to embodiments of the present invention.

In embodiments of the present invention, FIG. 7 illustrates zone tracking system 700. A typical store utilizing zone tracking system 700 may be divided into several zones, generally left zone 702, middle zone 704, and right zone 708. A zone may be a group of neighboring aisles within a store. It should be appreciated that the size of a zone may vary depending on the size of the store and the placement of access points (devices that allow wireless communication devices to connect to a wireless network), providing signal strength information within a zone (as discussed in detail below). Access points (710, 712, 714, and 718) may be distributed in at least the corners of the store and may span across zones (702, 704, and 708). Moreover, the access points (710, 712, 714, and 718) may be distributed throughout the store to monitor signal strengths of the electronic device 720 as it moves up and down aisles 722 during a shopping visit. In embodiments of the present invention, the zone tracking system and method utilizes at least one access point, but it should be appreciated that the zone tracking system 700 may accommodate as many access points as the store may desire.

In embodiments of the present invention, at least one location-tracking server 724 may be utilized in the zone tracking system and method. Location-tracking server 724 may include software 728 that may communicate with the electronic device 720 being utilized by a consumer within the store. Software 728 may listen to 802.11 signals emitted by the electronic device 720 moving around the store on a periodic basis. Location-tracking server 724 may include database 730 that may collect signal strength information associated with different positions within the store. This database may create an RF fingerprint for each zone (702, 704, and 708) of the store and record how each access point views an area in the store from a signal strength perspective. This data may be later utilized to ensure more accurate and immediate delivery of offers and advertisements to the consumer associated with electronic device 720 within the store.

Location-tracking server 728 may also include server software 732, which may translate the signal data collected from the electronic device 720 into an identification of the zone (702, 704, and 708) associated with the collected signal data. Each electronic device 720 may report signal strength data to the location-tracking server 724, and the server software 732 may then translate this data into an identification of a zone location on a continuous basis. In a preferred embodiment, this translation may be performed every 10 seconds. Accordingly, location-tracking server 724 may take into account the differences between the environment and electronic device 720, such as antenna characteristic differences may be between each electronic device as well as wireless signal differences within the store measured at different times of the day and different days of the week.

A store may have a map (often referred to as a planogram) that may permit identification of the location of items within the store. The planogram may include information including, but not limited to, aisle number, shelf number, section of aisle, the product description, and the bar code for the item. This data may be used by a store to allocate shelf space for product vendors. A typical planogram data file may include a list of 60-70% of the universal product codes (UPCs) carried by the store. The location-tracking server 724 may also include database 734 containing the planogram for the store. Planogram database 738 may maintain at least information on the UPCs for each item within the store and the corresponding aisle number for the item. Based on this planogram data, when a consumer scans a UPC, zone tracking system 700 may locate the aisle 722, where the consumer is shopping as well as the item that the consumer has scanned.

A "fingerprint" of the specific wireless environment in a store is calculated by a physical walk-around using a handheld spectrum analysis device during the "setup" phase. While the zone tracking system 700 may be in a "learning" mode during the "setup" phase, an item may be scanned and its description and signal strength may be sent to the location-tracking server 724. The data collected during the "'setup" phase may be later compared to deviations in the real-time environment to enable the zone tracking system to locate an electronic device associated with a consumer within the store. Thus, data collected, including signal strength and product information, is stored in respective databases 730 and 734 on the location-tracking server 724 (for later use) to identify offers associated with a particular zone (702, 704, and 708) containing a certain item. As more data is collected, the zone tracking system 700 learn the zone and product locations better, providing more accurate delivery of advertisements and offers to a consumer shopping in the store.

In embodiments of the present invention, deployment of an RF fingerprinting-based zone tracking system may be divided into two phases: (1) the fingerprinting phase; and (2) the operating phase. During the fingerprinting phase, data is accumulated by performing a walk-around of the store with the electronic device 720. Electronic device 720 samples and collects the signal strength data from multiple access points (710, 712, 714, and 718). In an example, one data reading may be taken from each zone (702, 704, and 708). For each access point, electronic device 720 records the signal strength associated with the access point along with the location of electronic device 720 as well as the MAC address associated with each access point. Accordingly, the data readings may indicate the signal strength at each access point (710, 712, 714, and 718) within each zone (702, 704, and 708). The signal strength associated with each access point typically decreases by distance from the location-tracking server 724, which records the data readings; although it should be appreciated that the decrease in distance may not be necessarily linear.

During the initial store setup, the aisle information (developed from the planogram database 734 for the store) may be used to create zones (702, 704, and 708). Each zone represents an area in the store large enough to distinguish the signal strength variations between access points (710, 712, 714, and 718) positioned in different parts of a store. Thus, between two neighboring zones, there may be a noticeable difference in the signal strengths associated with the access points. Access points may be evenly distributed throughout the store to cover the square footage of the entire store. Access points are generally placed in such a way that the electronic device 720 may "see" at least three access points at any given point in time. For example, there may be one access point in every corner of a 5,000 square foot store. Depending on the size of the store and the number of access points to be deployed, the zones associated with a store may be smaller in size. For example, a store of 65,000 square feet may be divided into 3-12 different zones.

In the operational phase, a consumer walks around the store with electronic device 720, which has already been fingerprinted during the fingerprinting phase. The consumer may use the electronic device 720 to scan items. While the consumer walks around aisles 722 within the store, the electronic device 720 associated with the consumer may engage in periodic measurements of the signal strengths from all the access points (10, 712, 714, and 718) and towards the location-tracking server 724. The location-tracking server 724 may use a positioning algorithm as well as fingerprinting database 730 built during the fingerprinting phase to estimate the location of the electronic device 720 within the store. The zone (702, 704, and 708) associated with the present position of the electronic device 720 may be derived from fingerprint database 730 as well as the current signal strength recorded by the electronic device 720. Accordingly, the electronic device 720 may send signal strength data to the location-tracking server 724 to communicate the present zone location of the electronic device 720.

Using the signal strengths reported from each of the access points in proximity to the electronic device 720, the location-tracking server 724 compares the data recorded by the electronic device 720 with the previously reported fingerprint data for electronic device 720 contained in the fingerprinting database 730. The positioning algorithm may then assess each data point sent by the electronic device 720 to find the best match and accordingly identify the current location (zone) of the electronic device 720. The electronic device 720 may use an Euclidian deterministic algorithm to find the minimum statistical signal distance between a detected signal strength location vector and the location vectors of the various fingerprinted sample points, although other similar algorithms may be utilized without departing from the objects of the present invention. The sample point with the minimum statistical signal distance between itself and the detected location vector may be regarded as the most likely estimate of the present location of the electronic device 720. In embodiments of the present invention, once the zone location for the electronic device 720 may be determined, the zone tracking system 700 may check relevant offers for the identified zone (702, 704, or 708) and deliver those offers to the consumer's electronic device 720.

Figure 8:
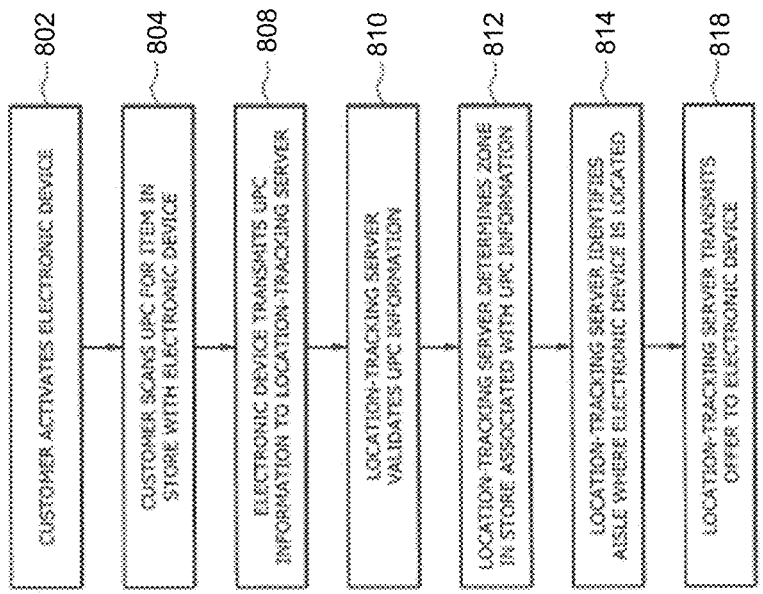
FIG. 8 illustrates a method of zone tracking according to embodiments of the present invention.

In embodiments of the present invention, the zone tracking system and method may be utilized to identify items located in a given zone within the store and send an offer to the electronic device. In a first embodiment of the zone tracking method, as illustrated in FIG. 8, an electronic device may be activated by the consumer (step 802), and the consumer uses the electronic device to initiate a scan of the UPC for a selected item within the store (step 804). Upon scanning the UPC for the item, the electronic device may transmit UPC information for the item to the location tracking server 724 (step 808). In this embodiment, the electronic device may also transmit the signal strength of every access point in and around the scanned item to the location-tracking server 724, thereby further adding to the database of zones and associated signal strengths housed within the location-tracking server 724.

The location-tracking server 724 may validate the UPC information (step 810). The location-tracking server 724 determines the zone in the store associated with the UPC information for the item using the planogram database housed within the location-tracking server 724 (step 812). The location-tracking server 724 identifies the aisle where the electronic device may be located based on the planogram data stored on the location-tracking server 724 (step 814). Based on the planogram data, the zone may be identified and combined with the signal strength of the access point to form a fingerprint data point. It should be appreciated that this type of data point collection may be performed each time a consumer scans an item. The location-tracking server 724 may then transmit an offer to the electronic device that may be either related to the item associated with the UPC just scanned or for other products within the zone where the scanned item may be located (step 818).

Figure 9:
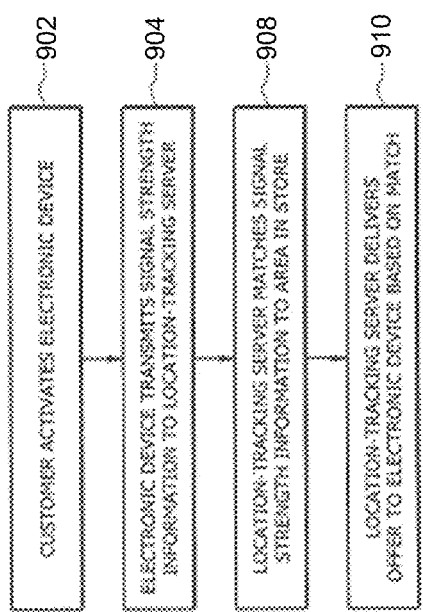
FIG. 9 illustrates another method of zone tracking according to embodiments of the present invention.

In another embodiment of the zone tracking method, according to the present invention illustrated in FIG. 9, the electronic device may be activated by the consumer (step 1402), but the consumer does not initiate any scan at the time of activation. In this embodiment, the electronic device continuously transmits signal strength information (also sometimes referred to as the RF fingerprint) to the location-tracking server 724 for the zone tracking system (step 1404). The location-tracking server 724 may then use statistical algorithms, corresponding to the signal strength data transmitted by the electronic device (step 1408), to find the best matching area in the store. In case a matching area may be found, the location-tracking server 724 may make a prediction about the zone where the electronic device may be presently positioned and thus, deliver an offer related to the zone, if such an offer exists (step 1410). In case of unavailability of a matching zone, the location-tracking server 724 may still deliver oilers to the electronic device, but it may be unlikely that the oilers will be zone-specific, as the location-tracking server 724 was unable to locate the position of the electronic device within a particular zone in the store at the time of transmittal of the signal strength information.

In embodiments of the present invention, when a consumer releases an electronic device upon entry into a store, the consumer may receive an offer within their first minute of usage. This offer may be the highest-ranked, pre-targeted offer for that consumer, regardless of the consumer's present location within the store. This may be done to instantly introduce the consumer to the use of the electronic device as well as to demonstrate the potential money-saving aspects by utilizing the electronic device within the store.

Figure 10:
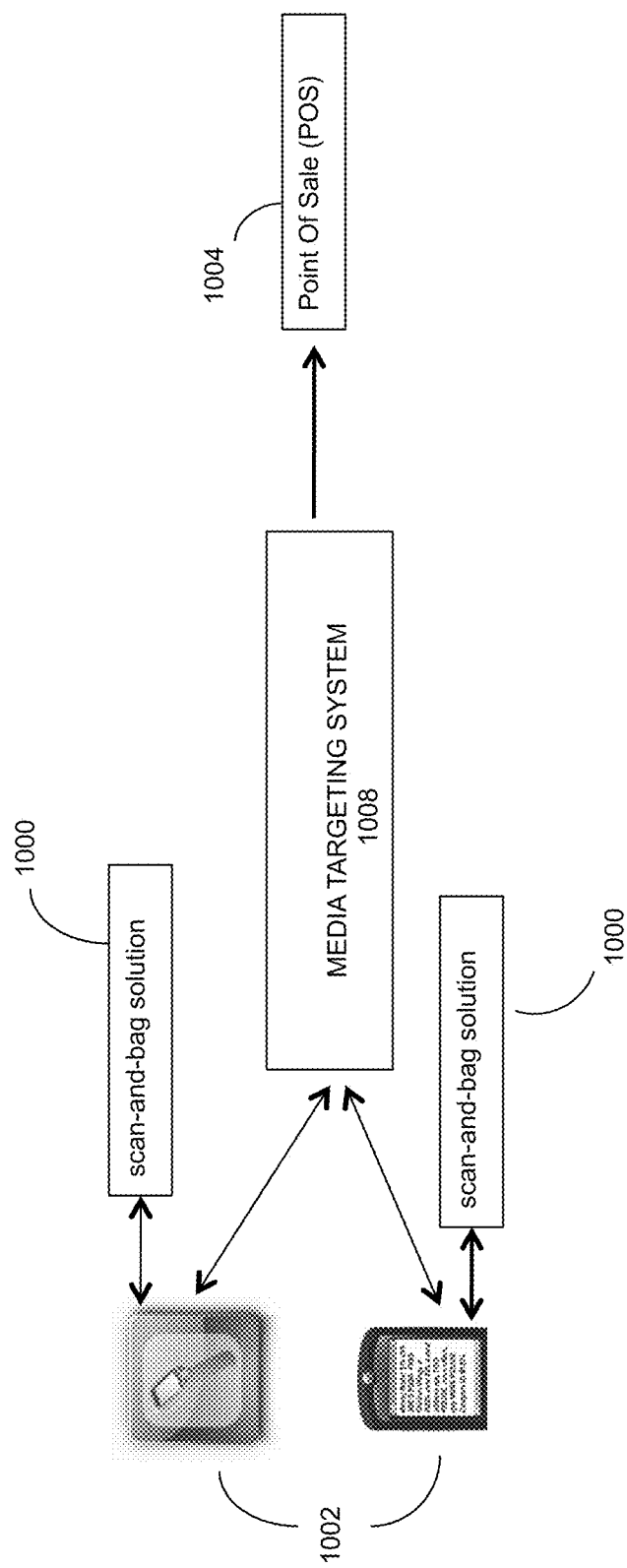
FIG. 10 illustrates a scan-and-bag facility for a retail environment.

FIG. 10 illustrates a scan-and-bag facility 1000 for a retail environment. The scan-and-bag facility 1000 may be implemented as an application on multiple clients or handheld devices 1002 comprising different hardware/software combinations including, but not limited to, Motorola MC-17x™, Apple iPhone iOS 4.0.x™ and the like. The scan-and-bag facility 1000 may provide a consumer a functionality to scan items purchased by the consumer in a retail store. The consumer, after shopping for various items or products, may proceed to a point of sale (POS) 1004 or regular checkout for payment of the products. In an embodiment, the scan-and-bag facility 1000 may send the total cost of the products bought and scanned by the consumer directly to the POS 1004. For example, the consumer may shop from a plurality of aisles in a shopping mall and may scan the products with a handheld device 1002. The consumer may be able to view the cost of a product and may also be able to view the total amount that may be payable at the POS 1004. The POS 1004 may in turn view the total amount payable by the consumer, thus saving time in such a transaction. In an embodiment, the scan-and-bag facility 1000 may include a transmitting facility that may be communicatively coupled to the scan-and-bag facility 1000. Further, the transmitting facility may be capable of sending a total cost of the purchased products to a point of sale (POS) facility in a retail store. The transmitting facility may automatically send the total amount of the products purchased by the consumer to the POS 1004. In an alternate embodiment, the total amount of products purchased may be sent by the consumer by pressing a key of the transmitting facility. In another embodiment, the total amount of the products may be fetched by a cashier at the POS 1004. In an aspect, the point of sale 1004 may comprise a general computer or may be a special checkout system such as the checkout systems manufactured by Fujitsu, IBM, MICROS Systems, Panasonic, Radiant Systems, Sharp, Squirrel Systems and the like, which may include the scan-and-bag facility 1000 as provided by the present invention.

In an embodiment, the scan-and-bag facility 1000 and/or the media delivery service platform 620 may provide a consumer with an offer wallet 628, or e-wallet, that may display a plurality of electronic coupons that may be used by the consumer. In an embodiment, the Offer Wallet 628 stores each issuance of an offer on any touchpoint in the cloud for the loyalty card for the sale week. For example, the scan-and-bag facility 1000 may access a plurality of electronic coupons stored in the handheld device 1002 or any other data repository. Thereafter, the scan-and-bag facility 1000 may provide electronic coupons related to the products scanned by the consumer.

In another embodiment, the scan-and-bag facility 1000 may communicate with a Media Targeting System 1008 by making regular calls to the Media Targeting System 1008 to check if any additional relevant offers may be presented to the consumer at that time. As described in previous paragraphs, the Media Targeting System 1008 may be configured to coordinate media and manage media conflicts, in accordance with various embodiments of the present invention. For example, a consumer may buy and scan a razor upon which the scan-and-bag facility 1000 may receive information from the handheld device 1002 or handheld scanner regarding the same. The real-time information regarding the razor may then be sent to the Media Targeting System 1008 by the scan-and-bag facility 1000. The Media Targeting System 1008, upon receiving the information, may determine that the client may be provided with a discount on shaving cream or any other utility item and such a discount may then be provided to the consumer on the handheld device 1002 by the scan-and-bag facility 1000.

In an embodiment, the scan-and-bag facility 1000 may include a client application implemented on a handheld device 1002 or software such as MC-17x client, Apple iPhone iOS 4.0.x client, and the like, and an application server such as an In-Store Application Server or POS 1004, and the like. In an aspect, the client application software may be implemented on a handheld device 1002 such as Motorola MC-17x, Apple iPhone, and the like. In another aspect, the application server may be an application server, general computer at the checkout point, a special checkout hardware device, and the like. In an embodiment, the client application may enable a related handheld device 1002 to communicate with the in-store application server for a plurality of functions such as transactional and media functions, and the like.

In an embodiment, functionalities such as media functionality, and the like may be transferred from the application server as described by the present invention to the Media Targeting System 1008 (described in the previous paragraphs) server located in a retailer data center or cloud.

In another embodiment, a local media functionality may be provided by the scan-and-bag facility 1000. In an aspect, the scan-and-bag facility 1000 may enable presentation of ads, offers, discounts, and the like, as and when the same are received from the Media Targeting System 1008. For example, the scan-and-bag facility 1000 may provide a local media functionality that may provide a discount to a consumer regarding a product scanned by the consumer on a handheld device 1002.

The scan-and-bag facility 1000 may also provide a local caching functionality of previously displayed offers, discounts, ads, and the like. For example, the scan-and-bag facility 1000 may enable storing the e-wallet on a Motorola MC-17x device's local cache. Such e-wallet stored in the local cache may be readily utilized at a later time.

In embodiments, the scan-and-bag facility 1000 may enable pushing of offers, discounts, ads, and the like to the POS 1004 at the completion of a transaction. For example, a consumer upon shopping various products may proceed to the POS 1004 for payment. At the POS 1004, the consumer may be provided various discounts on the products purchased and the discounts may reflect in the bill incurred by the consumer.

In an embodiment, the scan-and-bag facility 1000 may enable centralizing media logic into the Media Targeting System 1008. In an aspect, the client application updates and the in-store application server updates may not require modifying the media logic stored in the Media Targeting System 1008. Further, a user-level persistence of targeted media may be implemented across multiple channels/stores.

The scan-and-bag facility 1000 provided by the present invention may also be implemented on a consumer-owned mobile device such as a mobile phone, personal digital assistant, or other mobile device. For example, the client application provided by the scan-and-bag facility 1000 may be implemented in the mobile phone of a consumer. This may provide the consumer with automatic updates regarding available or latest ads, offers, discounts, and the like. In certain embodiments, the scan-and-bag facility 1000 may be a mobile shopping and payment application, as will be described further herein.

The scan-and-bag facility 1000 provided by the instant disclosure may enable a retailer to reach a large number of consumers by providing ads directly on a consumer's mobile phone or other mobile device. The retailers providing scan-and-bag functionality to the consumers may expand their usage by utilizing the solution provided by the present invention. The present invention may also increase the media delivery opportunities provided by the retailers by bringing trip planning and on-the-go activities into the addressable media ecosystem.

The scan-and-bag facility 1000 as described by the present disclosure implemented on a consumer's mobile device may provide added functionality to the scan-and-bag feature provided by a conventional scan-and-bag device. The scan-and-bag facility 1000 may be installed in the mobile device of the consumer. In an embodiment, the scan-and-bag functionality installed in the mobile device may be registered for a single consumer by using a unique ID or number such as a loyalty card number, and the like so that the mobile device of the consumer acts as a unique device for the consumer.

In an embodiment, the handheld device 1002 may be a mobile phone owned by the consumer. The consumer may be able to scan and view prices of various items on the mobile phone 1002, add to the cart total and view the net total on the mobile phone 1002. After completing shopping the mobile phone 1002 may be enabled to push or send the details regarding the items purchased to the POS 1004. The details regarding the items purchased may be sent from the mobile phone 1002 to the POS 1004 by pressing a key on the mobile phone, by scanning an end-of-order barcode, or by some other indication.

In an embodiment, the mobile device enabled by the scan-and-bag facility 1000 may receive offers while shopping or scanning of items. The consumer may also be able to view the offer wallet containing a plurality of electronic coupons and may push or send relevant offers to the POS 1004 at the checkout. For example, a consumer scans an item by using a mobile phone and is provided with an offer. If the consumer purchases the same item, the related offer may be sent to the POS 1004 so that the offer or discount is implemented on the total bill.

In an embodiment, the mobile device enabled by the present invention may provide a unique interface to the consumer. In an aspect, the mobile device may be able to scan-and-bag and provide an interface to view various available offers while the consumer is in a retail store. In another aspect, the mobile device may be able to provide a consumer an interface to view the various available offers while the consumer is out of the store.

In an embodiment, the mobile device enabled by the present invention may be able to utilize a store specific Wi-Fi connection and may be able to recognize a specific store. Such a device may be able to distinguish between various stores a consumer visits and may be able to provide offers, discounts, and the like relevant to the particular store.

In an embodiment, the scan-and-bag facility 1000 may be able to communicate with the Media Targeting System 1008. The scan-and-bag facility 1000 may enable sending media requests to the Media Targeting System 1008 that may in turn provide relevant information for each request. The Media Targeting System 1008 may send information regarding the consumer, items scanned, and the like to the handheld device 1002. In an aspect, the relevant media information such as information regarding User ID, scanned UPC, store ID, and the like, may be sent by the Media Targeting System 1008 to the handheld device 1002. The handheld device 1002 may display media information received from the Media Targeting System 1008 to the consumer instantaneously. In another embodiment, the Media Targeting System 1008 may be able to send information regarding a wireless zone as identified by an access point triangulation to the handheld device 1002 enabled by the scan-and-bag facility 1000 provided by this disclosure.

Figure 11:
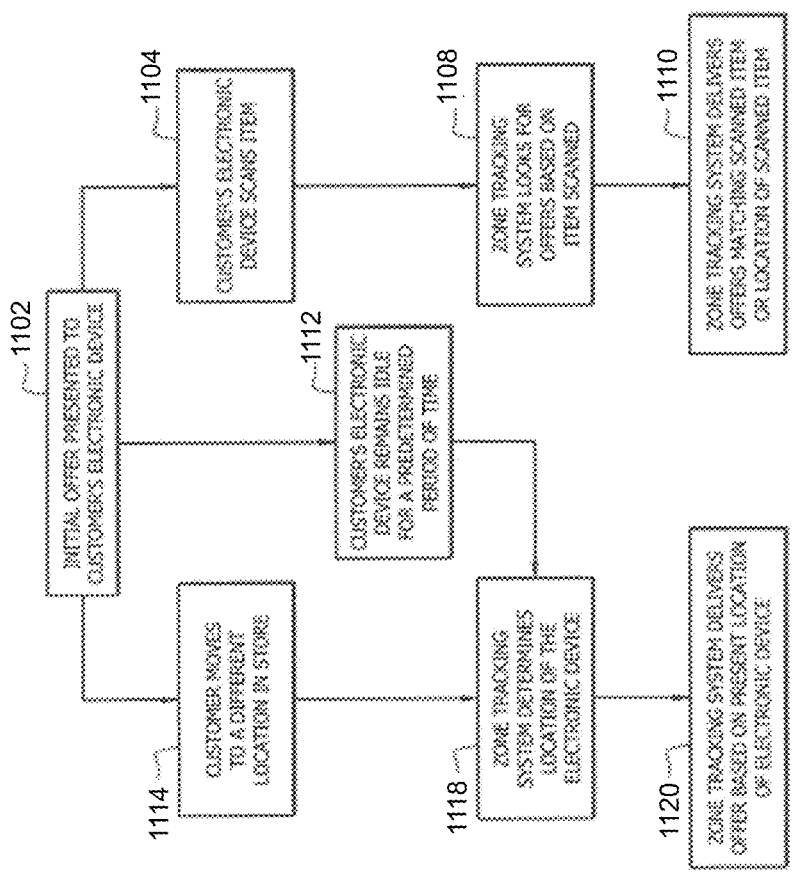
FIG. 11 illustrates another method of zone tracking according to embodiments of the present invention.

Several events may trigger the zone tracking system to determine if there are relevant advertisements or offers to be delivered to the consumer at any given time. Referring to FIG. 11 various methods for zone tracking of an electronic device associated with a consumer are illustrated. In an embodiment, an initial offer may be presented to the consumer's electronic device at step 1102. At step 1104, the consumer may use his/her electronic device to scan a bar code. This scanning may trigger the zone tracking system to look for advertisements or offers for that consumer based on the item scanned, at step 1108. Similarly, the zone tracking system may identify the location of the consumer within the store where the consumer may be scanning items and may also deliver an advertisement or offer related to the zone. Accordingly, at step 1110, the zone tracking system may deliver offers matching the scanned item or the location of the scanned item.

In another embodiment, there may be a setting associated with the electronic device that may trigger a search by the zone tracking system when there have been no scan events over a predetermined period of time. At step 1112, the electronic device may remain idle for a predetermined period of time. Alternatively, as depicted in step 1114, the consumer may move from one location to another within the store and the consumer's electronic device may report signal strengths from several access points to the location-tracking server. Based on this signal strength data and/or a predefined setting on the electronic device, the location-tracking server that forms part of the zone tracking system may determines the present location of the electronic device, at step 1118. Thereafter, at step 1120, the system may deliver an offer based on that present location of the electronic device. Thus, even when the consumer may not be scanning any items, the location of the consumer may still be reported to the location-tracking server. Such tracking may allow targeting of a particular offer when the consumer passes an aisle where the offer would be valid (i.e., targeting a Coke offer when the consumer passes the soft drink aisle). Accordingly, the zone tracking system and method according to embodiments of the present invention may not always require manual actions (such as scanning) by the consumer utilizing an electronic device within the store to enable zone tracking Thus, the zone tracking system and method according to embodiments of the present invention may allow the consumer to receive offers based on location within the store as well as the consumer's transaction history and offer inventory available from the store and/or CPG companies.

It should be appreciated that different types of offers may be contemplated by the present disclosure. A pre-targeted offer may be a 1:1 offer that may be targeted based on purchase history. Further, real-time media may be an offer or promotional message targeted based on in-store behavior of a trip (location, scanned item, etc). It also should be appreciated that the advertisement or offer may be delivered to the consumer's electronic device utilizing a variety of criteria. For example, in some embodiments of the present invention, an advertisement or offer may be delivered over a specified time frame based on an analysis of the consumer's transaction history. Additionally, an offer or advertisement may be delivered based on an analysis of prior offers delivered to the consumer's electronic device during the present store visit.

Figure 12:
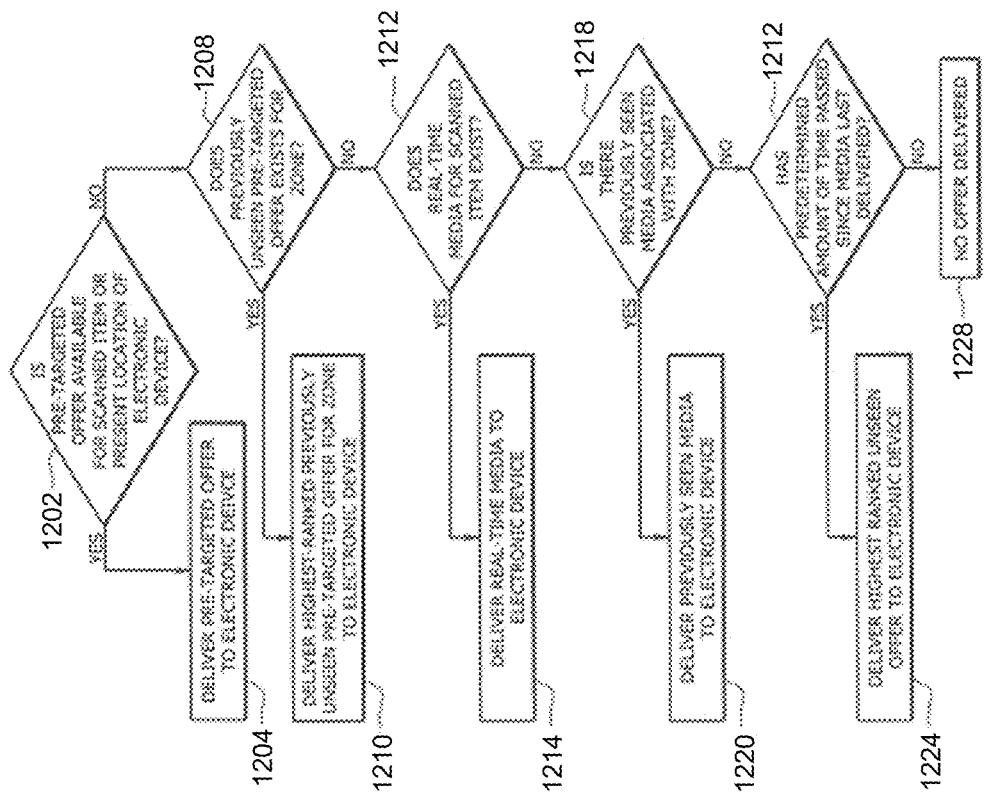
FIG. 12 illustrates methods for distributing offers based on zone tracking according to embodiments of the present invention.

Referring to FIG. 12, when events associated with the consumer's electronic device occur (i.e., scanning, idling or other movement), the zone tracking system may determine whether a pre-targeted offer may be available for the scanned item or the present location of the electronic device within the store as shown in step 1202. At step 1204, if a pre-targeted offer exists, that offer may be delivered to the electronic device of the consumer. If there is no pre-targeted offer, at step 1208, the system may then determine whether a previously unseen pre-targeted offer exists for the zone in which the electronic device may be. If such an offer exists, then the highest-ranked previously unseen pre-targeted offer for that zone may be delivered to the electronic device of the consumer at step 1210. Further, if there is no such offer, at step 1212, the system may determine whether there is real-time media associated with the scanned item. If real-time media exists, it may be delivered to the electronic device of the consumer at step 1214.

However, if real-time media does not exist, at step 1218, the system may assess whether there is any previously seen media associated with the zone in which the electronic device may be presently positioned. If that media exists, it may be delivered to the electronic device of the consumer at step 1220. Otherwise, at step 1222, the system may determine whether a pre determined amount of time (i.e., 5 minutes) has passed since any new media was delivered to the consumer's electronic device. If that predetermined amount of time has passed, the highest-ranked unseen offer may be delivered to the electronic device of the consumer at step 1224 but otherwise, no offers may be delivered to the consumer's electronic device at step 1228.

In embodiments, offers may be delivered based on movement of the consumer's electronic device around the store. For example, an offer may be delivered before the consumer is about to enter a zone, at the time when the consumer enters a zone and/or after the consumer scans an item within a zone. The zone tracking system and method according to embodiments of the present invention may also allow prediction of zones where the consumer's electronic device may be located and the delivery of offers based on tracking of the zones. Moreover, the zone tracking system and method may predict the consumer's direction of movement within the store and may identify the zone in which the consumer may be moving (i.e., based on the last four items scanned).

Further, the offers to be delivered to a consumer may be in the same or in a different category as an item that has been scanned using the electronic device. For example, the consumer may scan a cereal product and receive an upsell offer, such as an upgraded product or related item at the time that the consumer selects the cereal product. Additionally, the brand owner may want to introduce a new product to the consumer. As an example, the consumer may scan pasta sauce and get an offer for pasta.

In embodiments, the signal strength measured at the same location by an electronic device over several trips around the store may not always be static due to multi-path and other phenomena. Due to a variation in signal strength which may occur over time, many samples of data may be recorded for each location within the store. A typical data set may include 20-25 data points per zone over various times of day. The signal strength measured by each electronic device may also vary depending on the make and model of the electronic device and radio being employed. In embodiments, it may be preferable to collect data points for each electronic device that is in use within the store and maintain those data points within a database for later use by the zone tracking system. Further, whenever the environment changes, such as by moving or replacing access points or by adding or removing objects such as shelves or tables, the fingerprint data may become obsolete and is preferably recollected to ensure accurate tracking of the zones within the store over time. This may be of particular importance if the store layout changes and/or new electronic devices may be introduced to the system.

In embodiments, the RF fingerprinting database utilized in the zone tracking system and method may require a long period of time to consistently map the coordinates from the RF fingerprint. Further, the RF fingerprinting database may link those coordinates to zones within the store because a threshold of data may need to be collected to ensure consistency in zone tracking. However, once there is sufficient data, the zone tracking system may continuously predict the location of an electronic device within the store and may deliver the right offers.

Embodiments of the present invention provide for a zone tracking self healing feature that may utilize a combination of a retailer-provided planogram and consumer scan data to improve the zone tracking signal strength map. Utilizing the consumer scan data and the signal at the time of scanning, the system may update its signal strength map as well as its UPC-to-zone mapping. To capture UPC-to-zone signal strength data, the electronic device may report access point signal strength to the location-tracking server. The location-tracking server may record the last signal strength with data/time for that particular electronic device. Thereafter, the consumer may scan an item and the electronic device may archive the last signal strength data with the UPC of the consumer scan data.

The zone tracking system and method may allow electronic devices to be tracked and located within a zone of the store in as little as five seconds of the electronic device entering a specified location. The zone tracking system and method may not require any hardware or operating system modifications to the electronic devices that may already be placed within a given store. Moreover, implementation of the zone tracking system and method may not impact the existing retailer merchandising space and may not interfere with existing infrastructure of a store, such as wireless or wired networks and lighting. In an embodiment, the electronic device utilized according to the present invention may be MC17 manufactured by Symbol Technologies.

The zone tracking system and method may provide an additional, unique target to trigger the display of ads and offers within a store. The store preferably may deliver offers to consumers at more relevant moments, driving redemption of such offers. The zone tracking system and method preferably enables the electronic device to trigger delivery of ads to a consumer based on the consumer's in-store movements in addition to consumer-initiated events (scanning or pressing a button). Consumers appreciate the zone tracking system because it allows consumers to save money as well as save time. From a consumer's perspective, the zone tracking system and method according to embodiments of the present invention preferably improves the money-saving proposition by informing the consumer of more offers at relevant moments than event-driven offer viewing alone. Use of zone tracking-driven offers can inform consumers of offers that may not otherwise trigger based upon purchases contemplated during a store visit. Without the zone tracking system and method according to embodiments of the present invention, these offers, while relevant, would not display to the consumer as near the moment of decision as may be desired by the store.

The media targeting system 600 may include a Media request trait inclusion functionality that may allow real-time product campaigns to be targeted to a consumer by specific consumer traits. In practice, the media targeting system 600 may assign consumers to behavior groups, or traits. The media targeting system 600 calculates these traits in real-time based upon events, past behavior, and combinations thereof. The system 600 uses a procedural logic rules engine 638 containing if, and, or, in, syntax to match consumer data to specific criteria. In response to requests for media data, the media targeting system 600 calculates the traits for a particular consumer and assigns the consumer to zero or more of these traits on the fly. This includes adding and removing already assigned traits from a consumer. The assignment of traits to consumers enables targeting media, such as ads and offers, to consumers based upon behaviors that have occurred before and during a particular session with the media targeting system 600.

In an aspect, the consumer traits may be defined as a function of a consumer's behavior. The consumer traits may be passed to the media coordination system 604 with each real-time media request. As discussed in the previous paragraphs, a consumer may be targeted according to the previous visits of the consumer, last item scanned, location in a store, fewer visits to a store, low total spend, high total spend, no longer purchasing an item, recent purchase in a category, high margin shopping, residence in a zip code, an upcoming birthday, response to scanned QR Code, shopping list generation and implementation, or any other real-time behavior providing the media targeting system 600 context to target media. The present embodiment of the scan-and-bag facility 1000 and media delivery service platform 620 may provide a functionality to target real-time media based on any consumer attribute, such as any beyond in-store location and last-item scanned. The consumer's traits may act as a variable for media requests and a parameter that a real-time campaign may use for targeting purposes.

Examples of Traits include: Historical Dogfood Buyer—people who purchased dogfood in the past 6 months; Family Shop—people who buy Cocoa Puffs on this trip; Quick Trippers—people who purchase Milk as the first item on their trip; Organic Buyers—people who've purchased organic products in the past 6 months; Lapsed Users—people who've purchased the products in the past, but not in the past 3 months; and the like. The number of potential traits are limitless, however four behaviors may be calculated in most cases: (1) what you've purchased in the past, (2) what you just bought, (3) what's in your cart this trip, and (4) what Locations you've passed in the store. In summary, the media targeting system 600 has the ability to calculate and assign traits on the fly in real-time using a rules engine during the consumer's shopping trip.

Figure 13:
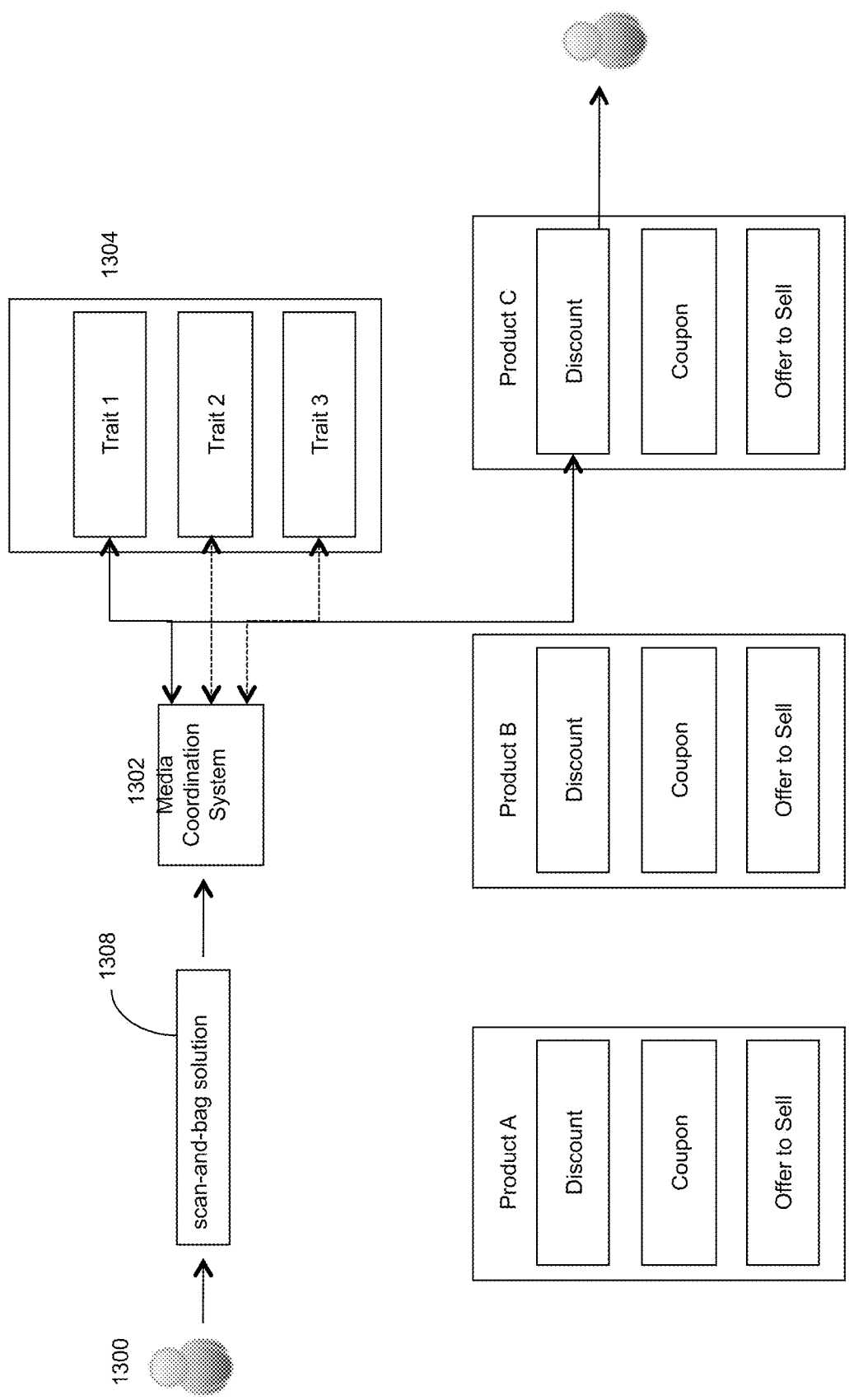
FIG. 13 illustrates an embodiment of a method for providing Media request trait inclusion functionality.

FIG. 13 illustrates an embodiment of a method for providing Media request trait inclusion functionality. A consumer 1300 may have access to the scan-and-bag solution 1308 through which the consumer may send a media request to media coordination system 1302, 624. Trait definitions 1304 may be provided that may relate to a particular item and a type of promotion. The type of promotion may include a trait of a consumer that may relate to an offer to sell a product C. In an aspect, the trait definitions 1304 may be pre-defined. In another aspect, the trait definitions 1304 may be updated according to the behavior of a consumer during a visit. The behavior of the consumer 1300 may relate to a particular Trait 1 amongst the trait definitions 1304. Trait 1 may be coupled to a particular type of promotion such as a discount for the Product C that may in turn be provided to the consumer 1300 by the media coordination system 1302, 624. For example, a consumer may buy three or more yogurt products, such a behavior may relate to a trait called "Yogurt Lover". It may be defined that the trait "Yogurt Lover" may be interested in information regarding various yogurt products available. Therefore, the media coordination system 1302, 624 may send advertisements regarding various yogurt products available in a retail store. The consumer traits may be stored in a data repository system or may be a part of the media coordination system 1302, 624.

Further, the media coordination system 1302, 624 may be an ad server. In an embodiment, the consumer traits may be included at the time of request for real-time media from the media coordination system 1302, 624. Further, one or more traits matched to the profile of a consumer may be included on each media request. For example, the consumer 1300 may scan a potato chips packet during a current trip. The consumer 1300 may match to two traits such as Scroller & Redeemer or any other trait. A request regarding the potato chips packet may be sent to the media coordination system 1302, 624. The request may be in the form of:
UPC=999111999
Zone=Chips
Traits=Scroller, Redeemer
Upon receiving the request, the media coordination system 1302, 624 may check for real-time media matches that may require "scroller" or "redeemer" traits. Any matching result may then be sent to the consumer 1300.

In an embodiment, a consumer's in-store behavior during a trip may be compared to the existing trait definitions. In case, the consumer's behavior matches a trait definition 1304, the consumer may be coupled with that trait for the current trip. For example, a consumer that may scroll through a plurality of offers at any point during a trip may match the definition of a trait called "Scroller" that may be defined as a consumer that scrolls through at least five offers at any point during a trip. As soon as the consumer scrolls through five offers, all of the subsequent media requests made by the consumer for that trip may include the Scroller trait.

In another embodiment, a consumer's in-store behavior during a plurality of previous trips to a retail shop may be compared to the existing trait definitions 1304. In case, the consumer's behavior in the previous trips matches a trait definition 1304, the consumer may be coupled with that trait for any future trip. For example, a trait called "Yogurt Lover" may be defined as any consumer who purchases three or more yogurt products on three or more trips within one month. A consumer 1300 may purchase three or more yogurts on each of the last 3 visits, say February 2nd, February 8th and February 19th. Hence, the consumer 1300 may be associated with the trait "Yogurt Lover" and for any next trip the media requests for the consumer may include the Yogurt Lover trait.

In an embodiment, the present invention may provide a system that may enable updating the trait definitions. The system may determine the behavior of a consumer that may trigger the assignment of a particular trait to a particular consumer. In an embodiment, the consumer behavior that may be taken into consideration for updating the trait definitions may be the behavior during a trip in which the consumer uses the scan-and-bag solution 1308. For example, the consumer 1300 uses the scan-and-bag solution 1308 on February 16th but does not use it on February 18th. Then only the trip history or consumer behavior from the trip on February 16th may be used for updating the trait definition.

In an embodiment, the consumer traits may be defined by the behavior of a consumer in utilizing the shop-and-bag feature. For example, the consumer traits may be defined by whether a user scrolls, does not scroll, redeems offers they have seen, total basket size, and the like.

In an embodiment, the consumer traits may be defined by utilizing specific purchase behavior of the consumer. For example, the traits of a consumer may be defined by the items/categories a consumer has scanned, such as "Ice cream" or "Eggs" may be used to define a trait.

In an embodiment, the trait definitions may be updated without updating the entire software. In another embodiment, the trait definitions may be update-able outside the purview of regular software release cycle. For example, the "Scroller" trait may be defined as a user who hits the scroll button twice during a trip. This change would be propagated to the field without requiring a separate software release.

Further, the traits associated with a consumer may apply to the consumer across multiple trips and multiple stores. For example, a consumer associated with the trait "Scroller" may remain associated with the trait for any future trip. In an embodiment, a trait assigned to a consumer for a retail shop may be applicable on future trips by the consumer in the same retail store. For example, the consumer 1300 may be assigned the "Yogurt Lover" trait on February 19th while shopping in Store 20. When the consumer 1300 shops again in Store 20 on February 23rd, the trait associated with the consumer 1300 may remain "Yogurt Lover".

In an embodiment, a trait assigned to a consumer may be applicable on all future trips in any store in the same banner. For example, the consumer may be assigned the "Yogurt Lover" trait on February 19th while shopping in Store 20. The consumer may still be assigned the Yogurt Lover trait while shopping in Store 17 on February 27th.

Further, the consumer trait definitions may expire on a preset date in case persistence across multiple trips is available. For example, the consumer 1300 may be assigned the "Yogurt Lover" trait on February 19th and that trait may be set to persist for 5 weeks. If the consumer does not buy any more yogurt, then on April 20th the consumer 1300 may not be assigned the "Yogurt Lover" trait.

In embodiments, the scan-and-bag solution 1308 of the present disclosure may enable receiving information from an external source and assigning specific traits to specific user IDs. The traits may be assigned to consumers based on information that may be external to in-store behavior of the consumers. In an embodiment, External Traits may only be updated daily at a store level.

Figure 14:
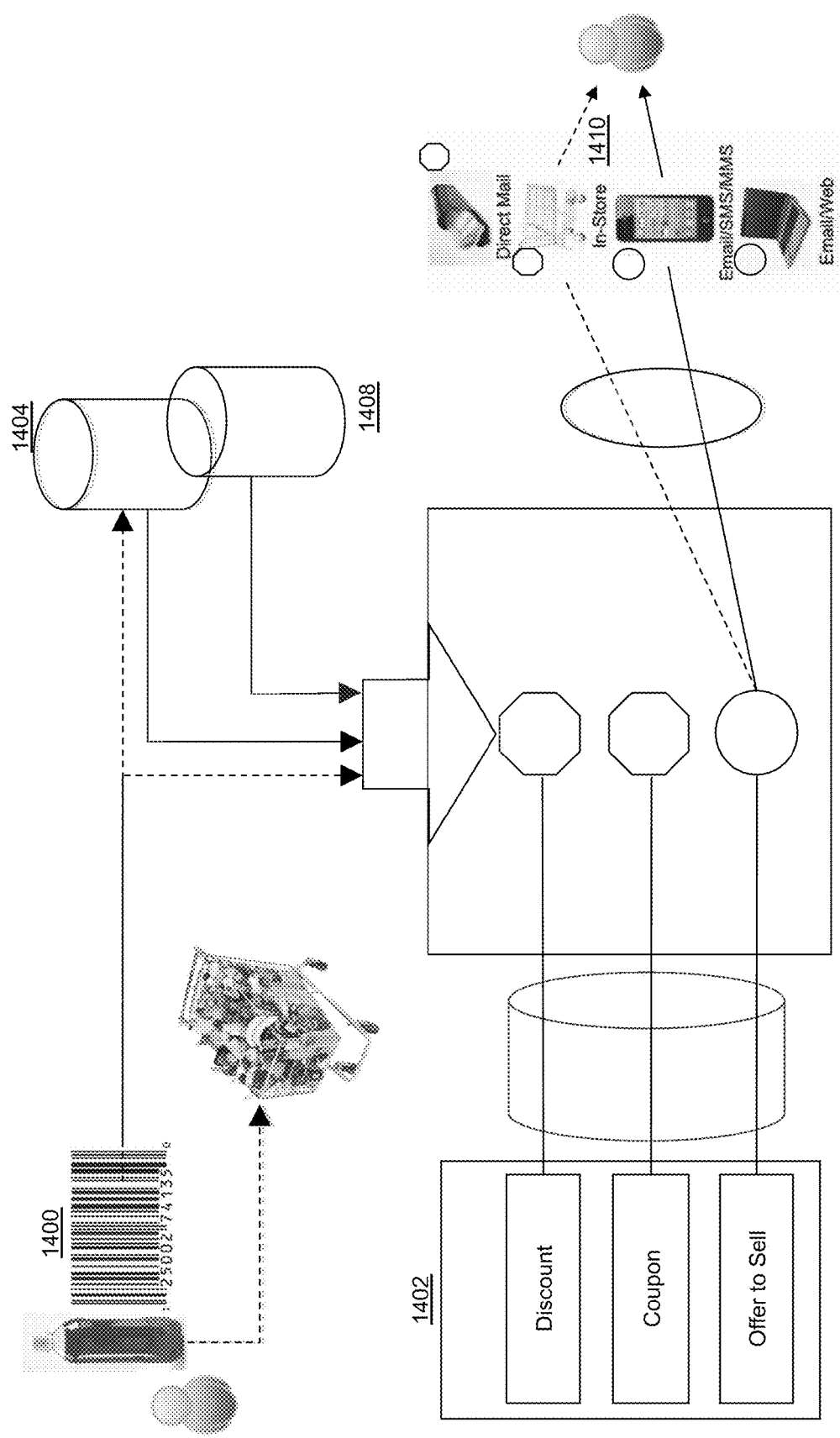
FIG. 14 depicts integration of past purchase behavior of a consumer with the real time purchase attributes.

FIG. 14 depicts integration of past purchase behavior of a consumer with the real time purchase attributes that may provide a functionality to offer related media to the in-store consumer. In an embodiment, an item may be described with a related Universal Product Code 1400 (UPC), a Past Purchase History Data Repository 1404, Business Rules Data Repository 1408, a repository 1402 that may store a plurality of Discounts, coupons, ads or offers to sell, and the like. In an embodiment, a consumer may scan an item to be purchased by using a handheld device, such as a mobile phone or the like. The item to be purchased may have an associated Universal Product Code 1400 that may be scanned by the handheld device. The scanned Universal Product Code 1400 may then be stored in the Past Purchase History Data Repository 1404 for future use. The Business Rules Data Repository 1408 stores a plurality of Business rules that may be defined by a retailer or may be pre-set. The repository 1402 may store a plurality of Discounts, coupons, ads or offers to sell, and the like that may be provided to the consumer in real time while the consumer is shopping.

The method as described by the present embodiment may enable selecting and providing at least one of the discounts, coupons, and ads from the repository 1402 to the consumer on a channel 1410. The discount, coupon or ad may be selected in accordance with the Universal Product Code (UPC) 1400 of the item scanned, past purchase history stored in the Data Repository 1404, and Business Rules stored in the Business Rules Data Repository 1408. The channel 1410 may be a direct mail or an Email, SMS or MMS on a mobile phone of the consumer, a web link, a coupon provided by an in-store printer, and the like. In an aspect, to provide a discount, coupon or ad to an in-store consumer, the channel 1410 may be an SMS or MMS on a personal mobile phone or a coupon printed by an in-store Catalina printer. A consumer may scan a bottle of cola. The related UPC of the cola bottle may be sent to the Past Purchase History Data Repository 1404 for future use. The retailer may have defined a set of rules stored in Business Rules Data Repository 1408 for the present UPC. The method of the present invention may enable the retailer to provide the ad to the consumer for a product that may be related to the present UPC such as an ad of a packet of Potato chips as the consumer may likely buy the same in accordance with the related purchase history stored in the Data Repository 1404. The method may also determine the best channel to provide the advertisement, offer, and the like to the consumer.

The present invention may enable associating the consumer traits with a plurality of attributes besides in-store behavior. The present invention may allow delivering media information based on a plurality of criteria such as segmentation from retailer CRM systems or whether a consumer is participating in a particular promotional program. In an embodiment, the present invention may also be helpful in addition of a media services layer to an existing Product Support Service (PSS) and may also enable calculating and assigning a plurality of traits in an off-line mode.

In an embodiment, the present invention may enable receiving information or traits from an external source and may then assign specific traits to a specific userID. The present invention may further enable matching the specific traits defined centrally with an in-store user. The traits exported from an external source may only be updated daily at the store level.

In an embodiment, the present invention may provide a functionality that may enable receiving a set of userIDs and corresponding traits for those user ids. Such traits may then be added to existing trait definitions or in-store trait definitions for the users corresponding to the user ids. The functionality provided by the present invention may enable receiving a list of the userIDs and related trait definitions. A new trait definition may be created for a special program initiated by a retailer for example a new season's sale. The new trait created for the new season's sale may then be added to the set of traits originally assigned to each consumer. For example, if a consumer originally had "DiaperBuyer" and "OrganicLover" traits assigned before the new season's sale then upon the new season's sale the consumer may have three traits: "DiaperBuyer", "OrganicLover" and "new season's sale shopper".

In an embodiment, the newly added traits may include same expiration rules as the in-store trait definitions. For example, a retailer may set an expiration of 2 months for a new season's sale. Therefore, at the end of the two months the "new season's sale shopper" trait definition may end, that is, the user may no longer be associated with the newly created trait definition. Accordingly, the retailer may have to provide an update for the "new season's sale shopper" trait definition to be reassigned to a consumer it wants to target.

In an embodiment, the retailer may centrally assign the new traits to a consumer or a subset of consumers. The retailer may centrally assign traits for a subset of the total user base. For example, the retailer may assign a trait to its top 100 organic buyers. Accordingly, the "Organic100" trait may be assigned to only those 100 users and all of the other users may remain unchanged.

In an embodiment, the functionality provided by the present invention may automatically update the list of users or user ids that may be centrally stored by a retailer. For example, the retailer may maintain a list of the userIDs and the related trait definitions that may include the "new season's sale shopper" trait definition that may expire after a period of time. After some time the retailer may add a new list of userIDs that may include a few userIDs present on the previous list and a plurality of new userIDs. In such a case, new trait definitions may be assigned to the new userIDs and the userIDs present on the previous list may remain associated with their existing trait definitions including the "new season's sale shopper" trait definition. The userIDs not present on the second version of the list but only on the first list may retain their existing trait definitions. The trait definitions now assigned to all the userIDs may expire at the end of the pre-fixed time period.

In embodiments, the present disclosure provides a Mobile-Initiated-Payment (MIP) facility that may allow a consumer to use a mobile device, such as an iPhone, to carry out transactions at a Point of Sale (POS) terminal in a retail environment, using a tender such as an Automated Clearing House (ACH), gift card, a credit card, and the like. The MIP facility may or may not be associated with the media delivery services platform 620. The tender may be registered directly with a retailer. For example, a shopping loyalty card may be linked to the consumer's checking account, credit card, debit card, or the like. At checkout, when the loyalty card is scanned and the consumer enters their secure payment password, payment is tendered. In the present disclosure, the consumer's mobile device may take the place of the loyalty card scan. Instead, a consumer may indicate that they wish to use mobile initiated payments from their mobile device. The consumer may utilize a mobile shopping and payment application, such as the scan-and-bag facility 1000, on the mobile device 1018 to enable the mobile device 1018 to drive a mobile initiated payment. The consumer may indicate in the mobile shopping and payment application that they have previously linked their shopping loyalty card to a tender. The consumer may then link the mobile number associated with the mobile device with the secure payment password. The application may send an activation message to the phone, such as by SMS, MMS, email, or the like. The consumer may then either click the link or enter the activation code received in the mobile shopping and payment application. Anytime a consumer wishes to use mobile-initiated payments on another mobile device, they need only to cause the mobile shopping and payment application to send the activation message to that mobile device.

Mobile initiated payment may occur by at least one of two ways. The consumer may initiate payment with the mobile shopping and payment application but enter their secure payment PIN at the POS terminal. Alternatively, The consumer may initiate payment with the mobile shopping and payment application and enters the secure payment password on the mobile device.

In general, the basic steps for mobile-initiated payment include: registering an ACH, debit or credit card payment with password and an enabled mobile phone number at a given retailer keyed to a consumer's loyalty card stored at a $3^{rd}$ party payment registry, wherein the consumer also registers their loyalty card with the mobile shopping and payment application. A consumer turns on the mobile shopping and payment application when entering a store and scans items (UPCs) with the application, each scan causing the in-store server to communicate with the POS. When ready, the consumer presses a Checkout button on the application or scans a barcode in the store to initiate checkout. The mobile shopping and payment application checks to see if the payment type is valid. If yes, the application prompts the consumer for MIP and then for their secure payment password to authenticate them and confirm the correct mobile phone number. If valid, the in-store server requests a one-time, short-time-to-live PIN from the payment registry. Once received, the in-store server pushes the order into the POS and drives it to tender the order using the loyalty card and pin as authentication. Upon successful tender, the application e-mails the consumer their receipt on the mobile device and prompts them to receive an e-mail copy of it. The process enables the mobile device with the mobile shopping and payment application to initiate a payment at a given retailer. This is different than pure mobile payments in that the mobile device is not used as the payment, but rather drives the process eliminating the need for the consumer to perform any action at a POS register.

Figure 10A:
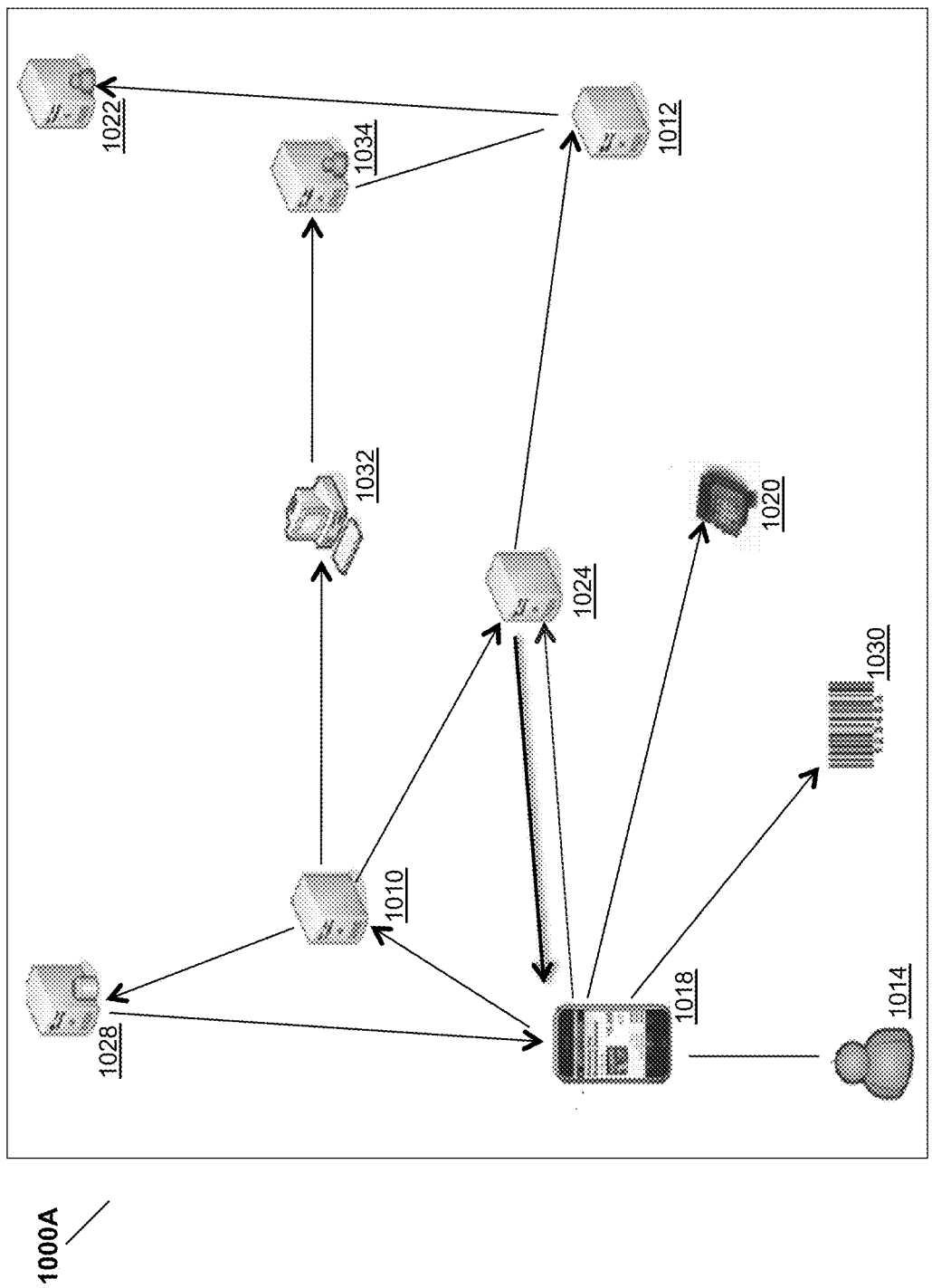
FIG. 10A illustrates a Mobile Initiated Payment (MIP) system, in accordance with an embodiment of the present invention.

Referring to FIG. 10A a Mobile-Initiated-Payment (MIP) facility 1000A for a retail environment is illustrated. The MIP facility 1000A may include an in-store server 1010 that may be connected to a Point of Sale (POS) terminal 1012 in a retail store. The in-store server 1010 may enable a consumer 1014 to scan items in aisles of the retail store. The consumer 1014 may scan the items through a handheld device such as a smartphone 1018. In embodiments, the smartphone 1018 may include a scrambling PIN pad that may be displayed on the smartphone 1018 to allow the consumer 1014 to enter a secure payment PIN. In an embodiment, the consumer 1014 may enter PINs using other electronic devices such as a POS payment device 1020 that may be connected to the POS terminal 1012. Further, the payment procedure followed by the MIP facility 1000A may be compliant to PCI Data Security Standards (PCI DSS), thereby facilitating safe handling of information regarding the tenders.

In an embodiment, the consumer 1014 may access and communicate with the in-store server 1010 using a mobile application of the MIP facility 1000A installed onto the smartphone 1018 of the consumer 1014. Further, the POS terminal 1012 may be an interface that may be accessible by the persons of the retail store. The POS terminal 1012 may include an LCD screen to display a list of products, prices, quantity, and the like. The POS terminal 1012 may include a general computer or may be a special checkout system.

In an embodiment, the consumer 1014 may request for enabling the MIP facility 1000A on the smartphone 1018 through the mobile application installed on the mobile device 1018. For example, an iPhone may be provided with a barcode scanning feature that may enable consumers to scan items from the store.

Further, the MIP facility 1000A may include a Paystation 1024 that may enable the consumer 1014 to conduct online payments through a credit card. The Paystation 1024 may be communicating with the in-store server 1010, the POS terminal 1012, and a payment server 1028. The payment server 1028 may store the tenders, the mobile numbers, the device IDs, and the like of various consumers. Further, the in-store server 1010 may be in communication with the payment server 1028.

The Paystation 1024 may possess a lockdown connection with the POS terminal 1012 as the Paystation 1024 may communicate with the POS terminal 1012 in real time. The lockdown connection may facilitate a high level of security between the POS terminal 1012 and the Paystation 1024. Accordingly, the Paystation 1024 may accept commands from trusted sources to securely transmit information to the POS terminal 1012. Further, at the Paystation 1024, the consumer 1014 may be able to view the list of items, cost of the items, and may also be able to view the total amount that may be payable. Additionally, the in-store server 1010 may possess lockdown connectivity with the Paystation 1024. The consumer 1014 may interact with the Paystation 1024 via the in-store server 1010 using the mobile application installed on the mobile device 1018 of the consumer 1014. Further, the Paystation 1024 may be provided with unique laminated barcodes that may be used to initiate the payment process.

The mobile-initiated payment architecture may differ depending on whether or not the mobile device being used for mobile payment is PCI DSS compliant. As mentioned herein, the MIP facility 1000A may be PCI DSS compliant while handling the PIN associated with the secure payment facility 1022, however, because the iPhone is not PCI compliant, additional technology is required to hide the PINs. Thus, the process may follow a flow including the consumer initiates payment with the application but enters their secure payment pin on the POS payment device 1020. In another flow, the user initiates payment with the application and enters the secure payment pin on the mobile device. It should be understood that other process flows may be possible utilizing the application.

In use, the consumer 1014 may turn on the mobile application installed on the mobile device 1018 while entering a retail store. The consumer 1014 may scan codes such as Universal Product Codes (UPCs) of items of interest using the mobile application. Every scan may allow the in-store server 1010 to communicate with the POS terminal 1012. When the consumer 1014 has selected all items of interest, the consumer 1014 may press a checkout button provided by the mobile application and displayed on the mobile device 1018. Alternatively, the consumer 1014 may scan a barcode 1030 for initiating a checkout process and identifying the checkout register. Thereafter, the mobile application of the mobile device 1018 may transmit a registration number of the mobile device 1018 to the in-store server 1010. The in-store server 1010 may further send a request to the payment server 1028 for checking whether the consumer 1014 has been enrolled for making payments through the mobile device.

In an embodiment, the consumer 1014 may be authorized by the payment server 1028 for making a payment through the smartphone 1018. In another embodiment, the payment server 1028 may not authorize the consumer 1014 for making mobile payments. In this case, the in-store server 1010 may send suspension orders to a workstation 1032 of the registration number of the smartphone 1018 sent by the consumer 1014. Further, the workstation 1032 may confirm the suspension orders of the registration number and may send an alert to the POS terminal 1012 through a node 1034.

In embodiments, the consumer 1014 not authorized by the payment server 1028, may send information such as mobile number, device ID, and the like to the in-store server 1010. The in-store server 1010 may save the information and may provide a registration number to the consumer 1014.

Further, when the consumer 1014 is authorized by the payment server 1028, the mobile application may initiate a checkout command to the Paystation 1024. Based on the request, the Paystation 1024 may prompt the POS terminal 1012 to ask for a PIN for accessing the secure payment facility 1022. The PIN may be provided to the consumer 1014 on registration of the mobile device 1018, mobile number, and tender information with the MIP facility 1000A. If the system determines that the items in the basket require no additional attention from in-store personnel (e.g. determining an age for an alcohol or nicotine purchase, requiring an audit either randomly or because of a specific security flag), the consumer 1014 may be prompted to enter the PIN through the POS payment device 1020. Once the PIN has been provided by the consumer 1014, the secure payment facility 1022 may deduct the amount payable by the consumer 1014 from the tender. Thereafter, the in-store server 1010 may send a receipt of the payment to the Paystation 1024. The Paystation 1024 may display the receipt to the mobile device 1018 of the consumer 1014. The consumer 1014 may then be prompted to send the receipt via an e-mail address of the consumer 1014.

In another embodiment, when the consumer 1014 is authorized by the payment server 1028, a dynamic pinpad may be sent to the mobile device 108 by the in-store server 1010. The consumer 1014 may enter the PIN on the scrambling PIN pad of the smartphone 1018. The consumer 1014 may send the PIN to the Paystation 1024 through the in-store server 1010, such as by using a barcode Triple Data Encryption Algorithm (DES) key. The 3DES key may encrypt the PIN for ensuring secure transmission of the PIN to the Paystation 1024. The Paystation 1024 may in turn decrypt the received PIN using Derived Unique Key Per Transaction (DUKPT) scheme of cryptography.

In embodiments, the PIN pad of the mobile device 1018 may utilize an OAuth authentication mechanism for interacting with protected data. Further, the Paystation 1024 may send the decrypted PIN to the POS terminal 1012. Once the PIN has been provided by the consumer 1014, the secure payment facility 1022 may deduct the amount payable by the consumer 1014 from the tender. Thereafter, the receipt of the payment generated by the in-store server 1010 may be displayed on the mobile device 1018. The consumer 1014 may then be prompted to send the receipt via an e-mail address of the consumer 1014.

In embodiments, the scanning done by the mobile device 1018 may be processed by the POS terminal 1012 for ensuring accurate pricing, inventory, accounting, and the like.

In embodiments where the mobile device has a near field communication (NFC) chip, direct, contactless payments from the device itself without use of the POS may be possible.

In embodiments, the present invention may include a system in which a user may control the log-in, transaction, and log-out process with respect to a merchant. The user's presence at the merchant's facility may trigger the log-in process, such that the merchant's systems become aware of the user's presence. Once the user may be registered with the merchant, information and services become available to the user without further action required by the user. Transactions may be facilitated, specials may be brought to the user's attention, and personal shopping may become available while the user remains in the facility. Upon leaving the facility, or after a certain elapsed time with a transaction being consummated, the user may be logged-out of the system.

Figure 15:
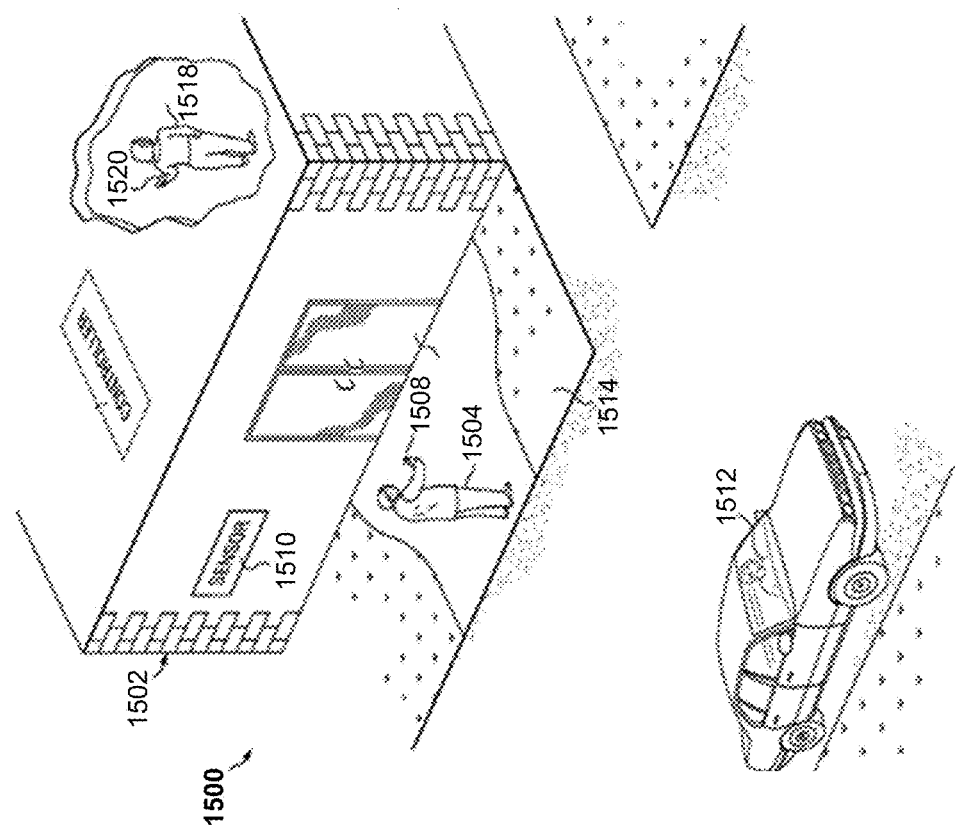
FIG. 15 illustrates an embodiment of the invention used with respect to a facility.

FIG. 15 illustrates an embodiment 1500 of the invention when used with respect to a facility, such as facility 1502. When a user 1504 arrives at the facility 1502, the user 1504 may be detected, and may be logged into the facility 1502. The log-in may be controlled by the user 1504 by using a mobile device, such as cell phone 1508, to call a log-in number, or by having a magnetic (or near-field device) strip that may be placed in contact with (or in proximity to) a sensor 1510. In some situations, the log-in may be accomplished without action being taken by the user 1504, for example, by knowing the geographical position of the user 1504, which may be broadcast from the user's wireless device along with the identity of the user 1504. The wireless device may know its location by GPS or otherwise. Bluetooth, NFC, LBS, E911, or IVR technology may be used to make the user's presence known inside facility 1502.

Alternatively, the user's wireless device may periodically emit a code to identify a user such that when the user may be in proximity of the facility 1502, the user may be logged-in. Using such a system, when a user, such as user 1512, may drive past the facility 1504 along street 1514, the user 1512 may be temporarily logged-in to the facility 1502 such that specials or other information, as will be discussed hereinafter, may be communicated to the user 1512.

For example, after a previous visit, if a user enters into a user profile (such as from a home PC) the user may indicate that he/she wanted to purchase an item at a given price point. In such a situation, when the user is driving by (or otherwise logged-in), the user may receive a reminder that he/she wanted to buy item X and that the item may be available at the desired price. A user may also visit a merchant's website to arrange an item list to identify what he/she may want to purchase at the merchant's store. Thereafter, the list may be available to the user's cell phone, for example, for use when the user may be near or enters the merchant's facility. In another example, the user 1504 may walk into the facility 1502 and the sensor 1510 may signal his/her presence within the facility 1502.

Figure 16:
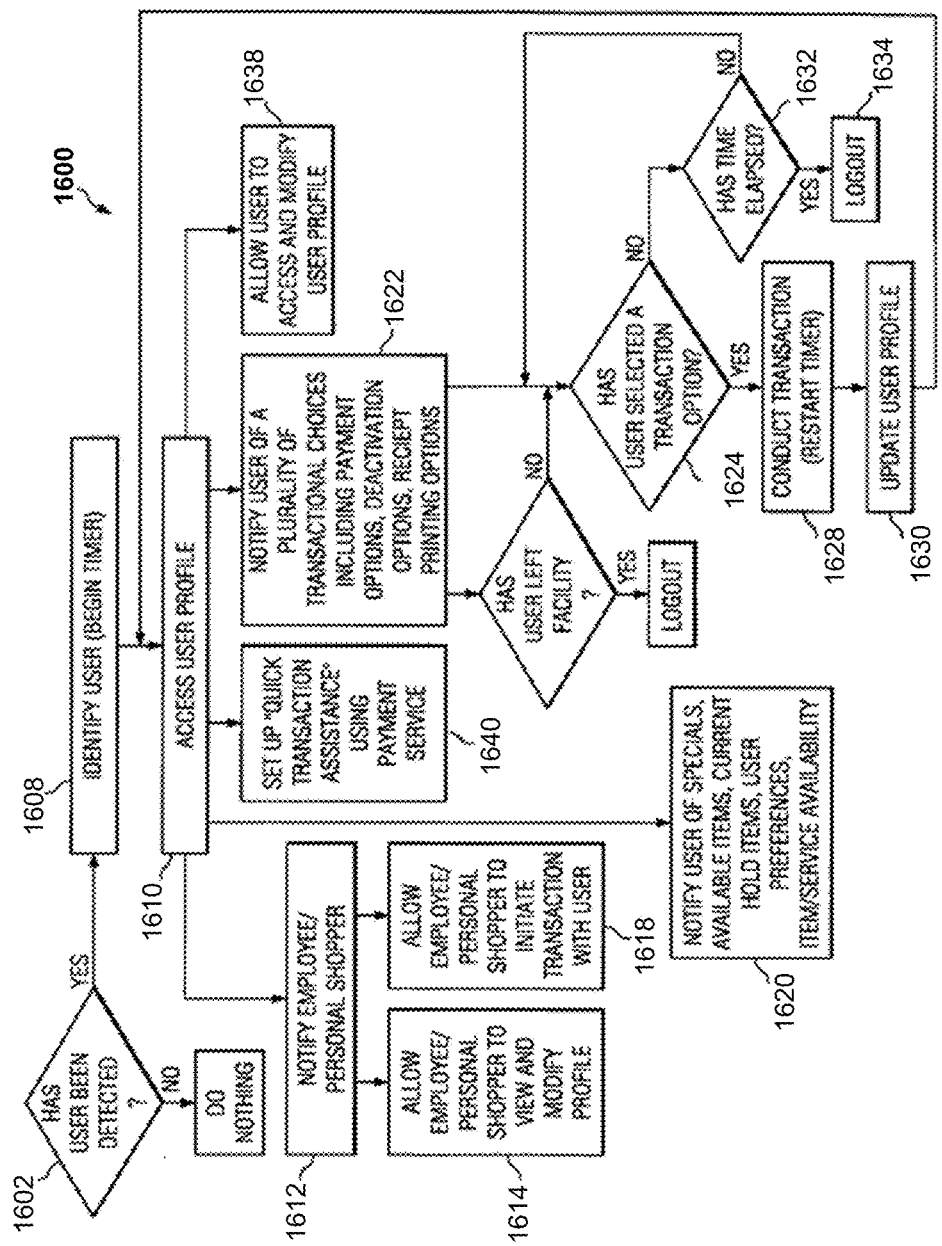
FIG. 16 illustrates an embodiment of a process illustrating log-in, transaction, and log-out.

Referring to FIG. 16, a process 1600 of illustrating log-in, transaction, and log-out of the a user is illustrated in accordance with an embodiment of the present invention. At step 1602, presence of the user 1504 may be detected. This detection may enable identification of the user. Thereafter, at step 1608, the user's profile may be retrieved, for example from a memory. At this time a timer may be set. In an embodiment, the identification process may be automatic or may require participation such as a password from the user. The password may be important if credit or "quick" payment options are available while the user is in the facility.

Further, at step 1610, the user profile accessed may contain information about the user including, but not limited to: previous purchases, purchase characteristics, user characteristics, user preferences, receipts, discounts, payment information, identification information, monetary balances, and the like.

Once the user's profile is retrieved, steps 1620 and 1622 may be used by the facility to communicate with the user. For example, the facility may notify the user of specials, available credit, amount of money remaining on gift cards, coupons, previous on-hold or wish list items. At this point, based on the user's location in the facility, the user may learn of special offers via SMS/MMS, NFC, Bluetooth, Media, or IVR. Alternatively, the user may obtain this information by receiving an e-mail on his/her PDA or other handheld device, or the user may access the information through Internet connectivity via his/her cellular phone or handheld device. The user may also view his/her item or shopping list, and based on the user's location, the list may be sorted to place items nearest in proximity to the user at the top of the list.

In embodiments, at step 1612 a notification may be sent to a facility employee 1518 and the facility employee may be provided with access to the user's profile, thereby allowing the facility employee to view pertinent information pertaining to the user. This information may be viewed, for example, using a wireless device, such as device 1520 (FIG. 15) in the possession of the facility employee. The information supplied to the facility employee may be any information, such as sizes, last purchases, birthdays, preferences, names of family members, and any other information stored in the user's profile. For security purposes, the system may limit the amount of access the facility employee may have in viewing and modifying the user's profile.

At step 1614, the facility employee may be provided with an option to view and modify the user's profile. Further, at step 1618, the facility employee may also have the option of initiating a transaction with the user. For example, the facility employee may send a list of items along with pricing and availability to the user's wireless device for consideration. Upon receipt of this list, at step 1628, the user may conduct the suggested transaction by, for example, purchasing the items or storing them in the user profile's wish list.

At step 1622, the user may be provided with a plurality of transactional options while in the facility. For example, if the user wishes to deactivate a wireless device while in the store, at step 1624, the user may select the deactivation option and the wireless device may be logged-out, at step 1634. Further, if the user does not desire to interact with a central server of the facility, the user may deactivate his/her wireless device accordingly.

At step 1640, a "quick transaction" may be set up when the wireless device may be detected. The "Quick transaction" may be a process that may allow the user to authorize payment for merchandise (or services) using the wireless device. Once the "quick transaction" may be set up, steps 1622 and 1624 may allow the user to select a purchase option from the list of transactional options, thereby authorizing payment for an item from the facility using the wireless device. If desired, an option from the list of transactional options may allow the user to select a medium from which the user may receive the purchase receipt. For example, the user may choose to have the receipt printed in the facility, sent to an e-mail account, or stored in his/her user profile.

Further, at step 1624, as the user selects a transactional option, the transaction may be conducted, at step 1628.

Further, at step 1630, the transaction may be recorded in the user profile. It should be noted that the transaction may be recorded in other databases as well, such as inventory tracking systems, marketing and promotion systems, and any other system which may benefit from tracking transactions. After the transaction is completed, the timer may reset.

At step 1638, the user may be allowed to access and modify his/her user profile using the wireless device. For example, if while the user is shopping in the facility he/she sees something desired but he/she cannot purchase, the user may access his/her user profile and add the desired item to a wish list. In an embodiment, the user may input a price point at which he/she may be willing to make the purchase, so when the price of the item is lowered to the desired purchase price, the user may be notified at step 1620.

As the user profile may contain sensitive information, it is important to include security features. At step 1630, a timer may be utilized which may determine if a sufficient amount of time has passed since the last transaction. If it has, then it may be safe to assume the user has left the facility. Specifically, once the user may be identified at step 1604, a timer may be set. At step 1632, the system may include a pre-determined time limit, for example twenty minutes, such that when the time limit is exceeded the system may assume that the user has left the facility and may log-out the wireless device. However, if the user conducts a transaction before the time limit is exceeded, the timer may be reset, at step 1628. Accordingly, the user may have another period of time to conduct another transaction before the system may assume that he/she has left the facility. This step may be particularly important for wireless devices which may be set up with "quick transaction" to prevent unauthorized transactions.

In embodiments, when the user leaves the range of the facility's sensor, the system may assume that the user has left the facility and may log-out the wireless device. This process may be used in conjunction with the timer or in place of the timer and may be intended to provide further security against unauthorized transactions.

It should be evident to a person skilled in the art that any number of methods may be used to log the wireless device out of the system, thereby ensuring the device's security. For example, the user profile may be set up such that when a triggering event occurs, the system may not allow further transactions. Some examples of triggering events may include but are not limited to: a user selecting a log-off option; improper identification supplied by the user; the passage of time; the device leaving the sensor's range; passage of time without a transaction occurring; exceeding a predetermined number of transactions; exceeding a per transaction spending limit; exceeding a cumulative spending limit; conducting an unapproved transaction; or attempting to conduct a transaction outside the transactional options, or conducting transactions detectable by fraud detection systems that are deemed inappropriate for this user based on the user's profile and other information.

Figure 17:
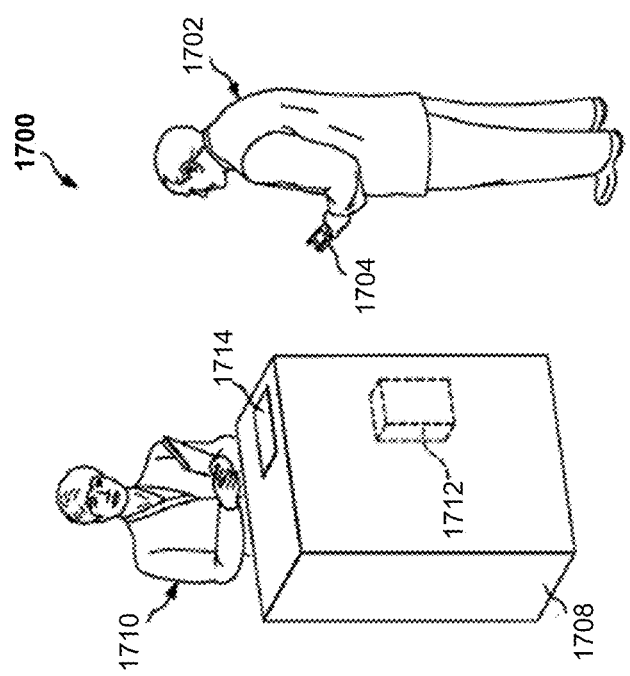
FIGS. 17 and 18 illustrate embodiments of the invention used in different environments.

FIG. 17 shows another embodiment 1700 of a system in which a user 1702 with a wireless device, such as cellular telephone 1704 may approach a podium 1708 of a restaurant where a host 1710 may be positioned. In the embodiment shown, the host 1710 may enter an identification number (such as the calling number) of the wireless device 1704 into a controller 1712 in a number of ways. The identification number may be spoken or it may be Radio Frequency Identification (RFID) or Near-Field (NF) communication transferred via the wireless device 1704 via a receiving device 1714.

In one embodiment, a control number may be provided to the host 1710 by the controller 1712. Alternatively, the host 1710 may provide the control number for use by the controller 1712. This control number may then be stored in a memory in association with the calling identification number of the user's wireless device 1704.

When a table for the user 1702 becomes available, the host 1710 may input the control number of the user 1702 into the controller 1712 which may then establish a communication link via either the public switch network, a wireless communication network, or a pager network (not shown) to the wireless device 1704. The wireless device 1704 may then provide a signal or a message to the user 1702 indicating the availability of the table. In an embodiment, this message may also provide other information pertaining to the table, such as its location, and the like.

While the user 1702 may be waiting for a table, messages may be sent to the wireless device 1704 from the business establishment. These messages may be, for example, specials of the day, menus, coupons for special pricing, music or other entertainment. One or more of these messages may be a bidirectional communication. For example, a message may include, "We are featuring a certain drink or hors d'oeuvre today. The price is $4.95. Do you wish to order?" The user 1702 may then choose to answer "yes," "no" or ignore the message. Any reply message may be communicated over a bidirectional link back through the network to the controller 1712 which may then take the necessary action to insure that the request of the user 1702 is performed.

Figure 18:
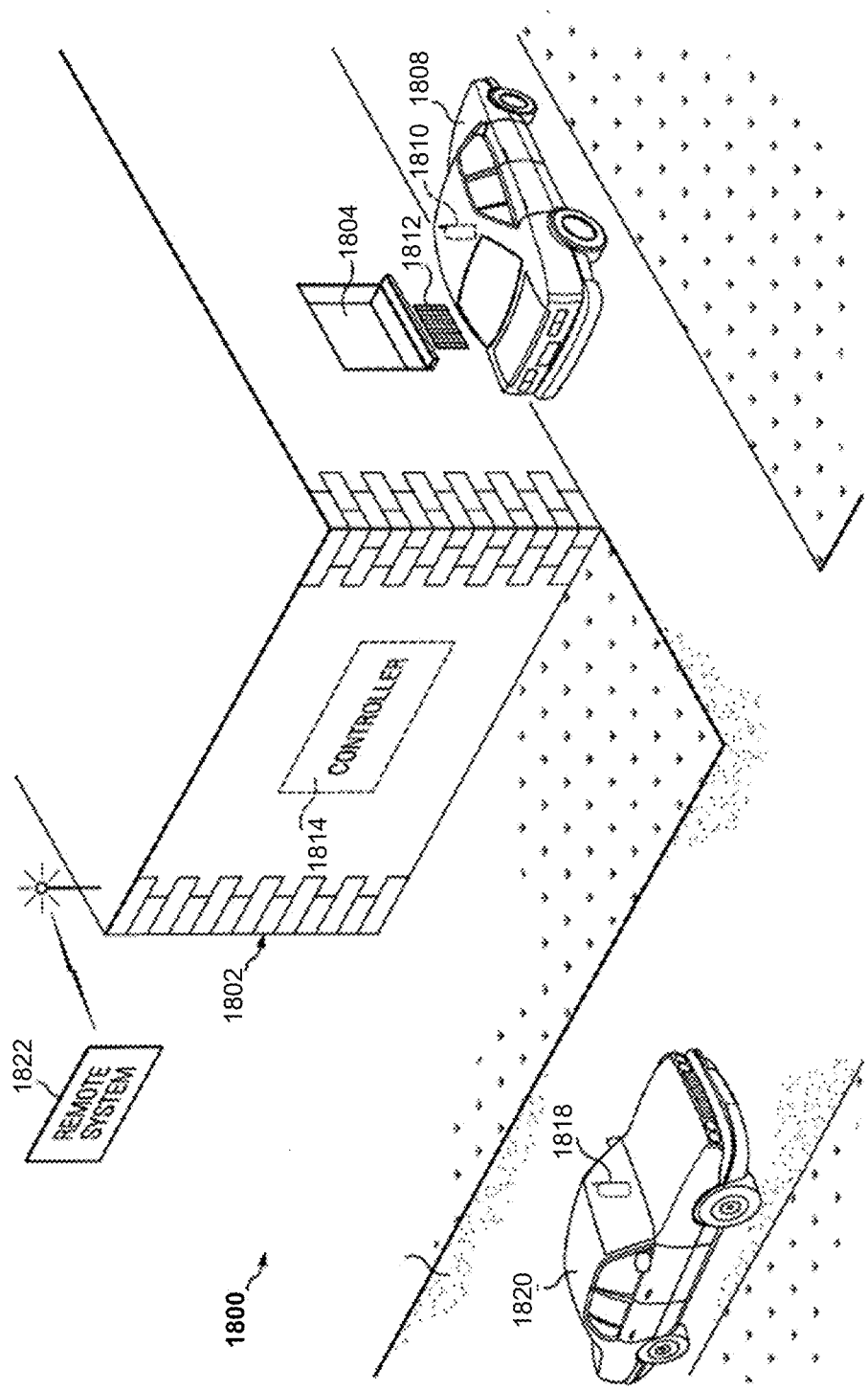

While the system may be shown in conjunction with a restaurant setting, any merchandise (or service) that a user is waiting for can be the subject of the system. FIG. 18 shows, for example, in an embodiment a system 1800 may include a pharmacy 1802. The pharmacy 1802 may include a drive-up window 1804. A user 1808 may be in his/her vehicle waiting for service. The user 1808 may have a wireless device 1810 which may communicate via RFID or NF communication via an input device 1812 to register an identification number, such as the calling number of the wireless device 1810. Alternatively, the calling number may be registered verbally with a person located at the pharmacy 1802, or the calling number may be registered from a remotely located user by having that user call in and verbally present the calling number. In embodiments, caller ID or another device may provide the identification of the wireless device 1810 of a remote user.

In operation, using the system 1800, a prescription (Rx) or other merchandise desired from the pharmacy 1802 would be entered into a controller 1814 as well as into a normal pharmaceutical system (not shown) of the pharmacy 1802. A physician may call the Rx in to the pharmacy 1802 or remotely type the Rx into the controller 1814 from the physician's office or other location. Further, attached to the prescription may be the user identification number. The controller 1814 may operate in conjunction with the pharmacy 1802, to cross-link the user identification, as obtained from the doctor, with the user's calling identification number and with a code number (if desired). An alternate method of delivering a Rx to the pharmacy 1802 may be by physically hand carrying the Rx to an attendant, who may then register the user's calling identification in association with a code number.

In yet another method of delivering the Rx to the pharmacy 1802, the process 1600 (FIG. 16) may be. In that case, the physician may type the Rx and any additionally required information into a user's profile using either the user's wireless device 1818 (user 1820, FIG. 18) or a remote computer (not shown). Thereafter, when the user 1820 comes within range of the input device 1812, the detected profile may notify an employee of the pharmacy 1802 of the user's presence. The pharmacy's employee may then access user 1820's user profile, view/modify the Rx, and may fill the Rx. In an embodiment, the pharmacy's employee may view the user profile for other information, such as other prescribed medication or medical insurance information. Similarly, the pharmacy's employee may modify the user's profile as explained above at step 1618. For example, if the Rx has a limited number of refills, the pharmacy's employee may modify the user profile to reflect the number of refills remaining for the Rx.

The user may then be free to leave the pharmacy 1802 and from time to time messages may be delivered to the user using, for example, the code number, with respect to other services available, such as specials, coupons, rebates, etc.

At the time when the Rx becomes available, the code number associated with the Rx may be communicated to the controller 1814. In an embodiment, the controller 1814 may include a computer, a memory, a message store, a voice-to-text device, and a text-to-speech device, operating in association therewith. When the code number of the available Rx arrives at the controller 1814, it may retrieve from the memory the user's calling number, such as the calling number of the wireless device 1818 for the user 1820. A proper message may then be selected from the message store for communication via a communication link to the wireless device 1818. This communication link may be established locally from the pharmacy 1802 or it may be established from a remote system 1822.

In some instances during the filling process of the Rx, the pharmacist may require additional information about the patient or a clarification of the patient's birth date or other information. If the information is available, for example, in the memory of the controller 1814, then upon initiation of a request, the information may be provided from the memory. In some situations, the request for additional information may be sent from the controller 1814 to a user, such as the user 1820, via the wireless device 1818 on a bidirectional link under control of the assigned control code. The user 1820 may be asked for a birth date, an address, or other information. The user 1820 may then communicate the information, either using a touch pad or verbally back to the pharmacist. In an embodiment, the verbal communications may be, translated by the voice-to-text device of the controller 1814.

In an embodiment, when the user 1820's Rx is ready, a communication may be sent from the message store through the system to the wireless device 1818 so that the user 1820 may drive up to the window 1804 to retrieve his/her filled Rx. As the user 1820 is approaching the window 1804, the wireless device 1818 may identify itself, for example, via RFID or NF detector 1812, and the proper Rx may be ready when the user 1820 arrives at the window 1804. In an embodiment, when the user 1820 is notified that the Rx (or other merchandise) is available, a price may be included in the message and the user may be given the opportunity to authorize payment for the merchandise at that time.

Again, it should be evident to a person skilled in the art that while the inventive concepts have been discussed with respect to a pharmacy, any type of establishment may utilize the concepts discussed herein so that a user can register (or have registered) his/her calling identification, and when the merchandise is ready, the user may be notified. While the user is waiting for such notification, other messages may be delivered to the user pertaining to services available, either at the establishment or in conjunction with the desires of the user.

Figure 19:
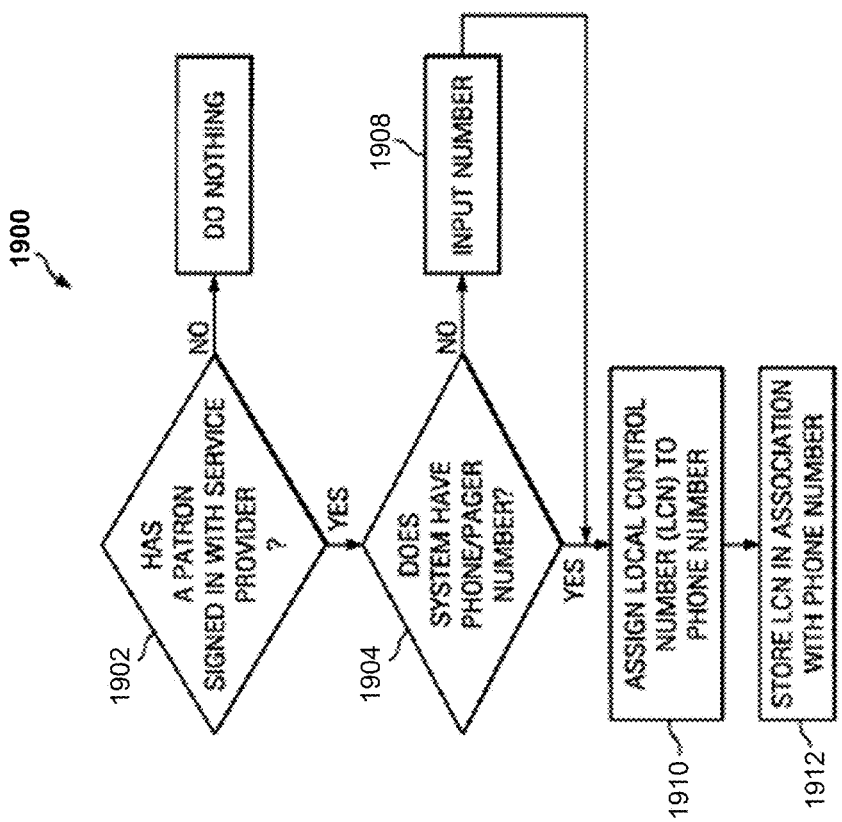
FIG. 19 illustrates an embodiment of a process illustrating number registration.

Now referring to FIG. 19, a process 1900 for registration of a number is described in conjunction with FIGS. 17 and 18, in accordance with an embodiment of the present invention. At step 1902, signing information of a user may be determined. Specifically, the step 1902 may determine whether a user has signed in with a service provider. The service provider may be a restaurant, a pharmacy, or any other type of commercial environment where notification of an event is important. Further, at step 1904, it may be determined whether a system already has a calling phone or pager number of a wireless device that may be used by the user. If the system does not already have that information, then, at step 1908, the input of the calling information number may be controlled. This could be by RFID or NF communication, caller ID, verbal with a voice-to-text conversion, and the like.

Further, at step 1910, a local control number (LCN) may be assigned to the phone number. It may be noted that the step 1910 may not be necessary and the system may use the actual phone number or caller identification number of the wireless device. For ease of discussion herein it will be assumed that an LCN is utilized. The LCN may be stored in association with the phone number at step 1912. This storage may be for example, in a memory of a controller such as the controller 1814 under control of a computer. However, any other system, either local to the physical location of the user or the place of establishment or in a remote system, such as the remote system 1822 may be used.

Figure 20:
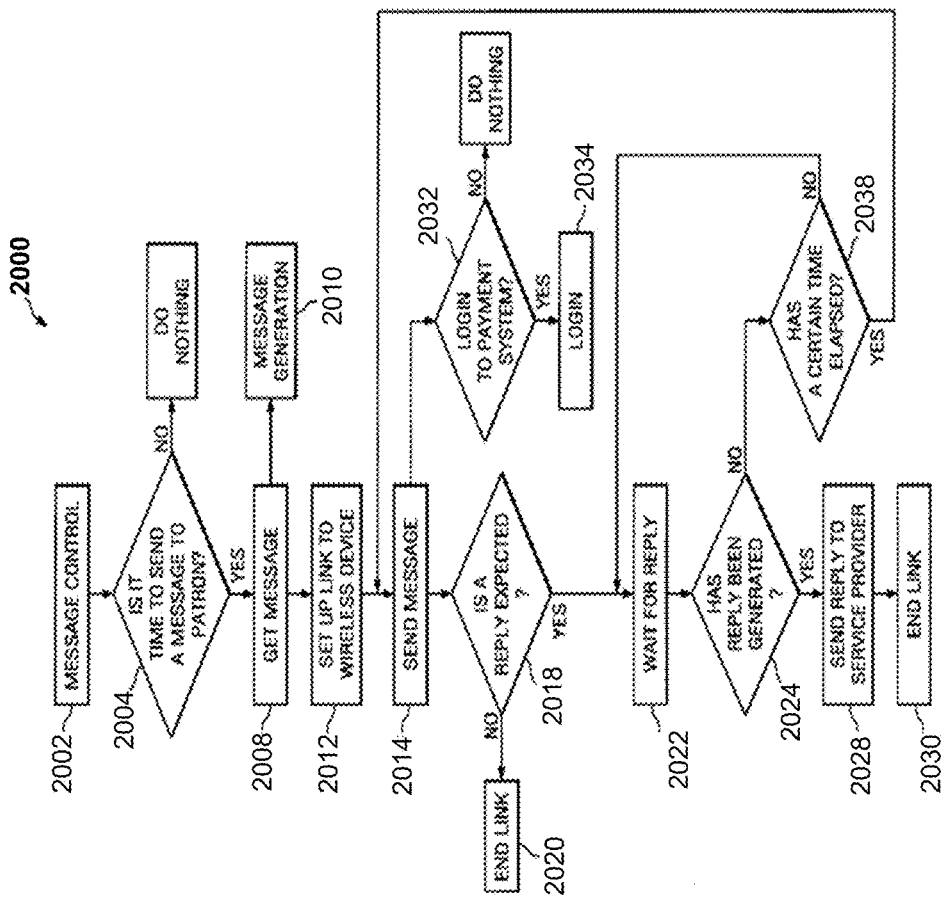
FIG. 20 illustrates an embodiment of a process illustrating user message control.

FIG. 20 shows an embodiment 2000 of a process for receiving messages and notifications and communicating those messages to a user from time to time. At step 2002, a message control may determine which messages need to be sent at a given time. These messages may be prerecorded and selected by identification number or they may be input into the system live by a host, a pharmacist, or any other establishment member. Further, these messages may be converted to speech via a text-to-speech device. The messages may contain information including but not limited to: the availability of a service, product, promotion, discount, special pricing, or payment option.

At step 2004, it may be determined if it is time to send a message to a user. This determination may be, for example, based on the fact that an Rx is filled or that other merchandise or services are available. The time of the message may be controlled such that, for example, if an Rx is filled in the middle of the night, the notification may not go out until morning. Likewise, the message may be sent immediately following the detection of a wireless device within range of a sensor such as the sensor 1510 (FIG. 15).

Further, at step 2008 and step 2010, a message may be generated and/or may be retrieved from a data store. Thereafter, a link may be set up to the wireless device at step 2012, under control of the controller 1814 (FIG. 18). At step 2014, the message may be sent to the public switched network, internet connection, packed switched network or otherwise, in accordance with the calling identification number provided during the initial registration period. At step 2032, it may be inquired whether a user may log-in to the payment system. If yes, at step 2034, the user may log into the payment system.

At step 2018, it may be determined whether a reply is expected, i.e., bidirectional communication has been set up. If not, then the original message link may be terminated at step 2020. However, if a reply is expected, then at step 2022 and step 2024, it may be determined if a reply has been generated. If yes, then the reply may be sent, at step 2028. Thereafter, at step 2030 the link may be ended. In an embodiment, at step 2024, if a reply is not generated within a certain time a repeat message is sent to the user to try to establish a bidirectional communication so as to obtain a reply message at step 2038.

Further, as mentioned in FIG. 1, the present invention may relate to management, enrollment, and redemption aspects of a loyalty program using a POS terminal, a program management system, and a consumer's mobile device. Embodiments of the invention may allow a consumer to both pay for a transaction and participate in a loyalty program using a single payment device at a POS terminal.

In an embodiment, the consumer may use a credit card that may not be associated with the merchant to pay for goods at the POS terminal. The POS terminal may capture swipe data from the credit card. The POS terminal may then transmit transaction information such as the captured payment device identification information and a total amount due for the transaction to the processing platform. In some embodiments, the processing platform may be located at a remote location from the POS terminal and one processing platform may communicate with a number of POS terminals. The processing platform may search a database such as a profile database 13 of stored consumer records to locate a consumer record associated with the transmitted payment device identification information. In addition to payment device identification information, the consumer record may contain mobile device identification information and loyalty program data.

In another embodiment, the POS terminal may capture mobile device identification in addition to or in alternative to capturing the payment device identification information discussed above. The system may then locate a consumer record based on the mobile device identification information.

Figure 21:
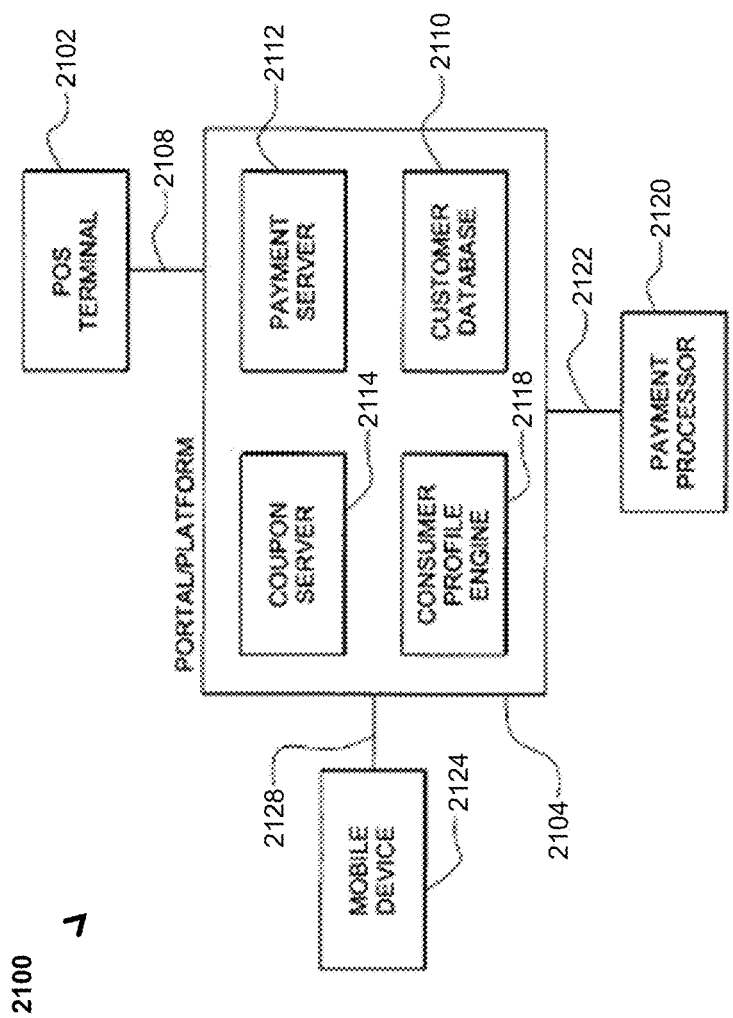
FIG. 21 illustrates an overview of an embodiment of a payment/loyalty program architecture.

Referring to FIG. 21 an embodiment of system 2100 is illustrated for administering a loyalty program and processing consumer payments for transactions. The system 2100 may include at least one POS terminal, such as terminal 2102. The POS terminal 2102 may be connected to a processing platform 2104 through a communications link, such as link 2108. The communications link 2108 may utilize any communications hardware and methods known in the art capable of transmitting data and the link 2108 may include phone lines, T1 lines, ISDN lines, or wireless links such as wireless links using the IEEE 802.11 standard. In some embodiments, communications link 2108 may include multiple communications system and protocols. For example, in one embodiment, the POS terminal 2102 may connect over an Ethernet cable to a cable modem that may then communicate over a fiber-optic cable with a server that may then connect over a different fiber optic line to another server that then connects over a T1 line to the processing platform 2104.

In embodiments, the processing platform 2104 may be physically located in a remote location from the POS terminal 2102. The processing platform 2104 may include, for example, a database of consumer records 2110. The processing platform 2104 may administer one or more loyalty programs and may contain different consumer database 2110 for each loyalty program. Further, the consumer records may include mobile device identification information, payment device identification information, and loyalty program data for a consumer. In some embodiments, the consumer's mobile device identification may be a phone number for a mobile phone, and the consumer's payment device identification may be a credit card number. One consumer record may contain payment device identification information for a plurality of payment devices. In some embodiments, the consumer database 2110 may only allow a unique mobile device identification to be associated with a single consumer record. The consumer database 2110 may be stored on a server using database storage techniques known to those skilled in the art.

In an embodiment, the processing platform 2104 may include software and hardware to perform additional functionality. The processing platform 2104 may, for example, include a payment server 2112 to process payments and communicate with the payment processor and a coupon server 2114 to generate and distribute promotional offers. The processing platform 2104 may additionally include a consumer profile engine 2118. The payment server 2112, the coupon server 2114, and the consumer profile engine 2118 may be implemented in software using any programming technique known to those skilled in the art such as XML, C++, or SQL. The software components may be located on a single physical server in some embodiments or may be located on different servers to increase capacity and efficiency as is known in the art.

Further, the processing platform 2104 may connect to a third party payment processor 2120 through a communications link 2122. The communications link 2122 may be implemented using any communications technique known in the art and may include multiple physical links, as discussed above with respect to the link 2108. The third party payment processor 2120 may accept payment device information in any standard format and may transmit confirmation in any standard format after processing the payment. In this context, payment device information may include minimal information required to identify the payment device, such as a credit card number and expiration date, or could include "swipe data," which is known to those skilled in the art.

In an embodiment, the processing platform 2104 may connect to the consumer's mobile device, such as to device 2124 over a communications link 2128. The communications link 2128 may include a wireless communications link using a standard wireless communications technique, such as Bluetooth, IEEE 802.11, cdma2000, GPRS, or any other wireless standard known to those in the art. In an embodiment, the consumer's mobile device 2124 may be a mobile telephone identified by a telephone number and capable of receiver SMS messages. In another embodiment, the processing platform 2104 may establish temporary communication links with a plurality of mobile devices 2124 simultaneously.

Figure 22:
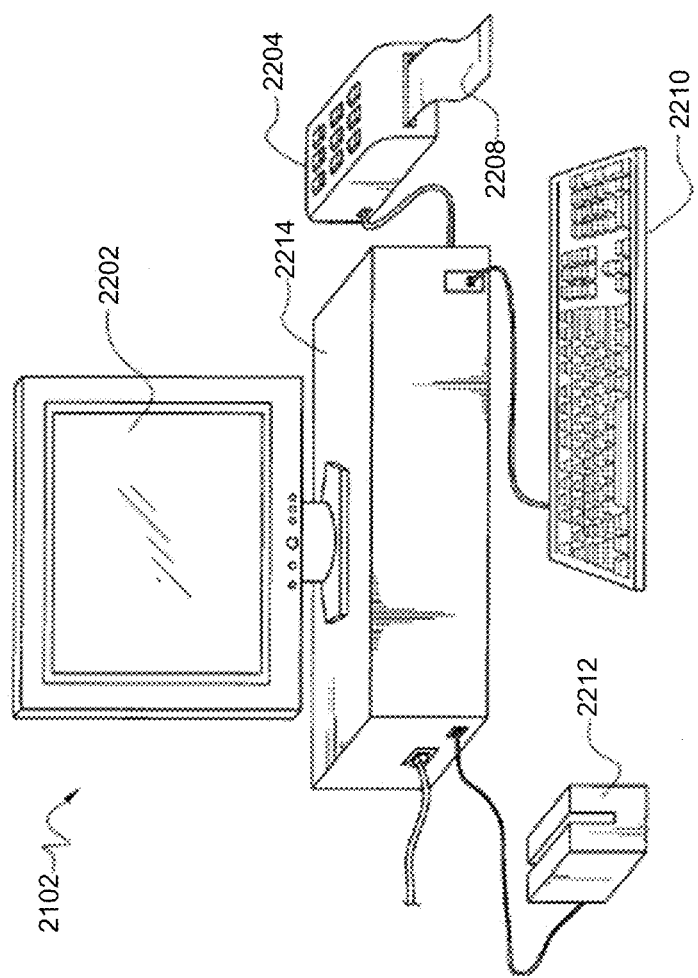
FIG. 22 illustrates a point of sale (POS) terminal for use in an embodiment.

FIG. 22 illustrates a POS terminal, such as terminal 2102, which may include a display 2202 that may be capable of displaying messages to a merchant or consumer. The POS terminal 2102 may also include a printer 2204 that may be capable of printing out a receipt 2208. The POS terminal 2102 may further include a data entry device, such as a keyboard 2210 and a payment device reader, such as a reader 2212. In embodiments, the data entry device may be a touch screen integrated with the display 2202 or any other data entry device known to those skilled in the art. The payment device reader 2212 may, for example, read information stored on the magnetic strip of a payment card, such as a credit card or debit card. Further, the payment device reader 2212 may also obtain payment information through any other method known in the art, such as, for example, reading an RFID tag or a near-field communication (NFC).

In embodiments, the POS terminal 2102 may not include the payment device reader 2212, but may rather accept payment device identification information through a data entry device, such as the keyboard 2210. In some embodiments, the POS terminal 2102 may also be capable of capturing mobile device identification information in addition and/or as an alternative to payment device information. For example, the data entry device such as the keyboard 2210 may be used to enter mobile device identification information. In another example, the payment device reader 2212 may be used to capture mobile device identification information through such methods as RFID, NFC, and/or the like. It should be understood that the POS terminal 2102 may accept mobile device identification information in addition to or as an alternative to other payment device identification information. Where the mobile device is used by the POS terminal 2102 to effectuate payment, the mobile device may function as a payment device and the mobile device identification information may include payment device identification information.

Further, the POS terminal 2102 may also include hardware for communicating with a processing platform 2104 over a communications link 2108 (FIG. 21), as discussed above. The POS terminal 2102 may also include a processor 2214 that may be capable of running software written in any programming language known to those skilled in the art. In embodiments, the processor 2214 may be capable of running software written in a language specifically designed for payment applications, such as SoftPay® by Verifone®. In some embodiments, one or more POS terminals may be a Verifone® Omni® 3750 terminal.

Figure 23A:
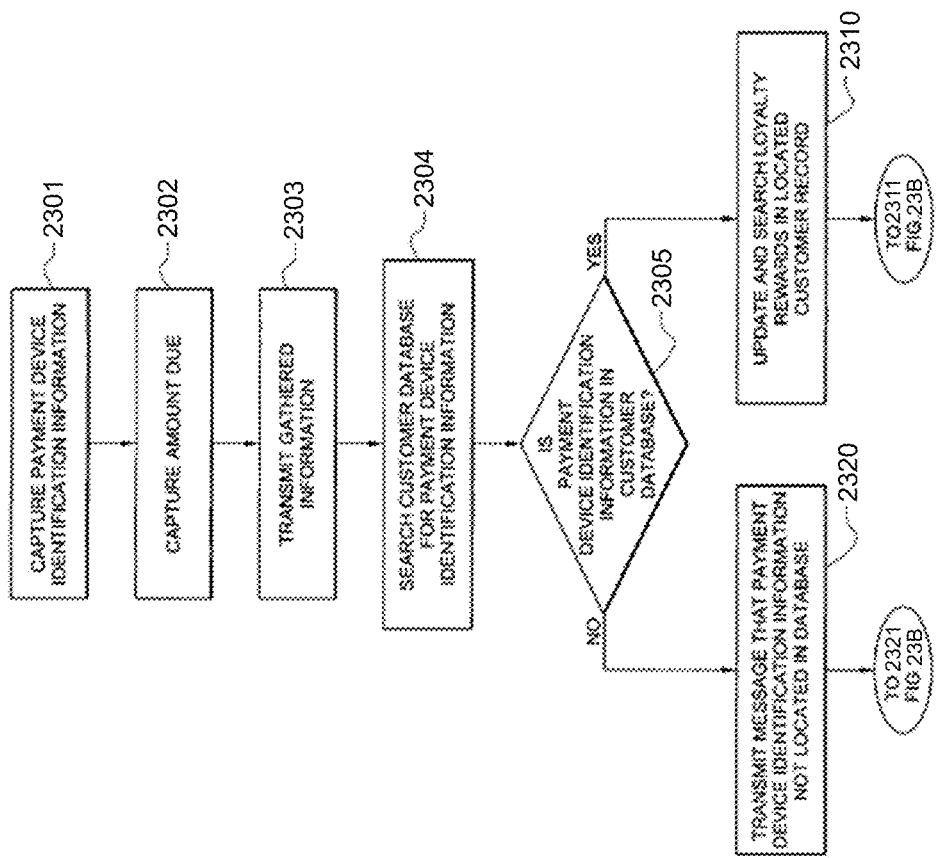
FIGS. 23A, 23B, and 23C illustrate flow charts showing use of the system in an embodiment.
Figure 23B:
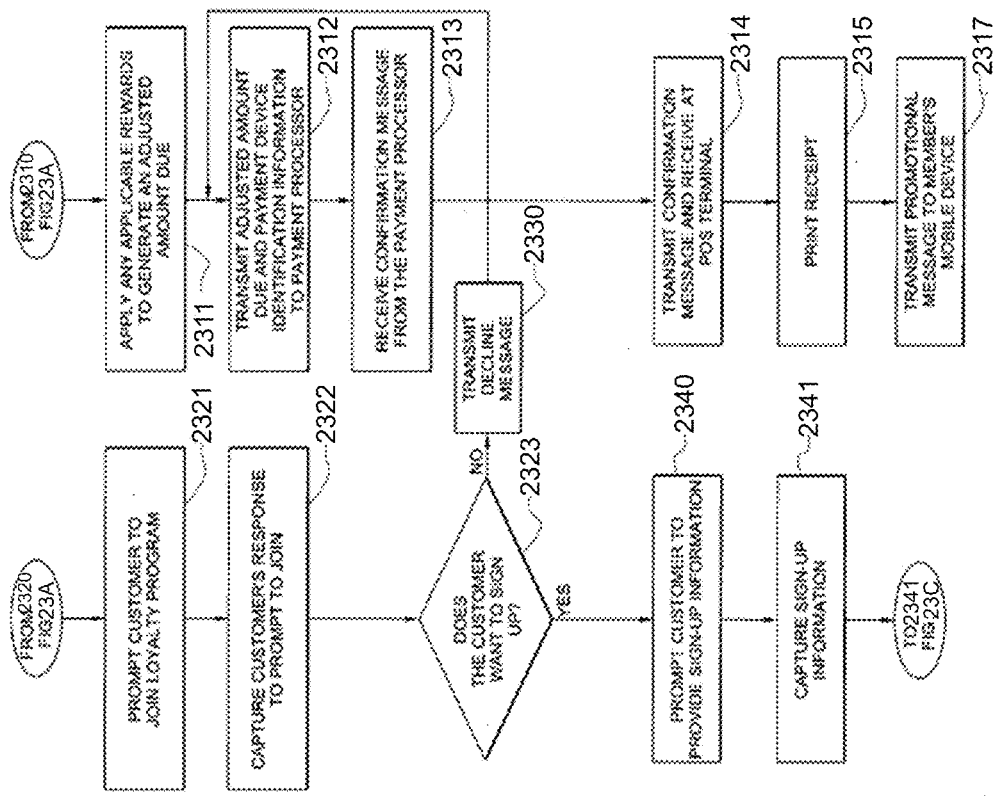
Figure 23C:
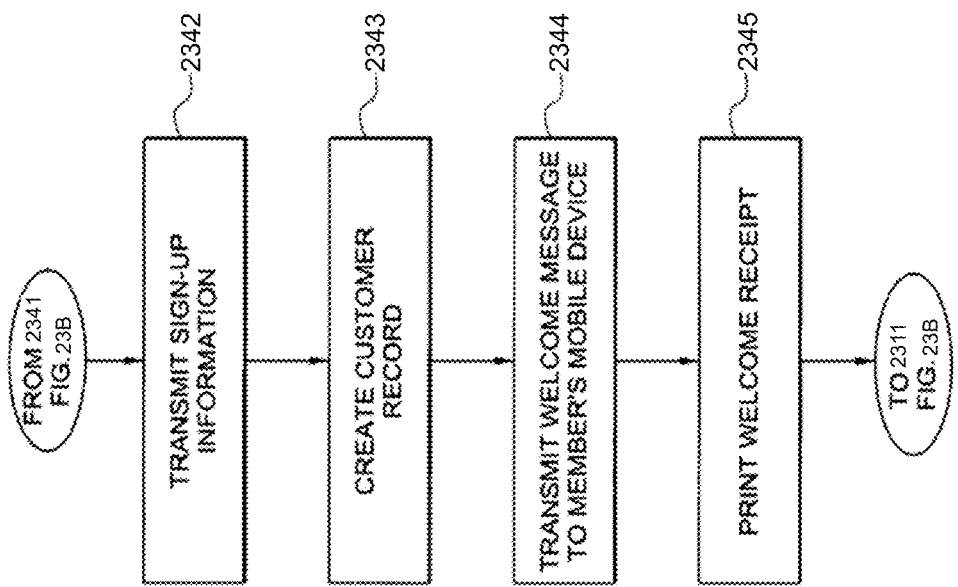

FIGS. 23A, 23B, and 23C may illustrate flow charts showing use of the system in an embodiment. In embodiments, the steps may be performed using the exemplary system of FIG. 21 and the POS terminal 2102 shown in FIG. 22. The steps shown in FIGS. 23A, 23B, and 23C are shown in a particular order, but as one skilled in the art would understand, the steps may be performed in other orders and additional (or fewer) steps can be utilized to achieve the desired result.

As shown in FIG. 23A, at step 2301, payment device identification information may be captured. In an embodiment, the consumer may place his or her payment device in proximity of a payment device reader 2212 (FIG. 22), which may be part of a POS terminal 2102. A merchant may also take the payment device in the form of a payment card from the consumer and swipe the card through the payment device reader 2212. The payment device reader 2212 may capture card information stored on a magnetic strip on a payment card and obtain "swipe information" as is well known in the art.

In an embodiment, the consumer or merchant may enter payment device identification information using a data entry device 2210. In another embodiment, the merchant may swipe a payment device and then the consumer may enter additional payment device information using the data entry device 2210. In another embodiment, the payment device reader 2212 may obtain payment device information using NFC or RFID technology and/or the like. In these embodiments, the payment device may not be a traditional card, but instead may be any object known to those skilled in the art to contain user identification information. In some situations, the consumer may simply place the payment device in proximity to the payment device reader 2212 to allow the payment device reader to capture the payment device identification information. In another embodiment, the consumer's mobile device may function as a payment device. That embodiment is discussed in more detail, below.

At step 2302, an amount due for the transaction may be captured. The step 2304 may occur before, after, or simultaneous with step 2302. In an embodiment, the merchant may enter an amount due using the data entry device 2210. In another embodiment, an amount due may be generated by separate electronic equipment and transmitted electronically to the POS terminal 2102. A cash register (not shown) may be employed to enter items ordered and generate an amount due. The cash register may then transmit that information electronically to the POS terminal 2102. In another embodiment, the POS terminal 2102 may include such cash register functionality and may generate an amount due after the merchant or consumer has entered the items ordered.

At step 2303, the information gathered in steps 2302 and 2304 may be transmitted to the location of a consumer database. In an embodiment shown in FIG. 21, the database 2110 may be located within the processing platform 2104. Further, the information transmitted may include an amount due and payment device (for example, credit card) information. Additional information such as information on the specific items purchased by the consumer, date and time information, the name of the merchant, etc. may be transmitted, if desired. Merchant information may be important if the consumer database 2110 is co-located on the same processing platform as consumer databases for loyalty programs for other merchants. In some embodiments, the merchant or consumer may push a button or enter information into the data entry device 2210 to cause the system to transmit the gathered information.

At step 2304, the consumer database 2110 may be searched to locate the transmitted payment device identification information. The processing platform 2104 may receive the transmitted information and may identify the specific consumer database to be searched. This may be done by identifying the merchant through the transmitted information. The information may then be fed to an engine, such as a consumer profile engine 2118, to conduct a search of the selected consumer database in accordance with step 2305.

Further, step 2305 may determine if the consumer's payment device information is located in a consumer record. If so, the system may continue processing with step 2310. If the payment device information is not located, the system may continue with step 2320, in which a message may be transmitted to the POS terminal 2102 indicating that the payment identification information was not located and may allow the POS terminal 2102 to prompt the consumer to join the merchant's loyalty program. In some embodiments, the merchant may not wish to prompt its consumers to sign up for the loyalty program if they are not already a member, and therefore may not wish to slow down the payment process by performing step 2320 et seq. In this case, the system may continue processing with step 2312 when the consumer's payment identification information is not located.

At step 2310, the located consumer record may be updated to record the current transaction and searched for applicable loyalty rewards. Coupon server 2114 (FIG. 21) may receive information about the current transaction as well as information about previous transactions contained in the consumer record and may determine if the consumer is eligible for any loyalty rewards. If the consumer is eligible for a reward, the system may enter that reward in the consumer record. Such reward may be based on previous consumer activity, current purchase items, consumer profile information, or any other criteria. A reward may also be entered into the consumer's account as a result of the consumer signing up for the loyalty program. The consumer record may also contain a listing of rewards previously acquired by the consumer and the system may search the consumer record for such rewards that may be redeemed with the current purchase.

As shown in FIG. 23B, at step 2311, if any loyalty rewards are to be applied to the current transaction, an adjusted amount due may be generated. If the current transaction does not involve a member of the loyalty program, the adjusted amount due may simply be the full amount. Similarly, if the current transaction involves a member of the loyalty program, but the member is not eligible for loyalty rewards on the transaction, the adjusted amount due may simply be the full amount due.

At step 2312, the adjusted amount due and payment device information may be transmitted to payment processor 2120 (FIG. 21) over the communications link 2122. The payment device information may be swipe information or any other information accepted by payment processors as identifying the specific payment device. As is known in the art, payment processors charge less to process a transaction where swipe information may be provided. In some embodiments, the information may be transmitted in a standard format specified by the payment processor and known to those skilled in art.

At step 2313, a confirmation message may be received from payment the processor 2120. This confirmation message may be received over the communications link 2122. The confirmation message may contain routing information specifically identifying the transaction confirmed and the total amount charged.

Further, at step 2314, a confirmation message may be sent and received at the POS terminal 2102. The confirmation message may include routing information specifically identifying the transaction confirmed and the total amount. The confirmation message may further include information about any loyalty rewards applied. Alternatively, since the POS terminal 2102 may know the original amount due as transmitted, if the confirmation message includes the actual amount charged (the adjusted amount due), the POS terminal 2102 may calculate the discount applied.

At step 2315, the receipt 2208 may be printed for the consumer. In some embodiments, the receipt 2208 may be printed at the POS terminal 2102 using the printer 2204. In addition to normal information that may be included on a sale receipt as those skilled in the art would understand, the receipt may contain a promotional message about the loyalty program. For example, the receipt may include text telling the consumer how many purchases he or she is away from earning another loyalty reward. In another example, the receipt may include text informing the consumer of future promotions. In embodiments, the receipt may also identify the amount of any discount applied. If the receipt is for a transaction involving a consumer who may not be a member of the loyalty program, the receipt may include a message encouraging the consumer to join the loyalty program. For example, the receipt may include text explaining discounts that would have been applied if the consumer was a member of the program. This promotional message may also include instructions on how to join the loyalty program, including providing a phone number or web address for the consumer to call to join the program.

At step 2317, a promotional message is transmitted to the member's mobile device. If the search of payment device identification information at step 2304 successfully located a consumer record, the processing platform 2104 may transmit a promotional message to the consumer's mobile device 2124 using the mobile device identification information stored in the consumer's consumer record over the communications link 2128. The time of performance of step 2317 may not be linked to the time of performance of any other steps, except that it must be performed after the step 2304 because it may rely on information located in step 2304.

The processing platform 2104 may send an SMS message to the consumer's mobile phone number using techniques and hardware known to those skilled in the art. The promotional message may or may not include the information traditionally found on a receipt such as the amount due and the cost of items, and may include information about the promotion received and the consumer's current status in the loyalty program. The promotional message may also inform the consumer about additional loyalty program options.

At step 2320 (FIG. 23A), a message may be transmitted indicating that the payment device information was not located in the consumer database. This message may be sent from the processing platform 2104 over the communications link 2108 to the POS terminal 2102. The message may be in any format understood by the POS terminal 2102 and may refer the specific transaction and contain an indicator that the payment device identification information was not located in the consumer database.

As shown in FIG. 23B, at step 2321, a message may be displayed asking the consumer if he or she would like to join the loyalty program. In an embodiment, this message may be displayed on the display 2202 of the POS terminal 2102 (FIG. 22). The display may be visible to the merchant and not the consumer and the merchant may orally ask the consumer if he or she would like to join the loyalty program after the merchant sees the offer to join displayed on the display 2202. In another embodiment, the consumer may view the offer directly.

At step 2322, the consumer's response to the prompt to join may be captured. In an embodiment, the consumer may indicate his or her choice by selecting a choice using a data entry device at the POS terminal 2102 (FIG. 22) by depressing a key on a keypad or touching a portion of a touch screen display displaying his options. In another embodiment, the consumer may orally announce his choice and the merchant may enter the choice using data entry device 2210 at the POS terminal 2102.

Step 2323 may determine if the consumer chooses to join the program. If the consumer chooses to join the program, processing may continue with step 2340, and if the consumer chooses not to join the program, processing may continue with step 2330. As discussed above, in embodiments the merchant may elect not to prompt consumers to join, in which case steps 2320 and 2321 may not occur. In another embodiment, a message may still be transmitted at step 2320, but the POS terminal may automatically continue processing with step 2330, bypassing steps 2321, 2322, and 2323.

At step 2330, a decline message may be transmitted indicating that enrollment information may not be transmitted and processing of the transaction may continue. In embodiments, this message may be sent from the POS terminal 2102 over the communications link 2108 to the processing platform 2104 (FIG. 21). The message may be in any format understood by the processing platform 2104. The message may simply reference the specific transaction and may include an indicator that enrollment information may not follow and processing of the transaction should continue. Processing may then continue with the step 2312.

At step 2340, the consumer may be prompted to provide sign-up information. The sign-up information requested may be any information required for a complete consumer record. Such information may include basic identification information such as a name and address as well as contact information such as an e-mail address or mobile device identification information, such as a phone number for a mobile phone. Information previously obtained at step 2301 from the payment device may be displayed for the consumer to confirm the accuracy of that information. The consumer may also be asked if he or she would like to associate other payment devices with the account in which case the system may capture information from those payment devices as described in step 2301. The consumer may be prompted by messages displayed on the display 2202 of the POS terminal 2102 (FIG. 22). The display may be visible to the merchant and not the consumer and the merchant may orally ask the consumer for the information requested or the consumer may view the prompts directly.

At step 2341, the consumer's sign up information may be captured. In an embodiment, the consumer may enter sign-up information using a data entry device 2210 at the POS terminal 2102 (FIG. 22) by depressing keys on a keypad or touching a portion of a touch screen display displaying options. In another embodiment, the consumer may verbally relay information to the merchant and the merchant may enter the information using the data entry device 2210 at the POS terminal 2102. The entered information may be displayed for the user that may allow the user to confirm the information is correct before processing may continue. It may be desirable for consumers to be able to sign up for the merchant's loyalty program without first initiating a transaction and thus the merchant or consumer may be able to initiate the sign up process by selecting an option from a main menu. In such a case, the sign-up process may begin with step 2341.

As shown in FIG. 23C, at step 2342, sign-up information may be transmitted. The information may be transmitted in a message sent from the POS terminal 2102 over the communications link 2108 to the processing platform 2104. The message may be in any format understood by the processing platform 2104. The message may reference the specific transaction and may include the sign-up information provided by the consumer. Further, the message may or may not contain information captured from the consumer's payment card and previously transmitted at step 2303.

At step 2343, a consumer record may be created in the merchant's loyalty program's consumer records database 2110. The consumer record may be created at the processing platform 2104. The coupon server 2114 or another processing entity within the processing platform 2104 may be queried to identify any loyalty rewards applicable to enrolling members of the merchant's loyalty program. Any located loyalty rewards may then be placed in the consumer record to be applied to the current transaction. In addition to use in the processes described herein, the consumer record may be used in other facets of a loyalty program. Such other facets may include transmitting of messages containing digital coupons to a consumer's mobile device based on a consumer's profile and not associated with any particular transaction. After creating a consumer record at step 2344, processing of the transaction may immediately continue with step 2311, while steps 2344 and 2345 may occur simultaneously, prior to, or subsequent to the transaction processing beginning with step 2311.

At step 2344, a welcome message may be transmitted to the consumer's mobile device. The message may be sent using the mobile device identification information provided by the consumer at step 2341 and stored in the consumer record at step 2343. Further, the welcome message may be sent as an SMS message to the consumer's mobile phone using the consumer's mobile phone number stored in the consumer's consumer record as mobile device identification information. The welcome message may include information about the loyalty program, as well as promotional messages. Possible promotional messages are described above in the discussion of step 2317.

In embodiments, the welcome message may also contain instructions for opting out of receiving future messages on the mobile device. In some embodiments, the welcome message may also contain a request that the consumer acknowledge the message in some fashion. Such an acknowledgment may be used to confirm that the consumer provided valid and accurate mobile device identification information. In some embodiments, a consumer may not be deemed a valid member of the loyalty program until the consumer acknowledges the welcome message. The consumer may acknowledge the welcome message in some embodiments simply by replying to the welcome message using the same communications protocol used to send the message. Other methods of acknowledging may include calling an activation number or visiting a specific website and signing in.

At step 2345, a welcome receipt may be printed for the consumer. In some embodiments, the receipt may be printed on the printer 2204 at the POS terminal 2102 (FIG. 22). The receipt may be printed immediately after the consumer may enter his contact information or the receipt may not be printed until the POS terminal 2102 may receive a confirmation message from the processing platform 2104 that the consumer information was successfully entered into the consumer database at step 2343. The welcome receipt may contain program rules including privacy information, instructions for opting out of receiving future messages at the mobile device, instructions for quitting the program, as well as promotional messages.

Figure 24A:
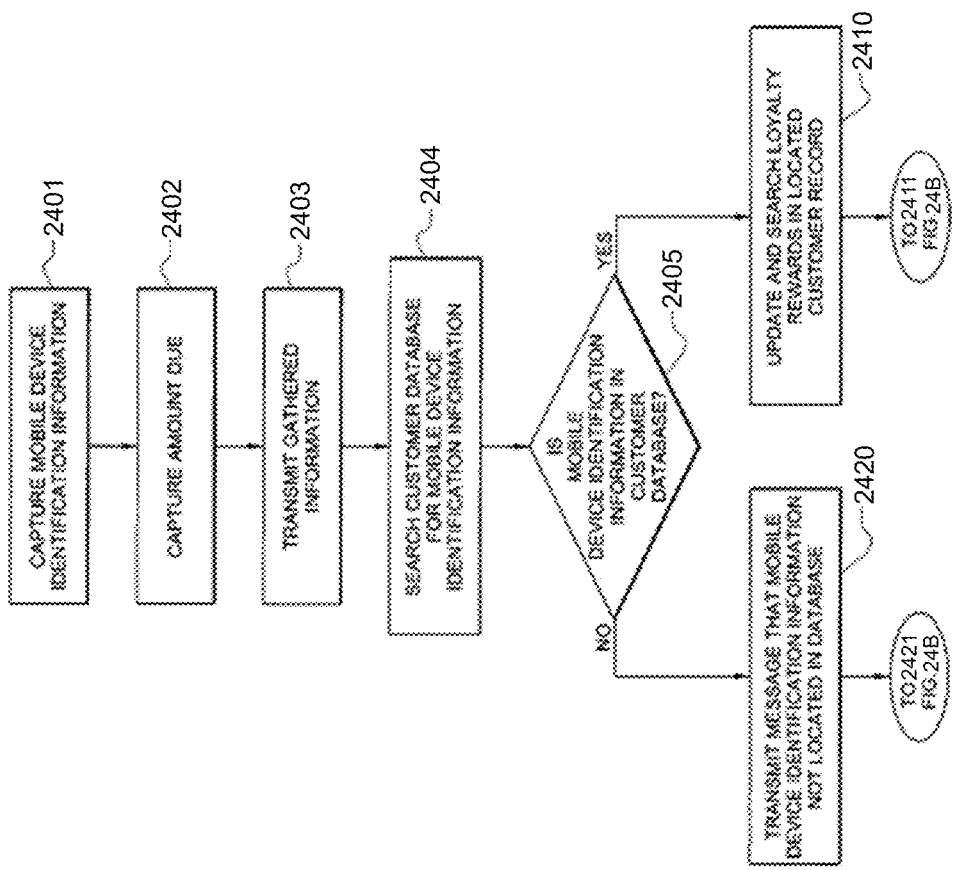
FIGS. 24A, 24B, and 24C illustrate flow charts showing use of the system in another embodiment.
Figure 24B:
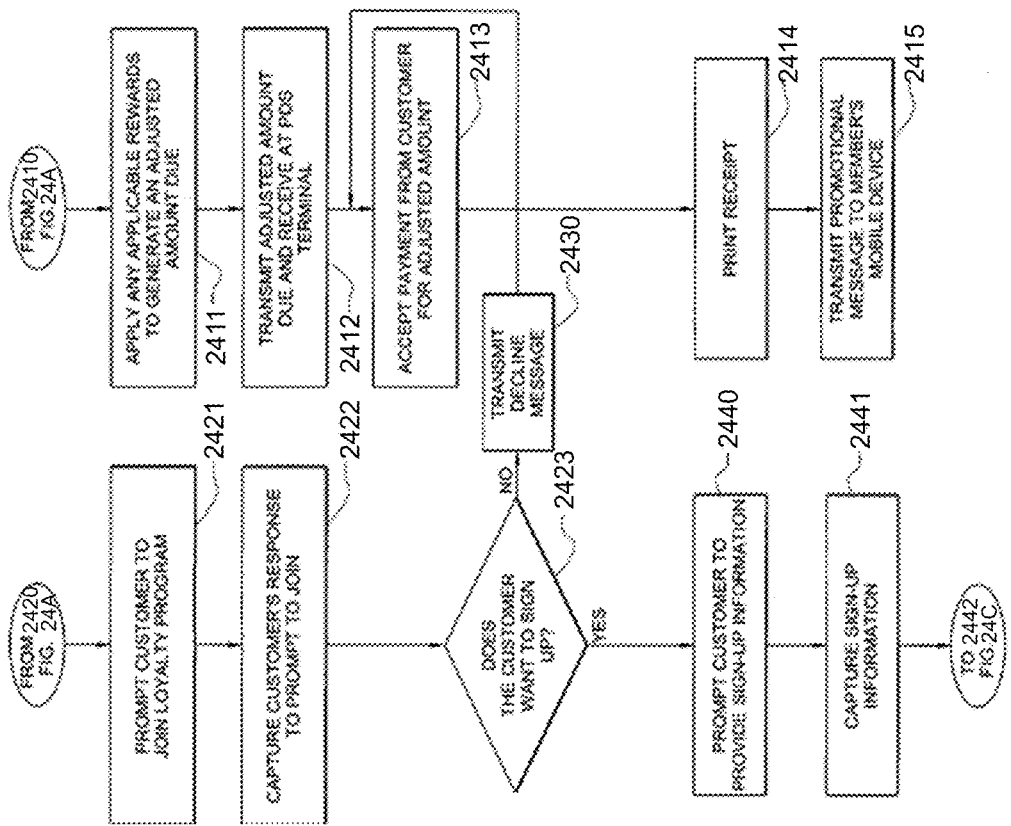
Figure 24C:
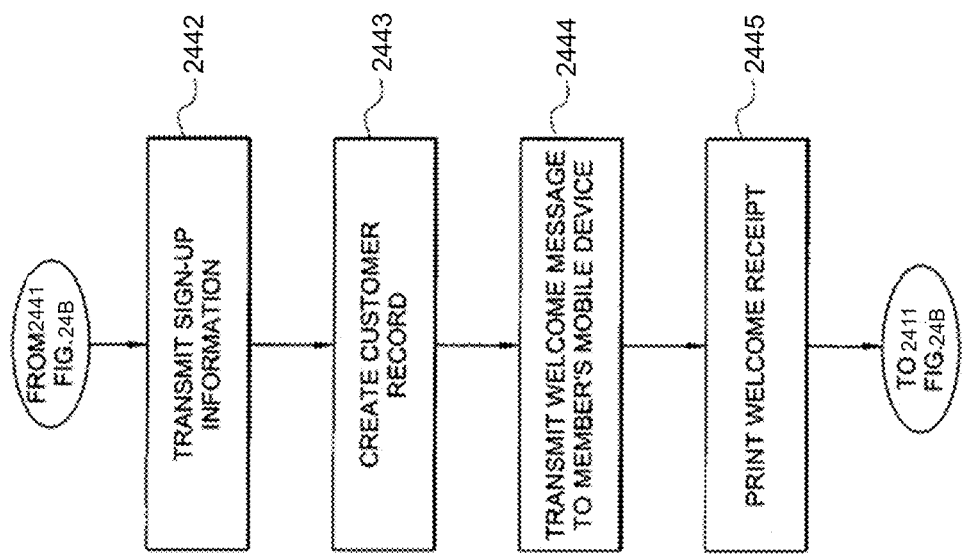

FIGS. 24A, 24B, and 24C show flow charts showing use of the system in another embodiment. In embodiments, the steps may be performed using the exemplary system of FIG. 21 and the POS terminal 2102 shown in FIG. 22. The steps shown in FIGS. 24A, 24B, and 24C are shown in a particular order, but as one skilled in the art would understand, the steps may be performed in other orders and additional (or fewer) steps may be utilized to achieve the desired result. Many of the processes shown in FIGS. 24A, 24B, and 24C may operate in the same or similar to the processes of FIGS. 23A, 23B, and 23C. While the processes of FIGS. 23A, 23B, and 23C may rely on the consumer using a payment device uniquely associated with the consumer, the processes of FIGS. 24A, 24B, and 24C may identify the consumer based on the consumer's mobile device identification information and may thus allow the consumer to pay in any manner, including manners not uniquely identifying the users, such as paying cash.

As shown in FIG. 24A, at step 2401, mobile device identification information may be captured. In one embodiment, the consumer may place his or her mobile device in proximity of a payment device reader 2212 (FIG. 22), which may be part of a POS terminal 2102. In one embodiment, the payment device reader 2212 may obtain mobile device information using NFC or RFID technology and/or the like. In some situations, the consumer may simply place the payment device in proximity to the payment device reader 2212 to allow the payment device reader to capture the payment device identification information. In another embodiment, the consumer may key mobile device identification information into the POS terminal 2102. The consumer may enter the mobile device identification information into a device such as keypad 2210 (FIG. 22) or the display 2202 (FIG. 22) may function as a touch-screen display allowing the consumer to key in mobile device identification information.

Similarly, the consumer may verbally communicate mobile device identification information to the merchant who may then enter the information into the POS terminal 2102, in some embodiments using a device such as keypad 2210 or display 2202. In some embodiments, the mobile device identification information may be the phone number assigned to a consumer's cellular phone. In other embodiments, the mobile device identification may be another value that identifies the users and/or specific mobile device such as an MSID, ESN, and/or the like.

In embodiments, both mobile device identification information and payment device identification information may be captured at step 2401. The payment device identification information may be transmitting at step 2403 or may simply be saved at the POS terminal 2102 (FIG. 22) for processing of payment at step 2413. The mobile device identification information may be captured through the process described in step 2302 (FIG. 23A). Additionally, the mobile device may store payment device identification information such that both mobile device identification information and payment device identification information may be received by the POS terminal 2102 through such methods as RFID, NFC, and/or the like.

At step 2402, an amount due for the transaction may be captured. Step 2402 may occur before, after, or simultaneous with step 2401. In one embodiment, the merchant may enter an amount due using a data entry device 2210. In another embodiment, an amount due may be generated by separate electronic equipment and transmitted electronically to the POS terminal 2102. Further, a cash register may be employed to enter items ordered and may generate an amount due. The cash register may then transmit that information electronically to the POS terminal 2102. In another embodiment, the POS terminal 2102 may contain such cash register functionality and may generate an amount due after the merchant or consumer has entered the items ordered.

Further, at step 2403, the information gathered in steps 2401 and 2402 may be transmitted to the location of the consumer database. In an embodiment, as shown in FIG. 21, the consumer database 2110 may be located within a processing platform 2104. The information transmitted may include an amount due and mobile device identification information. Additional information such as payment device identification information, information on the specific items purchased by the consumer, date and time information, the name of the merchant, etc. may also be transmitted, if desired. Merchant information may be important if the consumer database is co-located on the same processing platform as consumer databases for loyalty programs for other merchants. In some embodiments, the merchant or consumer may push a button or enter information into data entry device 2210 that may cause the system to transmit the gathered information.

At step 2404, the consumer database may be searched to locate the transmitted mobile device identification information. The processing platform 2104 may receive the transmitted information and may identify the specific consumer database to be searched. This may be done by identifying the merchant through the transmitted information. The information may then be fed to an engine, such as consumer profile engine 2118, to conduct a search of the selected consumer database in accordance with step 2404.

Step 2404 may determine if the consumer's mobile device information is located in a consumer record. If so, the system may continue processing with step 2410. If the payment device information is not located, the system may continue with step 2420, in which a message may be transmitted to the POS terminal indicating that the payment identification information may not located and may allow the POS terminal to prompt the consumer to join the merchant's loyalty program. In embodiments, the merchant may not wish to prompt its consumers to sign up for the loyalty program if they are not already a member, and therefore may not wish to slow down the payment process by performing step 2420 et seq. In this case, the system may continue processing with step 2413 when the consumer's mobile identification information is not located.

At step 2410, the located consumer record may be updated to record the current transaction and searched for applicable loyalty rewards. The coupon server 2114 (FIG. 21) may receive information about the current transaction as well as information about previous transactions contained in the consumer record and may determine if the consumer is eligible for any loyalty rewards. If the consumer is eligible for a reward, the system may enter that reward in the consumer record. Such reward may be based on previous consumer activity, current purchase items, consumer profile information, or any other criteria. A reward may also be entered into the consumer's account as a result of the consumer signing up for the loyalty program. The consumer record may also contain a listing of rewards previously acquired by the consumer and the system may search the consumer record for such rewards that may be redeemed with the current purchase.

As shown in FIG. 24B, at step 2411, if any loyalty rewards are to be applied to the current transaction, an adjusted amount due may be generated. If the current transaction does not involve a member of the loyalty program, the adjusted amount due may simply be the full amount. Similarly, if the current transaction involves a member of the loyalty program, but the member is not eligible for loyalty rewards on the transaction, the adjusted amount due may simply be the full amount due.

At step 2412, the adjusted amount due may be sent from processing platform 2104 and may be received at POS terminal 2102. In some embodiments, the adjusted amount due may be sent in a message over communications link 2108.

At step 2413, payment may be accepted at the POS terminal 2102 from the consumer for the adjusted amount due. The payment may be in any form such as cash, check, gift certificate, credit card, debit card, and/or the like. As described above, payment information may have been received in the form of payment device identification information during step 2401. Where payment device identification information is received, either in step 2413 or step 2401, the payment device identification information may be transmitted to a third party payment processor such as payment processor 2120 (FIG. 21) or may be transmitted to the processing platform 2104 (FIG. 21). If the payment device identification information is transmitted to processing platform 2104, steps 2312-2314 (FIG. 23B) may then be performed.

At step 2414, the receipt 2208 may be printed for the consumer. In some embodiments, the receipt 2208 may be printed at POS terminal 2102 using printer 2204. In addition to normal information that would be contained on a sale receipt as those skilled in the art would understand, the receipt may contain a promotional message about the loyalty program. For example, the receipt may contain text telling the consumer how many purchases he or she is away from earning another loyalty reward. In another example, the receipt may contain text informing the consumer of future promotions. In embodiments, the receipt may also identify the amount of any discount applied. If the receipt is for a transaction involving a consumer who is not a member of the loyalty program, the receipt may contain a message encouraging the consumer to join the loyalty program. For example, the receipt may contain text explaining discounts that would have been applied if the consumer was a member of the program. This promotional message may also contain instructions on how to join the loyalty program that may include providing a phone number or web address for the consumer to call to join the program.

At step 2415, a promotional message may be transmitted to the member's mobile device. If the search of mobile device identification information at step 2404 successfully located a consumer record, the processing platform 2104 may transmit a promotional message to the consumer's mobile device 2124 using the mobile device identification information stored in the consumer's consumer record over communications link 2128. It should be understood that a consumer record may contain more than one type of mobile device identification information. For example, a consumer record may contain a serial number transmitted by the mobile device to identify the phone as well as another mobile device identification information that may be used to address a communication to the mobile device such as a phone number. The time of performance of step 2415 may not be linked to the time of performance of any other steps, except that it must be performed after step 2404 because it may rely on information located in step 2404. In some embodiments, the processing platform 2104 may send an SMS message to the consumer's mobile phone number using techniques and hardware known to those skilled in the art. The promotional message may or may not contain the information traditionally found on a receipt such as the amount due and the cost of items, and may contain information about the promotion received and the consumer's current status in the loyalty program. The promotional message may also inform the consumer about additional loyalty program options.

At step 2420 (FIG. 24A), a message may be transmitted that may indicate that the mobile device information was not located in the consumer database. This message may be sent from the processing platform 2104 over communications link 2108 to the POS terminal 2102. The message may be in any format understood by the POS terminal and may simply reference the specific transaction and contain an indicator that the mobile device identification information was not located in the consumer database.

As shown in FIG. 24B, at step 2421, a message may be displayed asking the consumer if he or she would like to join the loyalty program. In an embodiment, this message may be displayed on display 2202 of the POS terminal 2102 (FIG. 22). The display may be visible to the merchant and not the consumer and the merchant may orally ask the consumer if he or she would like to join the loyalty program after the merchant sees the offer to join displayed on the display 2202. In another embodiment, the consumer may view the offer directly.

At step 2422, the consumer's response to the prompt to join may be captured. In an embodiment, the consumer may indicate his or her choice by selecting a choice using a data entry device at the POS terminal 2102 (FIG. 22) by depressing a key on a keypad or touching a portion of a touch screen display displaying his options. In another embodiment, the consumer may orally announce his choice and the merchant may enter the choice using data entry device 2210 at the POS terminal 2102.

Step 2423 may determine if the consumer chooses to join the program. If the consumer chooses to join the program, processing may continue with step 2440, and if the consumer chooses not to join the program, processing may continue with step 2430. As discussed above, in some embodiments, the merchant may elect not to prompt consumers to join, in which case steps 2420 and 2421 may not occur. In another embodiment, a message may still be transmitted at step 2420, but the POS terminal may automatically continue processing with step 2430, bypassing steps 2421, 2422, and 2423.

At step 2430, a decline message may be transmitted that may indicate that enrollment information may not be transmitted and processing of the transaction may continue. In some embodiments, this message may be sent from the POS terminal 2102 over the communications link 2108 to processing platform 2104 (FIG. 21). The message may be in any format understood by the processing platform 2104. The message may simply reference the specific transaction and contain an indicator that enrollment information may not follow and processing of the transaction should continue. Processing may then continue at step 2413.

At step 2440, the consumer may be prompted to provide sign-up information. The sign-up information requested may be any information required for a complete consumer record. Such information may include basic identification information such as a name and address as well as contact information such as an e-mail address or mobile device identification information, such as a phone number for a mobile phone. Information previously obtained at step 2401 may be displayed for the consumer to confirm the accuracy of that information. The consumer may also be asked if he or she would like to associate any payment devices with the account in which case the system may capture information from those payment devices as described in step 2301. The consumer may be prompted by messages displayed on the display 2202 of the POS terminal 2102 (FIG. 22). The display may be visible to the merchant and not the consumer and the merchant may orally ask the consumer for the information requested or the consumer may view the prompts directly.

At step 2441, the consumer's sign up information may be captured. In one embodiment, the consumer may enter the sign-up information using a data entry device 2210 at the POS terminal 2102 (FIG. 22) by depressing keys on a keypad or touching a portion of a touch screen display displaying options. In another embodiment, the consumer may verbally relay information to the merchant and the merchant may enter the information using data entry device 2210 at the POS terminal 2102. The entered information may be displayed for the user allowing the user to confirm the information is correct before processing continues. It may be desirable for consumers to be able to sign up for the merchant's loyalty program without first initiating a transaction and thus the merchant or consumer may be able to initiate the sign up process by selecting an option from a main menu. In such a case, the sign-up process may begin at step 2441.

As shown in FIG. 24C, at step 2442, sign-up information may be transmitted. The information may be transmitted in a message sent from the POS terminal 2102 over the communications link 2108 to the processing platform 2104. The message may be in any format understood by processing platform 2104. The message may reference the specific transaction and may contain the sign-up information provided by the consumer. The message may or may not contain information captured from the consumer's payment card and previously transmitted in step 2303.

At step 2443, a consumer record may be created in the merchant's loyalty program's consumer records database 2110. The consumer record may be created at a processing platform 2104. The coupon server 2114 or another processing entity within processing platform 2104 may be queried to identify any loyalty rewards applicable to enrolling members of the merchant's loyalty program. Any located loyalty rewards may then be placed in the consumer record to be applied to the current transaction. In addition to use in the processes described herein, the consumer record may be used in other facets of a loyalty program. Such other facets may include the transmitting of messages containing digital coupons to a consumer's mobile device based on a consumer's profile and may not be associated with any particular transaction. After creating a consumer record in step 2444, processing of the transaction may immediately continue with step 2411, while steps 2444 and 2445 may occur simultaneously, prior to, or subsequent to the transaction processing beginning with step 2411.

At step 2444, a welcome message may be transmitted to the consumer's mobile device. The message may be sent using the mobile device identification information provided by the consumer at step 2441 and may be stored in the consumer record at step 2443. The welcome message may be sent as an SMS message to the consumer's mobile phone using the consumer's mobile phone number stored in the consumer's consumer record as mobile device identification information. The welcome message may include information about the loyalty program, as well as promotional messages. Possible promotional messages are described above in the discussion of step 2415. In some embodiments, the welcome message may also contain instructions for opting out of receiving future messages on the mobile device. In some embodiments, the welcome message may also contain a request that the consumer may acknowledge the message in some fashion. Such an acknowledgment may be used to confirm that the consumer provided valid and accurate mobile device identification information. In some embodiments, a consumer may not be deemed a valid member of the loyalty program until the consumer acknowledges the welcome message. The consumer may acknowledge the welcome message in some embodiments simply by replying to the welcome message using the same communications protocol used to send the message. Other methods of acknowledging may include calling an activation number or visiting a specific website and signing in.

At step 2445, a welcome receipt may be printed for the consumer. In some embodiments, the receipt may be printed on the printer 2204 at the POS terminal 2102 (FIG. 22). The receipt may be printed immediately after the consumer may enter his contact information or the receipt may not be printed until the POS terminal 2102 may receive a confirmation message from the processing platform 2104 that the consumer information was successfully entered into the consumer database at step 2443. The welcome receipt may contain program rules including privacy information, instructions for opting out of receiving future messages at the mobile device, instructions for quitting the program, as well as promotional messages.

The methods and systems of the present invention have been described in part as using payment methods described in the above-identified patent application. The embodiments of the present invention are not limited to these methods, but rather may be used with any appropriate electronic payment system.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, cloud server, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another.

The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method of providing shareable offers that are shared through social networks and associating the shareable offers with respective loyalty accounts, the method being implemented on a computer system having one or more processors programmed with computer program instructions to perform the method, the method comprising:
   receiving, by the computer system, transaction information associated with a first loyalty account related to a first user, the transaction information comprising an identification of at least one item, wherein the first loyalty account is associated with a retailer having a loyalty program for purchases made in association with the retailer;
   identifying, by the computer system, a shareable offer based on the transaction information and a location of a device of the first user within a first store of the retailer, wherein the shareable offer is associated with an item to which the shareable offer relates;
   identifying, by the computer system, a second shareable offer based on a second zone within the first store of the retailer;
   communicating, by the computer system and using a first electronic promotion channel from among a plurality of electronic promotion channels, the shareable offer and the second shareable offer to the device of the first user based on movement of the first device within different zones of the first store of the retailer;
   storing, by the computer system, an association of the first electronic promotion channel with the shareable offer;
   preventing, by the computer system, the shareable offer from being communicated to the first user via a second electronic promotion channel from among the plurality of electronic promotion channels based on the stored association of the first electronic promotion channel with the shareable offer, the second electronic promotion channel being different than the first electronic promotion channel;
   receiving, by the computer system, a request from the first user to share the shareable offer through a social network account of the first user;
   providing, by the computer system to a social networking site, data comprising a selectable link to be posted via the social network account of the first user responsive to the request, wherein the selectable link comprises a link back to the system, from the social network account, that, when selected, instructs the system to associate the shareable offer with a second user;
   receiving, by the computer system from the social networking site, an indication that the selectable link was selected by the second user;
   identifying, by the computer system, a second loyalty account related to the second user responsive to the indication that the selectable link was selected;
   storing, by the computer system, an association of the second loyalty account and the shareable offer;
   receiving, by the computer system from a point of sale computer, second transaction information comprising: (i) an identification of the second loyalty account used in association with a transaction, and (ii) an indication that the transaction includes the item associated with the shareable offer; and
   providing, by the computer system, the shareable offer to the point of sale computer responsive to receipt of the second transaction information.

2. The method of claim 1, wherein identifying the shareable offer further comprises:
   determining, by the computer system, a behavioral trait of the first user, wherein the shareable offer is based further on the behavioral trait.

3. The method of claim 2, wherein determining the behavioral trait comprises:
   obtaining, by the computer system, information indicating an activity occurring in association with the device; and
   assigning, by the computer system, the behavioral trait to the first user based on the activity.

4. The method of claim 3, wherein the activity comprises a number of offers viewed at the device.

5. The method of claim 3, wherein the activity comprises a movement of the device to a location within a store of the retailer.

6. The method of claim 5, wherein the device comprises a mobile device programmed with a self-scan application that programs the mobile device to scan one or more items for purchase, and wherein the method further comprising:
   receiving, by the computer system from the device, a scan of the at least one item; and
   obtaining, by the computer system, a planogram of the store of the retailer that maps items to their respective locations within the store,
   wherein the location is determined based on the scan of the at least one item and the planogram.

7. The method of claim 2, wherein determining the behavioral trait comprises a real-time trait that expires at a predefined date or time after which the real-time trait is no longer used to characterize the first user.

8. The method of claim 1, further comprising:
   storing, by the computer system, the shareable offer in a digital offer wallet remote from the device; wherein providing the shareable offer further comprises:
   obtaining, by the computer system, the shareable offer from the digital offer wallet; and
   transmitting, by the computer system to the point of sale computer, an indication of the shareable offer.

9. The method of claim 1, the method further comprising:
   receiving, by the computer system, a non-shareable offer;
   receiving, by the computer system, an offer;
   receiving, by the computer system, an indication that the offer is shareable;

associating, by the computer system, the offer with a shareable attribute that indicates that the offer is shareable; and causing, by the computer system, the offer and the non-shareable offer to be stored among a plurality of offers, wherein identifying the shareable offer comprises identifying the offer with the shareable attribute from among the plurality of offers.

10. The method of claim 1, the method further comprising:

receiving, by the computer system from the first user, a registration that indicates the social network account of the first user.

11. The method of claim 1, wherein identifying the second loyalty account related to the second user comprises:

providing, by the computer system, a registration page used to obtain an identification of the second loyalty account from the second user responsive to the indication that the selectable link was selected; and obtaining, by the computer system, the identification of the second loyalty account based on the registration page, wherein the stored association of the second loyalty account and the shareable offer is based on the obtained identification.

12. The method of claim 1, wherein the device of the first user comprises a mobile device, wherein the first electronic promotion channel comprises a communication channel with the mobile device.

13. The method of claim 1, wherein receiving the location comprises receiving a first zone within the first store of the retailer at which the mobile device is currently located.

14. The method of claim 1, wherein the selectable link comprises information identifying the offer.

15. The method of claim 1, wherein the selectable link comprises information identifying the first user.

16. The method of claim 1, wherein the selectable link comprises information identifying the retailer at which the shareable offer is redeemable.

17. The method of claim 1, wherein the device comprises a mobile device programmed with a self-scan application that programs the mobile device to scan one or more items for purchase, the method further comprising:

causing, by the computer system, the mobile device to provide a shareable option to share the shareable offer during execution of the self-scan application, wherein the request to share the shareable offer is received from the mobile device during the execution of the self-scan application.

18. The method of claim 1, wherein the device comprises a mobile device programmed with a self-scan application that programs the mobile device to scan one or more items for purchase, and wherein receiving the transaction information comprises receiving the identification of the at least one item based on a scan of the at least one item at the mobile device via the self-scan application.

19. The method of claim 1, wherein the shareable offer is subject to a limited number of redemptions beyond which the shareable offer is no longer redeemable.

20. The method of claim 1, wherein the shareable offer is communicated to the device through a first electronic promotion channel, the method further comprising:

storing, by the computer system, the shareable offer in association with an offer wallet related to the first user;

identifying, by the computer system, a second offer, different from the shareable offer, for the first user;

communicating, by the computer system, the second offer to the first user via a second electronic promotion channel different from the first electronic promotion channel; and storing, by the computer system, the second offer in association with the offer wallet.

21. The method of claim 1, the method further comprising:

determining, by the computer system, a number of redemptions of the shareable offer; and determining, by the computer system, an effectiveness of the social network account in conveying the shareable offer based on the number of redemptions.

22. A system for providing shareable offers that are shared through social networks and associating the shareable offers with respective loyalty accounts, the system comprising:

a computer system having one or more processors programmed with computer program instructions, the computer system programmed to:

receive transaction information associated with a first loyalty account related to a first user, the transaction information comprising an identification of at least one item, wherein the first loyalty account is associated with a retailer having a loyalty program for purchases made in association with the retailer;

identify a shareable offer based on the transaction information and a location of a device of the user within a first store of the retailer, wherein the shareable offer is associated with an item to which the shareable offer relates;

identify a second shareable offer based on a second zone within the first store of the retailer;

communicate, using a first electronic promotion channel from among a plurality of electronic promotion channels, the shareable offer and the second shareable offer to the device of the first user based on movement of the first device within different zones of the first store of the retailer;

store an association of the first electronic promotion channel with the shareable offer;

prevent the shareable offer from being communicated to the first user via a second electronic promotion channel from among the plurality of electronic promotion channels based on the stored association of the first electronic promotion channel with the shareable offer, the second electronic promotion channel being different than the first electronic promotion channel;

receive a request from the first user to share the shareable offer through a social network account of the first user;

provide to a social networking site data comprising a selectable link to be posted via the social network account of the first user responsive to the request, wherein the selectable link comprises a link back to the system, from the social network account, that, when selected, instructs the system to associate the shareable offer with a second user;

receive from the social networking site an indication that the selectable link was selected by the second user;

identify a second loyalty account related to the second user responsive to the indication that the selectable link was selected;

store an association of the second loyalty account and the shareable offer; and receive, from a point of sale computer, second transaction information comprising: (i) an identification of the second loyalty account used in association with a transaction, and (ii) an indication that the transaction includes the item associated with the shareable offer; and provide the shareable offer to the point of sale computer responsive to receipt of the second transaction information.

\* \* \* \* \*